United States Patent [19]

Farnum

[11] 4,123,152
[45] * Oct. 31, 1978

[54] CIRCUMFERENTIAL STEREO SPECTACULAR WITH A MOSAIC IN A SCENE

[76] Inventor: Henry M. Farnum, Executive House, 225 E. 46th St., New York, N.Y. 10017

[*] Notice: The portion of the term of this patent subsequent to Nov. 2, 1993, has been disclaimed.

[21] Appl. No.: 711,976

[22] Filed: Aug. 5, 1976

Related U.S. Application Data

[63] Continuation-in-part of Ser. No. 302,901, Nov. 1, 1972, Pat. No. 3,989,362.

[51] Int. Cl.² .............................................. G03B 37/00
[52] U.S. Cl. ....................................... 352/69; 352/70; 352/243
[58] Field of Search ...................... 352/69, 70, 71, 243

[56] References Cited

U.S. PATENT DOCUMENTS

| | | | |
|---|---|---|---|
| 1,136,236 | 4/1915 | Killman | 352/70 |
| 2,073,998 | 3/1937 | Raby | 352/243 |
| 2,447,667 | 8/1948 | Raby | 352/243 |
| 3,313,068 | 4/1967 | Pinto | 352/69 |
| 3,420,605 | 1/1969 | Kipping | 352/69 |
| 3,539,249 | 11/1970 | Jaulmes | 352/69 |
| 3,695,751 | 10/1972 | Watanuki | 352/70 |

Primary Examiner—Monroe H. Hayes

[57] ABSTRACT

This invention is an improved apparatus for recording and displaying a scene. A camera comprising a recording means is positioned at a location in a mosaic comprising a stage, to record said scene to be photographed which selectively extends beyond said mosaic. Said camera comprises a rotatable reflector selectively with focusing means, reflecting said scene to said recording means, for rotating said reflector instead of rotating said recording means. Said scene when projected upon a cyclorama substantially fills the field of vision of an observer, creating the illusion of reality. Said cyclorama is in the form of a generally symmetrical geometric figure. Said camera selectively rotates at a uniform speed in a predetermined pattern, and at least one projector is mounted on the optical axis of said camera for projecting the image recorded on said film back to the portion of said cyclorama corresponding to the respective portion of said scene.

1 Claim, 52 Drawing Figures

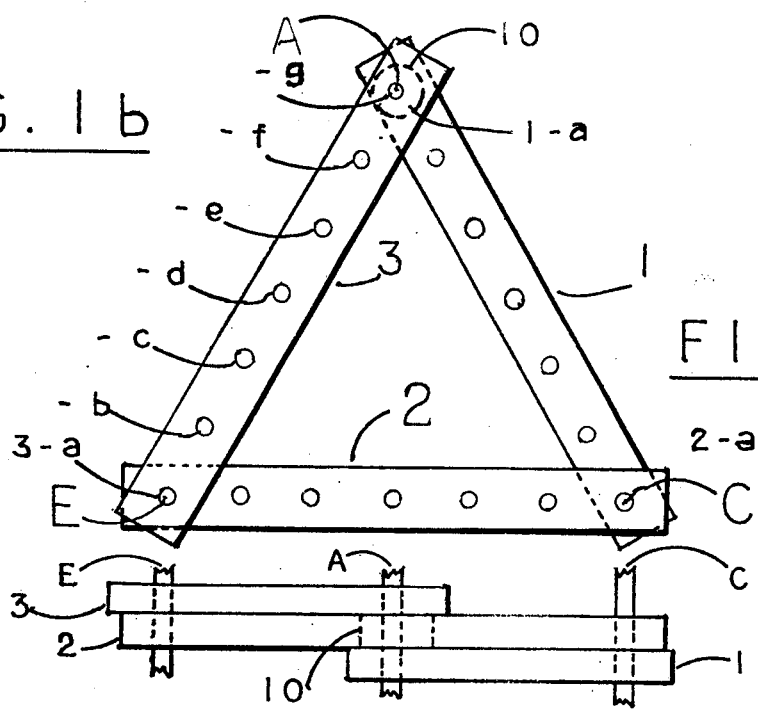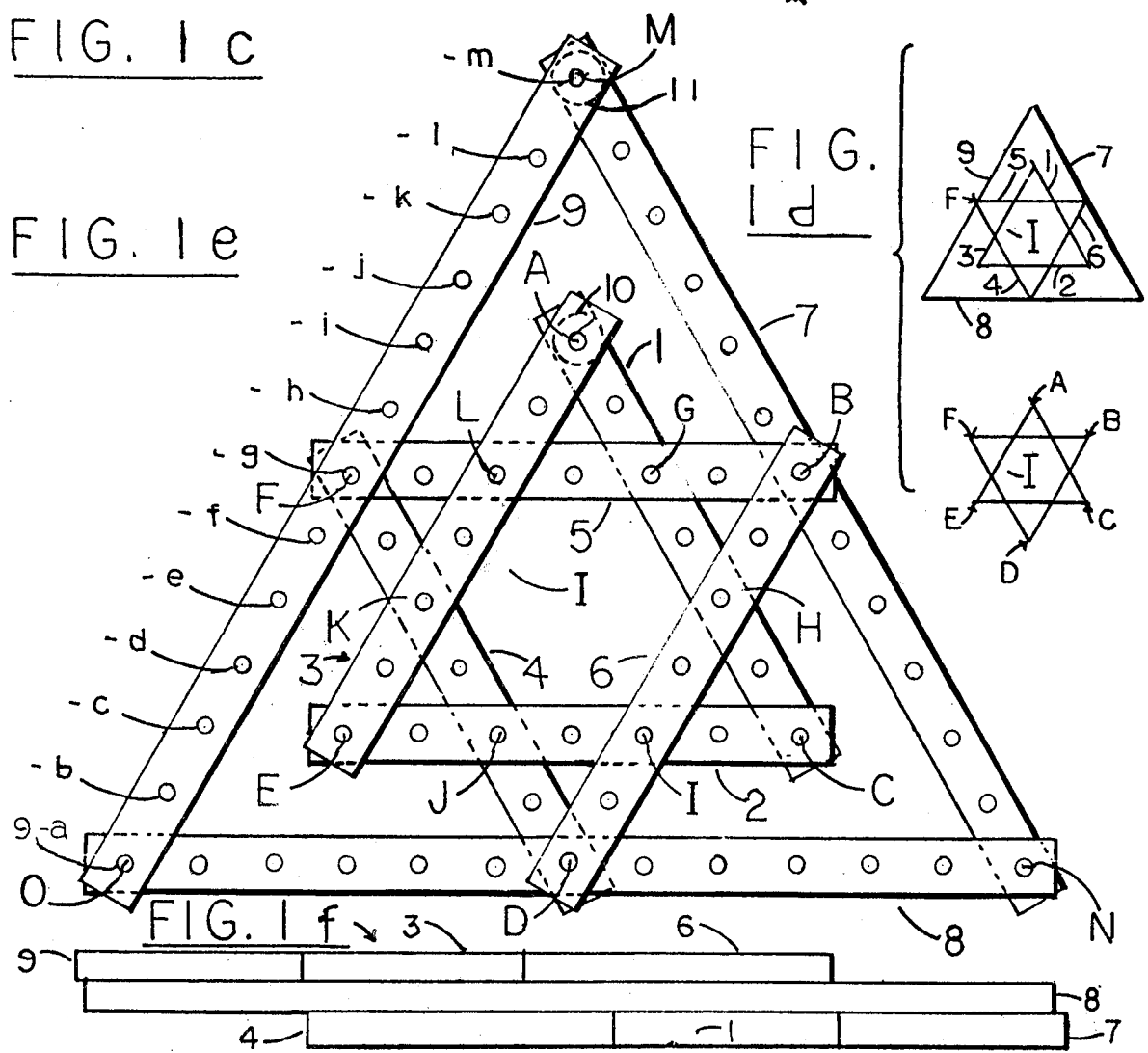

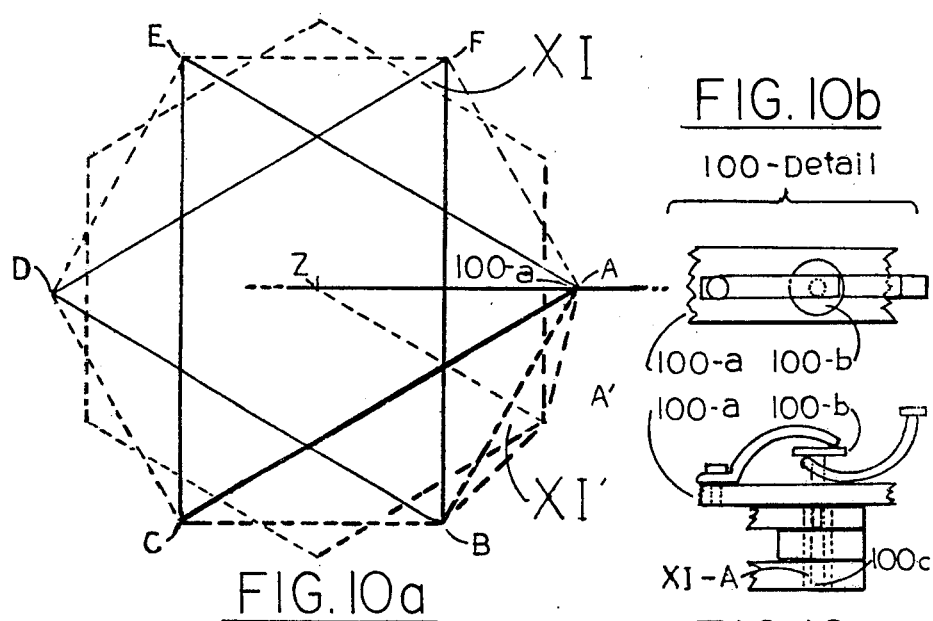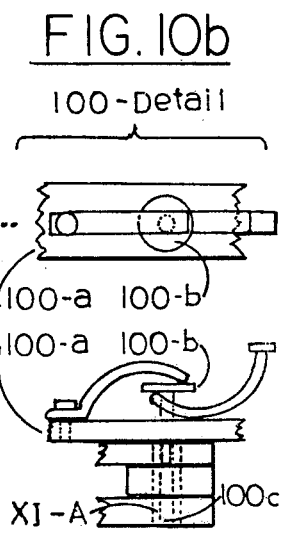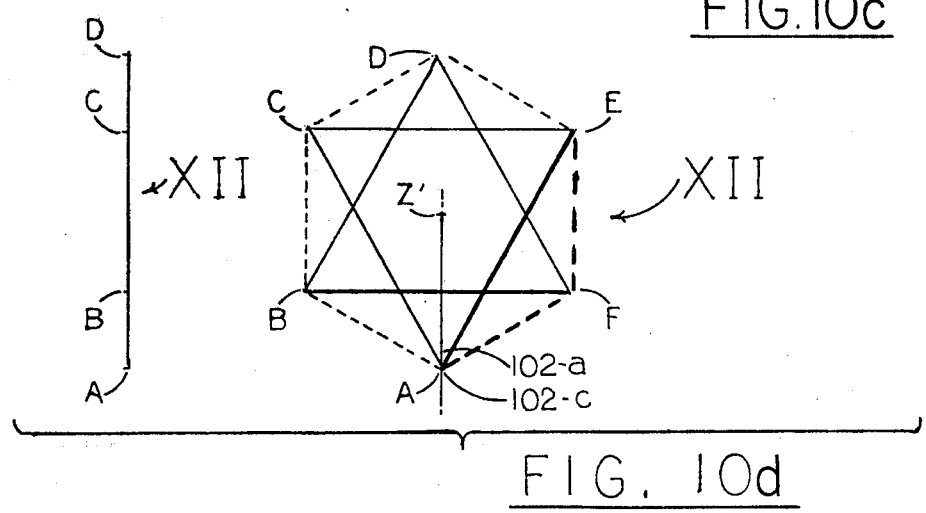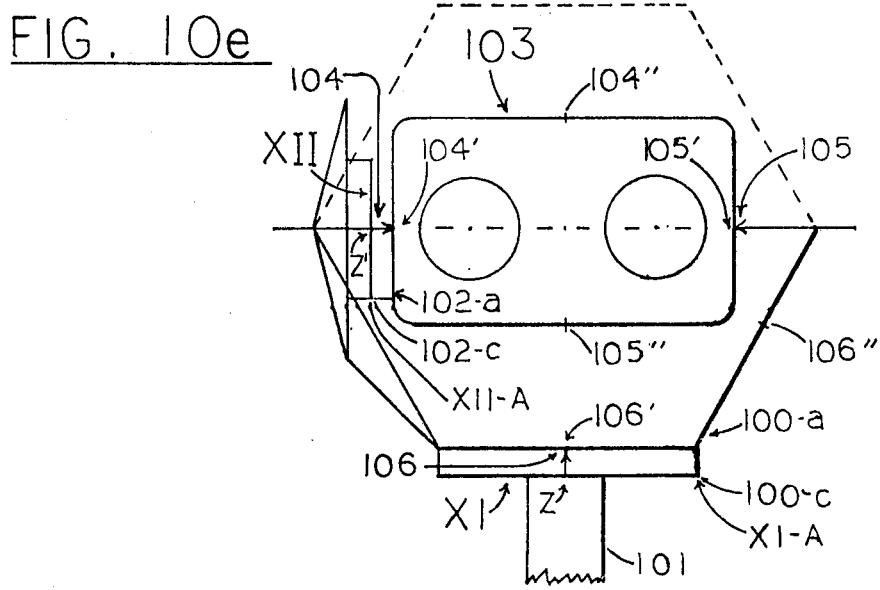
FIG. 10a
FIG. 10b
FIG. 10c
FIG. 10d
FIG. 10e

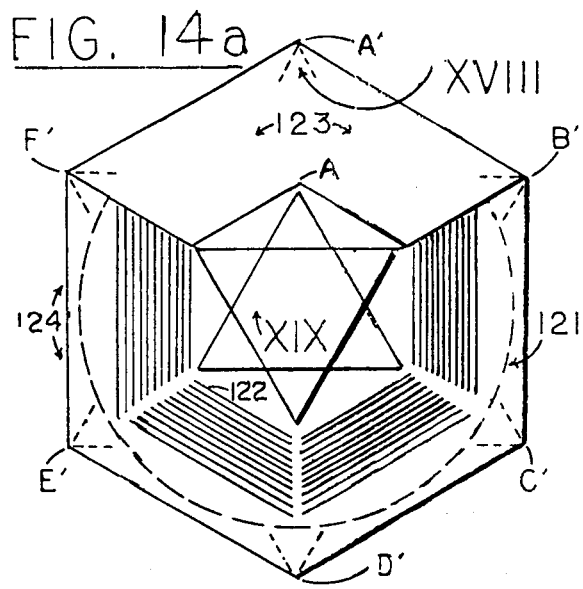
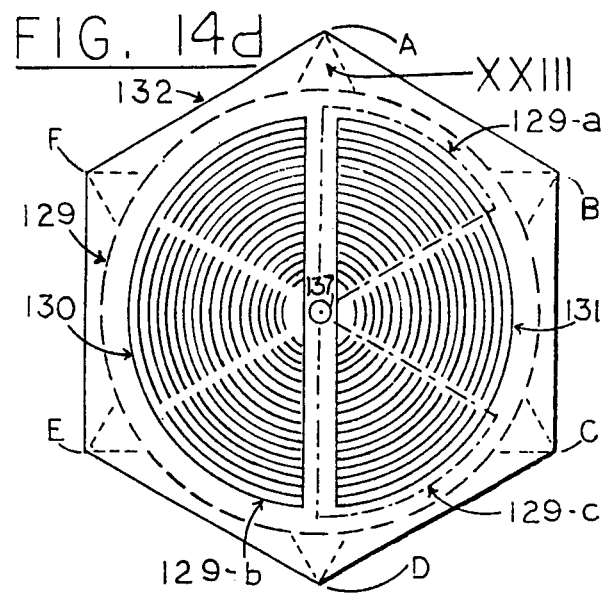
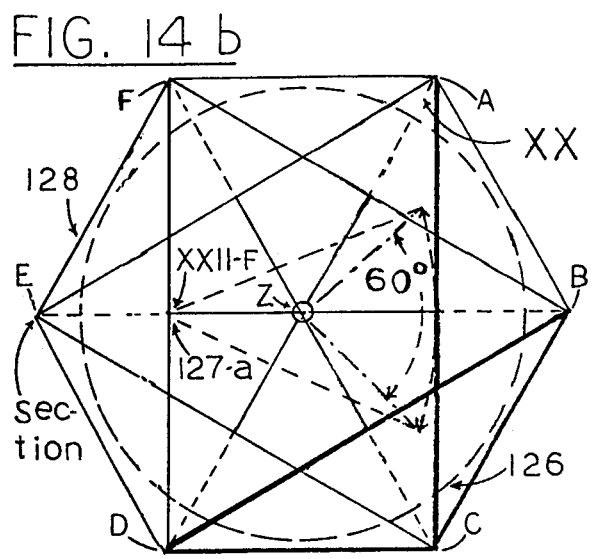
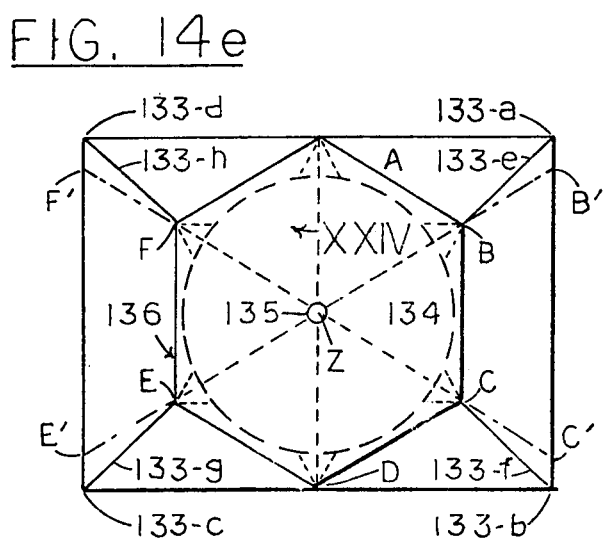
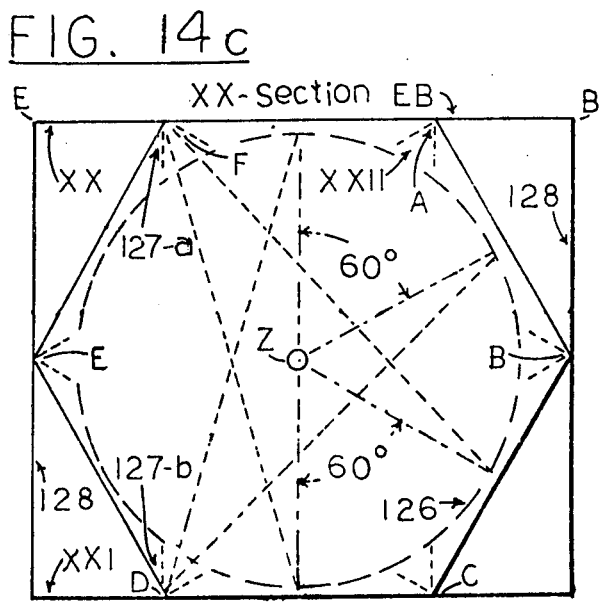

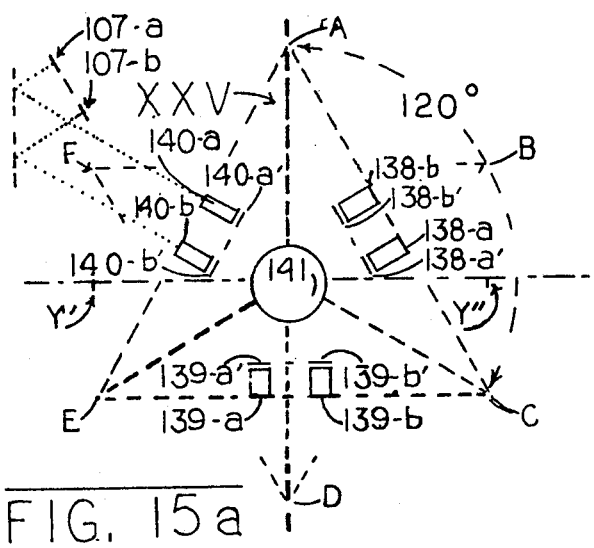
FIG. 15a
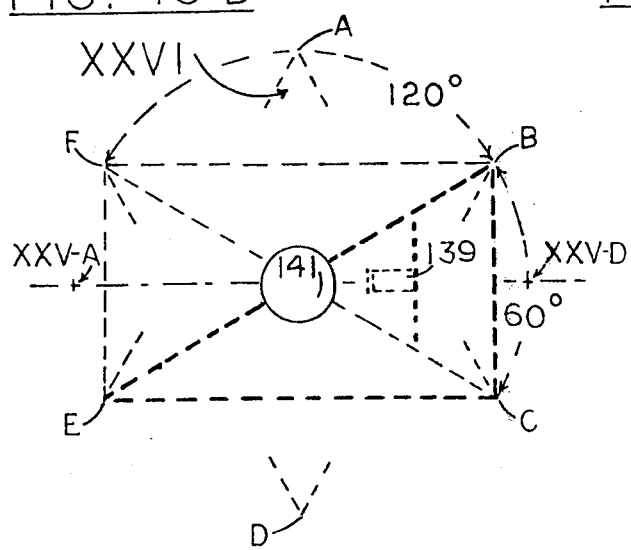
FIG. 15b
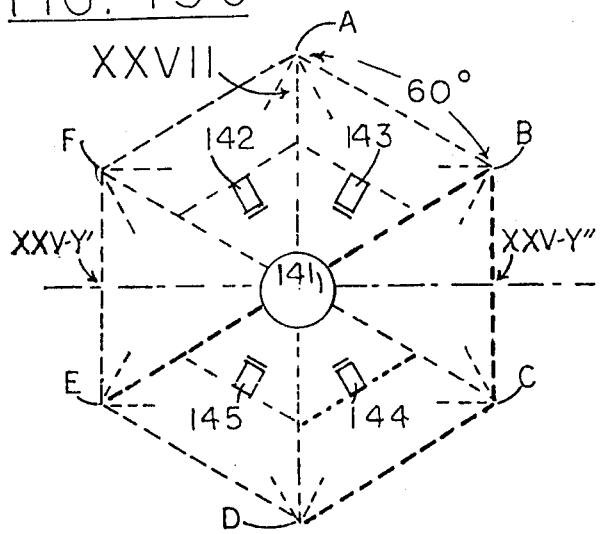
FIG. 15c
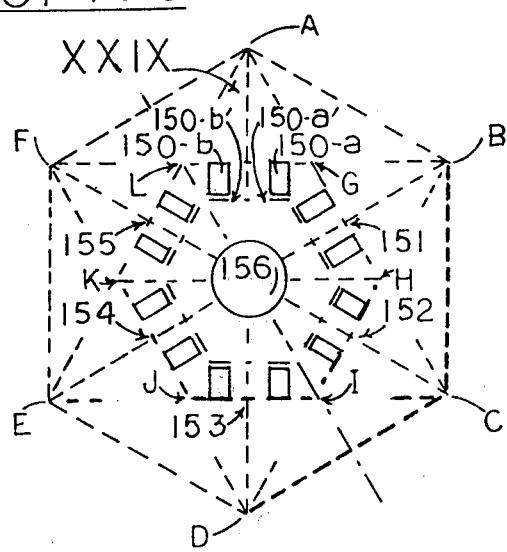
FIG. 15d
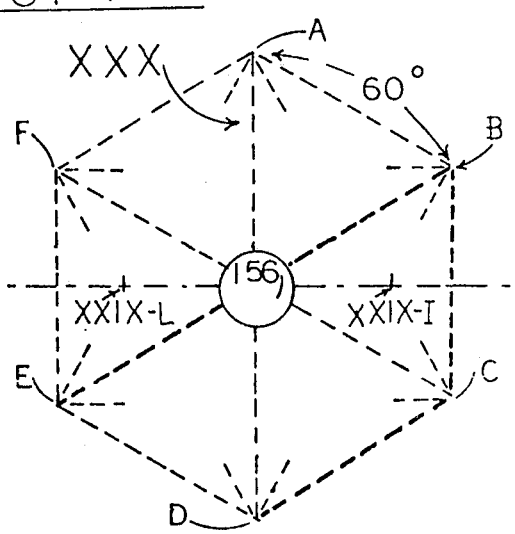
FIG. 15e
FIG. 15f

CIRCUMFERENTIAL STEREO SPECTACULAR WITH A MOSAIC IN A SCENE

This is a continuation-in-part of prior application, Ser. No. 302,901 filed on November 1, 1972, by said Henry Merritt Farnum for: a circumferential stereo spectacular, 360° horizontally and vertically, with mosaic in scene, which issued as U.S. Pat. No. 3,989,362 on Nov. 2, 1976.

SUMMARY OF INVENTION

It is a feature of this invention that a scene to be photographed is recorded by a camera on film at selected points in a predetermined pattern for recording different fields of view in a scene to be photographed which selectively extends beyond a mosaic. As a further feature, said camera rotates at a uniform speed in a predetermined pattern, and at least one projector is mounted on the optical axis of said camera for projecting the images recorded on said film back to the portion of said cyclorama corresponding to the respective portion of said scene. As a further feature, an object is positioned at a selected location in said mosaic comprising a stage and within the field of view of said camera. As a further feature, the size of said object is a selected ratio of life size in a model of said scene. As a further feature, said film selectively comprises a continuous image on a loop of said film. As a further feature, said camera selectively is a video camera and said projector selectively a video tape or video record projector. As a further feature, said camera selectively comprises two lenses for recording left hand and right hand stereo images. As a further feature, said mosaic is in predetermined relationship to said cyclorama for display comprising a generally symmetrical geometric figure. It is a further feature of this invention that said mosaic selectively comprises a plane, or a plurality of said planes in a parallel relationship.

It is apparent that said video tape or video record selectively may be displayed, for example, on an electronic screen or a cathode ray tube.

CITATION OF PRIOR ART

In this specification a camera comprises rotatable recording means selectively with reflecting means, for recording a scene on film.

Said rotatable reflecting means is old in the prior art of conventional cameras.

Therefore it is old to mount a rotatable reflecting means which reflects a scene to a lens of a camera, for rotating said reflecting means instead of rotating said camera (*McGraw-Hill Encyclopedia of Science and Technology*, Vol. 13, pages 294–295).

"Rotating mirror cameras . . . using stationary film and moving the image by means of a rapidly rotating mirror," are well known in the prior art of conventional cameras (*McGraw-Hill Encyclopedia of Science and Technology*, 1971, Vol. 10, p. 173, "High-speed photography.")

[In a streak camera] " . . . the camera rotor was run up to approximately 100 rps . . . ." [*International Congress of High Speed Photography*, Robert Nilsson and Lars Hoberg, Eds. (N.Y.: John Wiley & Sons, 1968), "Rotating Mirror Streak Camera . . . ."]

Further, in said conventional cameras ". . . continuous film movement is used with optical compensation for image motion . . . ." [*McGraw-Hill Encyclopedia of Science and Technology*, 1971, Vol. 10, p. 173.]

Said rotating mirrors in astronomical photography are for following a selected object in space for astronomical photographs. Said conventional cameras with stationary film are for recording a very fast-moving object within a limited field of view, on a strip of film limited, for example, to the circumference of a drum.

DETAILED SPECIFICATION

Objectives of the art of construction of a structure, a scene, an artistic object, a spectacular, or a model thereof, include efficiency, the resultant economy, and the artistic effect achieved in construction and design.

Those products of the art of construction are useful in the community. The foregoing efficiency, economies, and artistic results also are important in the design and construction of those products in the entertainment industry where lifelike structures and events are depicted with the immediacy and excitement of reality, as in theatres, on stage, at international expositions and world's fairs, and in the production of television and motion picture film and videotape.

An object of this invention is to achieve simplicity, flexibility, and universality in the construction of those structures, scenes, artistic objects, spectaculars, models and designs, with at least nine efficiencies hereafter set forth. The object is economy in the cost of materials and structural elements used, in the cost of their design and use in construction, and in their permanent usefulness and interchangeability for diverse, multiple purposes, by features comprising advances over the prior art. It is a further object of this invention to communicate to a human observer the excitement, immediacy, and thrilling presence of his total environment. For example, the participant experiences three-dimensional stereo in a spectacular above, beneath, and around his vantage point circumferentially, 360° vertically and 360° horizontally, amidst total theatre on the live center stage built by economical, universal construction devices, all the foregoing by the teaching of this invention.

A spectacular, a cyclorama, a structure, and a realistic scene, each is created for its functional purpose. A model of each is created for a purpose such as drafting or design, or to create the appearance of reality.

Examples include a structure in the community, a dramatic stage in a theatre, the features and structures of an exposition (such as the New York World's Fair in 1964–1965), a cyclorama and an amphitheatre, or a theatre-in-the-round with circumferential audience.

A spectacular is viewed, for example, from the standpoint of a participant in a theatrical production, or from the viewpoint of a spectator in an audience. The observation point of the observer may be within or outside of the scene. The effect upon the observer is his participation in the sense of reality. When such participation transcends the illusion, the event itself becomes the reality. Then the observer remembers the event as a high point in his lifetime.

It is apparent that the cost of building and revising the design of a spectacular, structure, scene, and model is important, including the efficiencies in such construction to reduce costs.

Nine of those efficiencies (hereafter "nine efficiencies") follow:

1. Efficiency in fabrication of a single, original structural element.
2. Efficiency in duplicating the original structural element.

3. Efficiency in volume production of similar structural elements by use of modern technology and materials.
4. Interchangeability among structural elements.
5. Efficiency in cost of location of a structural subcomponent without measurement, and without construction of a special means such as a hole for such location.
6. Inherent rigidity of each enclosed triangle in each plane constructed with said structural elements, and in each enclosed solid comprising a plurality of said planes each comprising enclosed triangles.
7. Economy resulting from the inherent adaptability of each plane comprising a six-pointed star or segment/thereof, to be disengaged at each corresponding vertex of at least one said star, with the results of easy portability and storage of each structure designed for that advantage.
8. Efficiency in relocation of each structural subcomponent elsewhere within the structure to visualize a change in design, or to revise said design.
9. Efficiency in re-application of structural elements for new uses, so that it is unnecessary to to discard a structural element after its original purpose has been accomplished.

Thus it is apparent that such linear structural elements are adapted to structures varying in magnitude by a factor of hundreds to one (e.g., a one inch tetrahedron, and also a tetrahedron with a side 9 feet long). It will be shown that the Nine Efficiencies characterize each corresponding dimension within the tetrahedron, a solid, and also on its surfaces.

A curved structural element is here defined as an element other than linear. In contrast with linear structural elements, curved elements, including spherical elements, inherently lack the nine efficiencies. Thus curved elements in the prior art must be re-engineered whenever the respective radius of each structure changes by a few percentage points or less, and whenever small, minute tolerances in dimensional locations are exceeded by dimensional variations in the curved or spherical structure.

An entertainment such as an amphitheatre comprising the center arena of an international exposition or world's fair is educational and exciting. Said event combines the reality of the exposition site, with imaginative structures created by the teaching of this invention, and with projected color scenes, in stereo, which this invention creates circumferentially around, above, and beneath the observor.

Thus the observer experiences the immediacy of a total environment created instantaneously, with views to the horizon upward and beneath, in every direction, sensing/the reality of any geographical location however remote, and transported in time by the representation of any event in history, or in the future.

To the extent that the observer's field is enlarged by this invention to 360° both horizontally and vertically, the visual and peripheral fields of the observer are saturated by sensations, whatever mobility the observer exercises by eyes, head, or body, within the environment. To the extent that the visual field of the observer is enveloped for the complete range of his vision, such as 180° on a horizontal plane, said visual field comprising, for example, a natural scene such as a World's Fair shown in FIG. 9 with a mosaic and with a stage to be recorded and projected on a cyclorama substantially filling said range of his vision as shown, for example, in FIGS. 14-*a* and 11-*b;* and 180° on a vertical plane; his visual senses are saturated while he moves freely within a defined area.

When the invention further reproduces synchronous sound and other stimuli to each of the human senses, the event is experienced by the observer with the immediacy of reality, recorded by each of his senses responding to its respective stimulus.

Structural elements with nine efficiencies are set forth in FIGS. 1 thru 4, with a special feature in FIG. 16.

FIG. 1 shows a single plane comprising said structural elements. The pattern of symbols in FIG. 1 for designating structural means, is followed when feasible thruout the specification to designate corresponding means.

FIG. 1-*a* shows said pattern for the first triangle, shown in detail in a horizontal view in FIG. 1-*b*, and in a vertical view in FIG. 1-*c*.

FIG. 1-*d* shows said pattern in a six-pointed star enclosed in a larger triangle.

FIG. 1-*e* shows a horizontal view of the detail of FIG. 1-*d*.

FIG. 1-*f* shows a vertical view, which shows the location in FIG. 1-*e* of structural members 1, 3, 4, 6, 7, 8, and 9.

FIG. 2 shows certain connectors for said structural members. FIG. 2-*a* shows a horizontal view of connector 12. FIG. 2-*b* shows a horizontal view of connector 13. FIG. 2-*c* shows four horizontal views of the connection of two planes by said connectors, and FIG. 2-*d* shows a vertical view of the same structure. FIG. 2-*e* shows a vertical view of the face and side of subconnector 14. FIG. 2-*e* further shows a vertical view of the relationship of a pair of similar subconnectors, 14 and 14'.

Special features of structural elements with integral connectors are shown in FIG. 16. FIG. 16-*a* shows a horizontal view of structural element I-3'. FIG. 16-*b* shows a vertical view of structural elements I-3' and I-2'. FIG. 16-*c*/shows certain detail of location 3'-*a* in FIG. 16-*b*. FIG. 16-*d* shows certain detail of location 2'-*a* in FIG. 16-*b*.

FIG. 3-*a* shows a horizontal view of three said planes supported in a parallel relationship. FIG. 3-*b* in its solid lines shows a vertical view of section ED in FIG. 3-*a*. FIG. 3-*b* in its dashed lines indicates the relationship of vertical supports 17 and 20, said supports shown in FIG. 3-*a*.

Figure 5A:
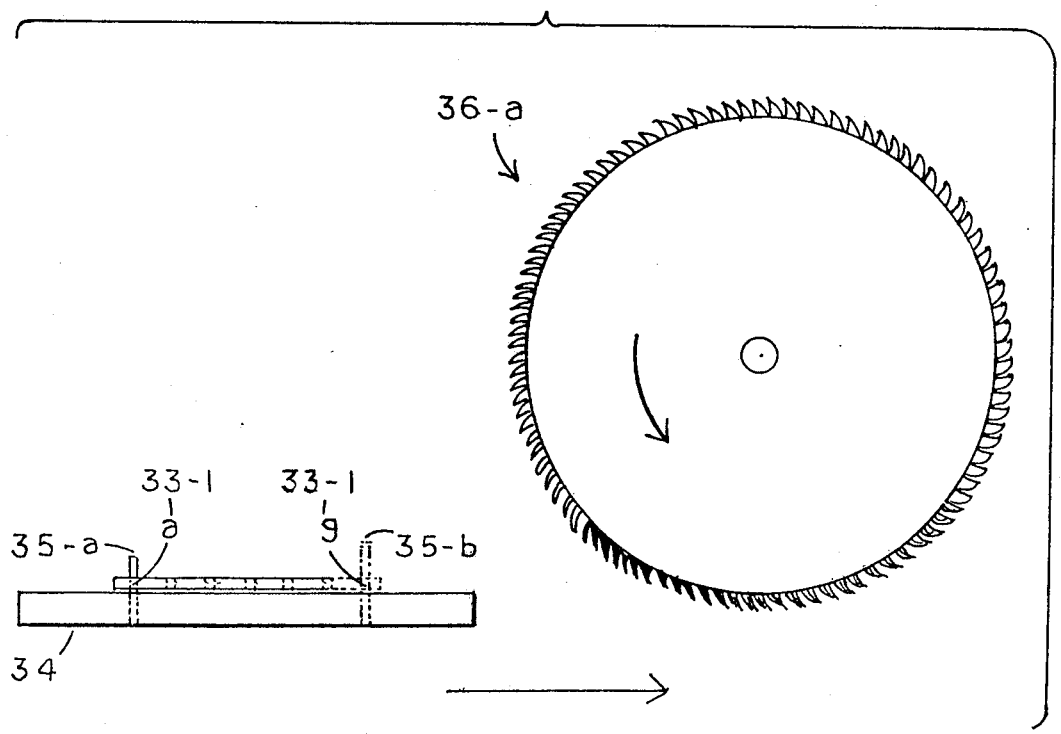
FIG. 5 shows an embodiment of a manufacturing method for certain structural elements.
Figure 5B:
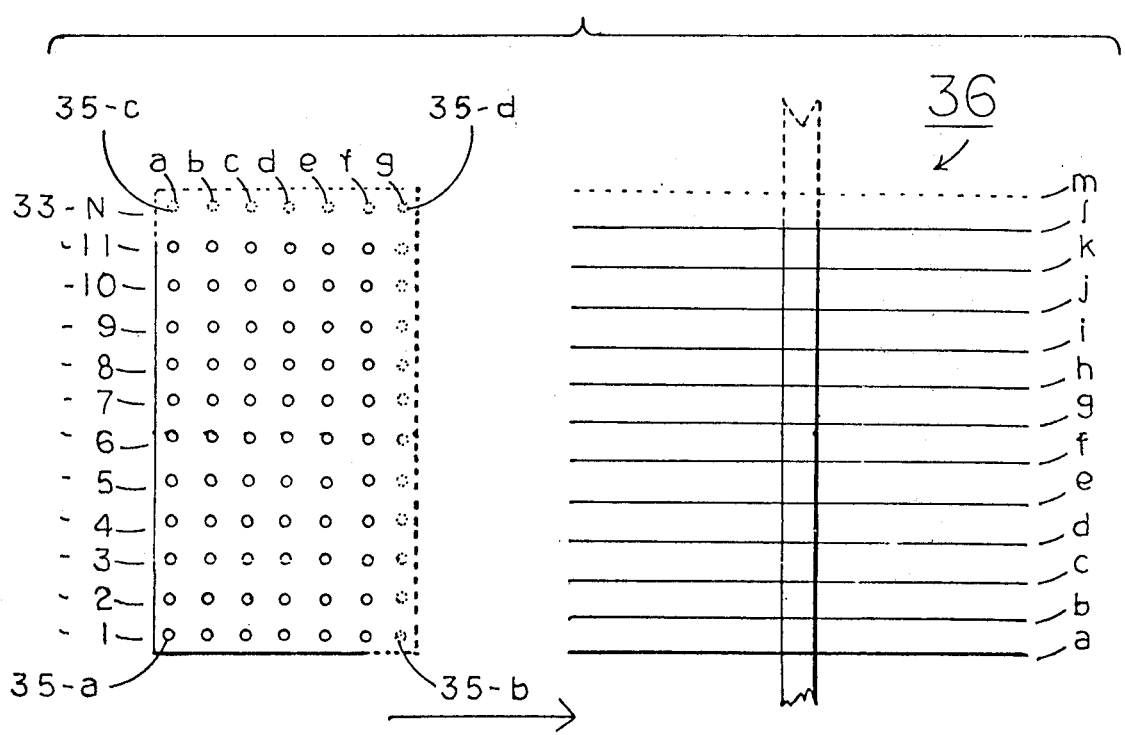

FIG. 5-*a* comprises a vertical view.

FIG. 5-*b* comprises a horizontal view.

Figure 6:
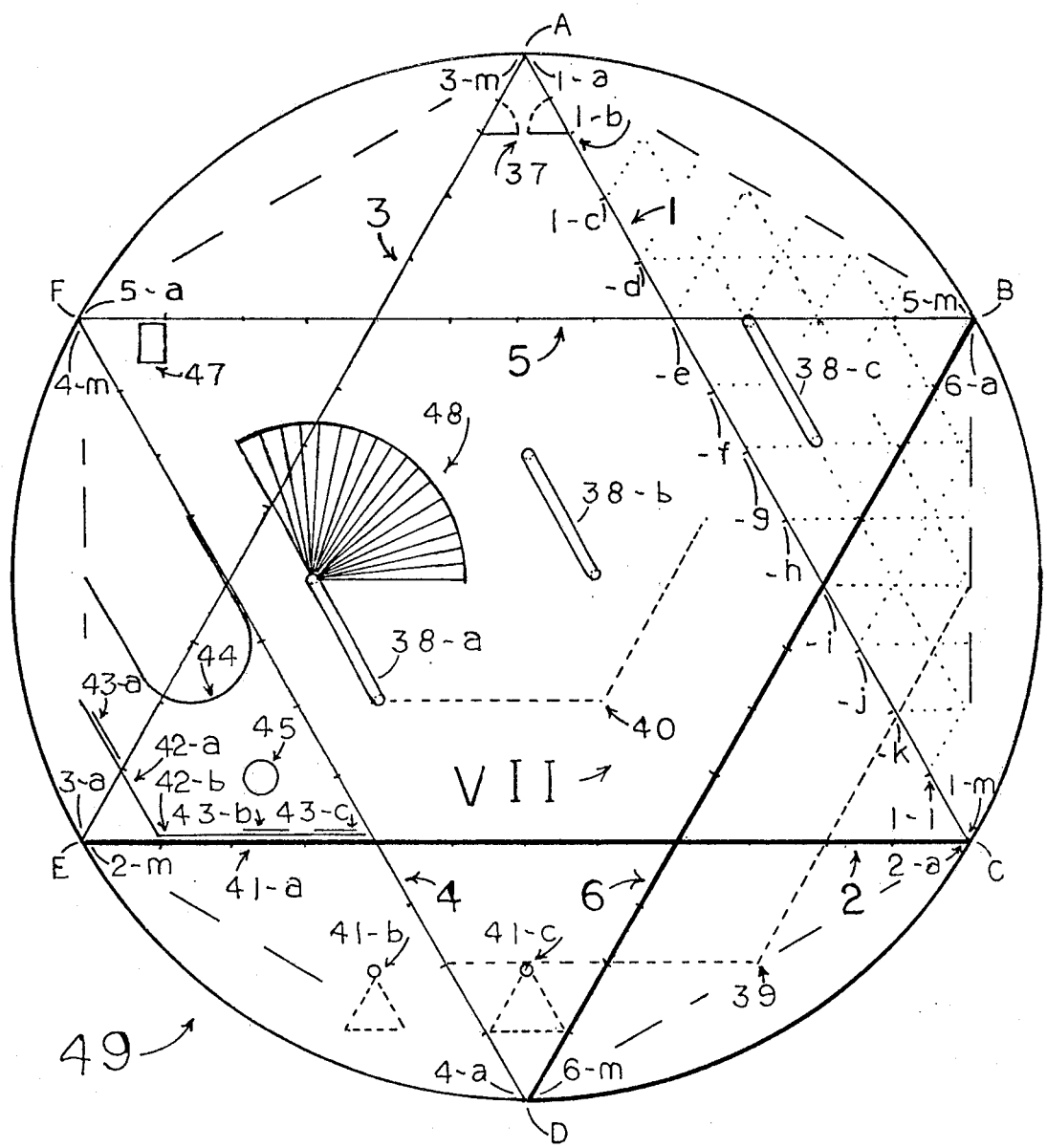
Figure 7:
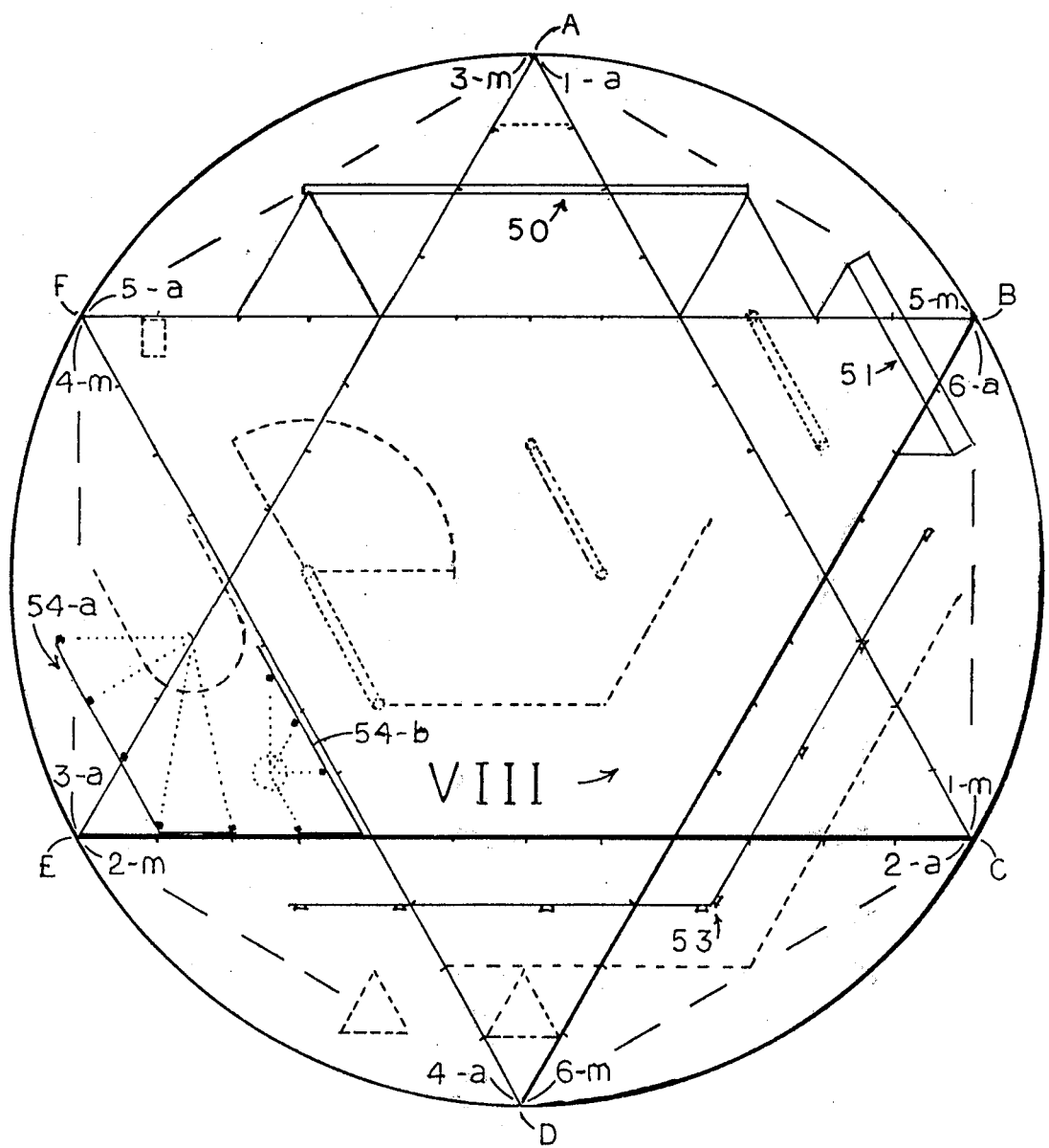
Figure 8:
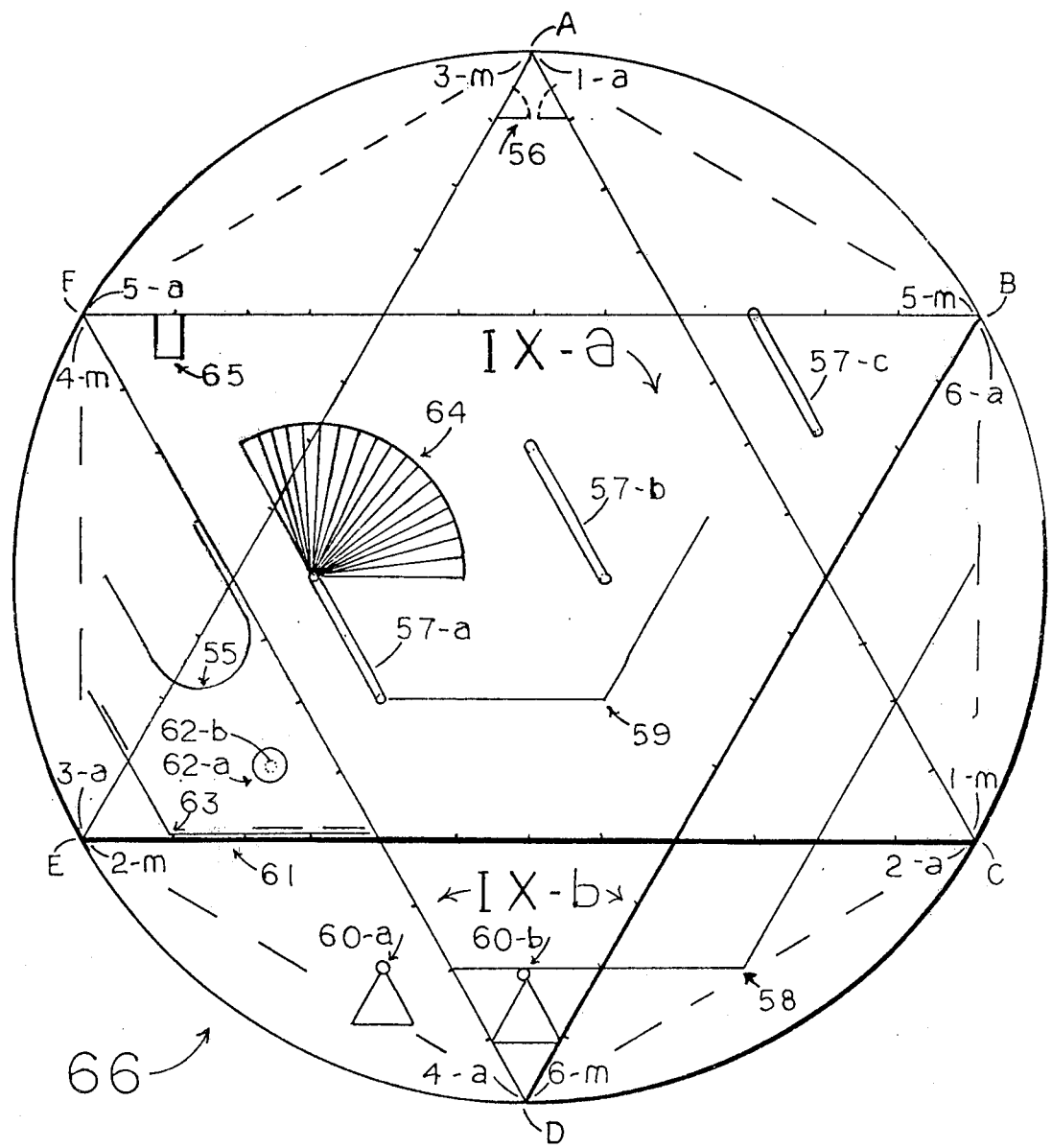

FIGS. 6, 7, and 8 each comprise a horizontal plan of an embodiment of the invention, with a sound stage selected as the structure, and the drama "Macbeth" by William Shakespeare selected as the example.

The drawings in FIGS. 6 and 7 each shows its respective structures on a scale of 1/32 inch per foot. FIG. 6 shows Macbeth's castle at the performing level.

FIG. 7 shows the overhead light bridges and special effects overhead, for the stage shown in FIG. 6.

FIG. 8 shows the horizontal plan of a model of a similar structure. Said model reproduces each respective live stage, on a scale of ¼ inch per foot. Said model, as shown, reproduces only two levels. It reproduces the performing level of Macbeth's castle shown in FIG. 6. It also reproduces the lower level comprising the rocks and sea beneath the promontory 61 on which Macbeth's castle is built, and the manor slope 59, leading/upward to the castle terrace 57. The ratio between said model and said drawing is eight to one.

FIGS. 9, 10, 11, and 12 show an embodiment of the invention, for example in an amphitheatre where the observor experiences the visual and other physical sensations of the New York World's Fair of 1964–1965.

Figure 9:
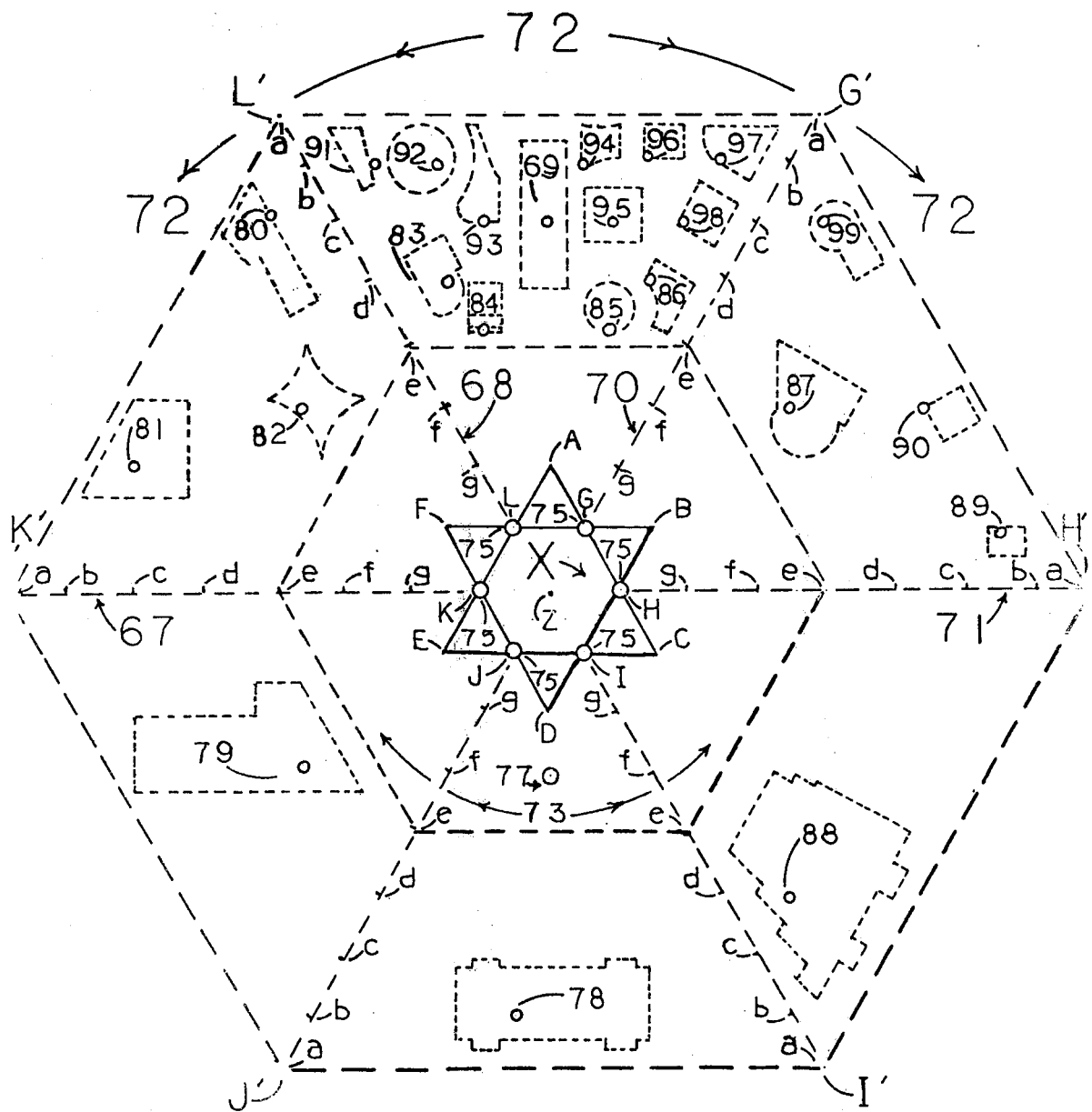

FIG. 9 shows a horizontal plan, on a scale of 1/96 inch per foot. In FIG. 9, the lines of dashes represent the pavilions and landscape in the foreground of the circumference of the spectacle surrounding the observer, who is situated in the arena or central stage in the area where the Unisphere is constructed. The scene is photographed in color stereo to the horizon, 360° circumferentially and 180° vertically. The foreground of said scene photographed, is shown by lines of dashes in FIG. 9. The amphitheatre comprising the central stage is shown by solid lines in FIG. 9.

FIG. 10 shows the stereo camera, for example, which/photographs said scene.

FIG. 10-a shows a horizontal view of the horizontal index XI for said stereo camera 103, comprising the 360 degree/hexagonal circumference.

FIG. 10-b shows the 360° vertical index for said camera, including the 180° overhead.

FIG. 10-c shows a vertical view of said camera and its boom 101.

Figure 11A:
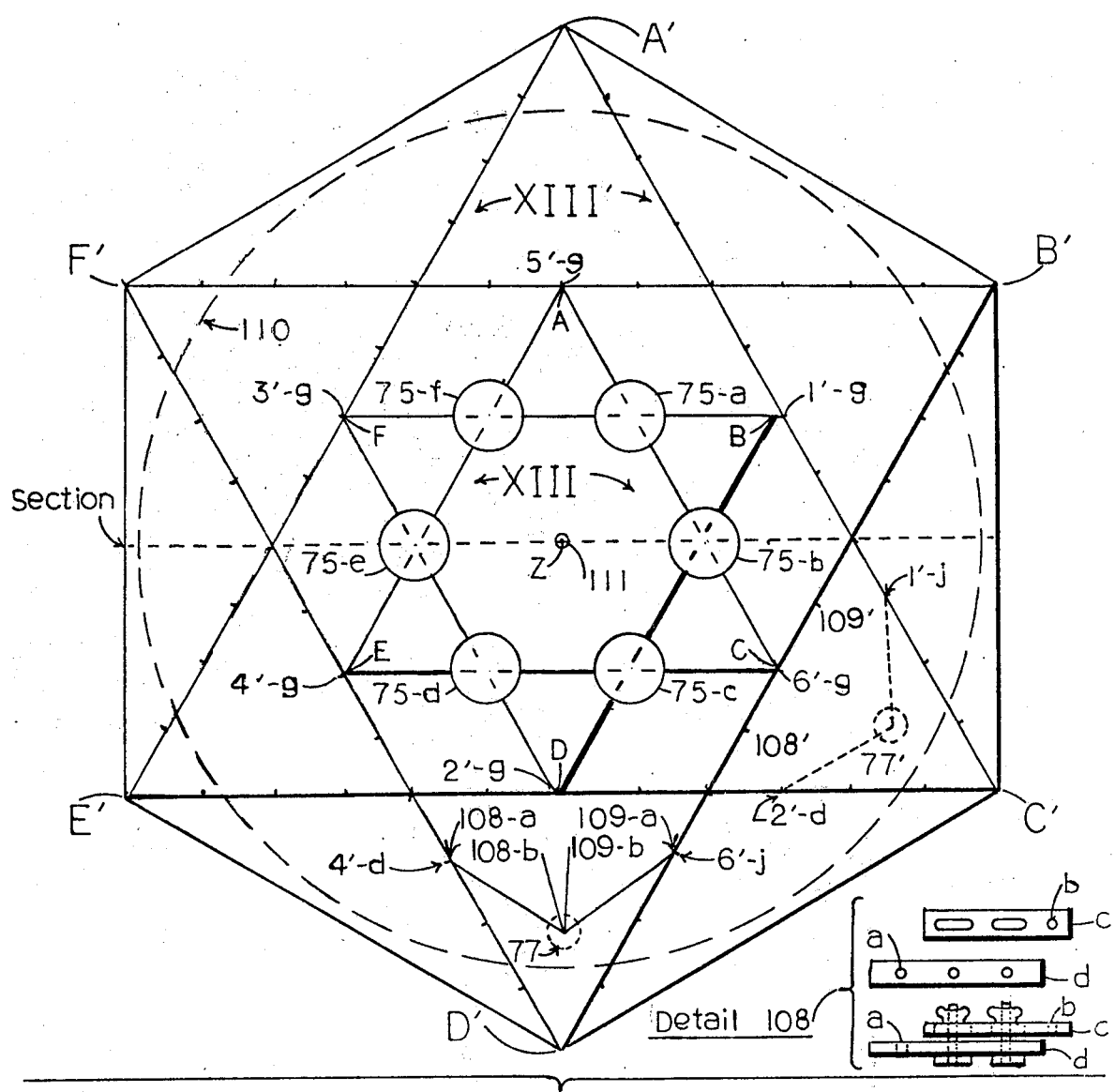
Figure 11B:
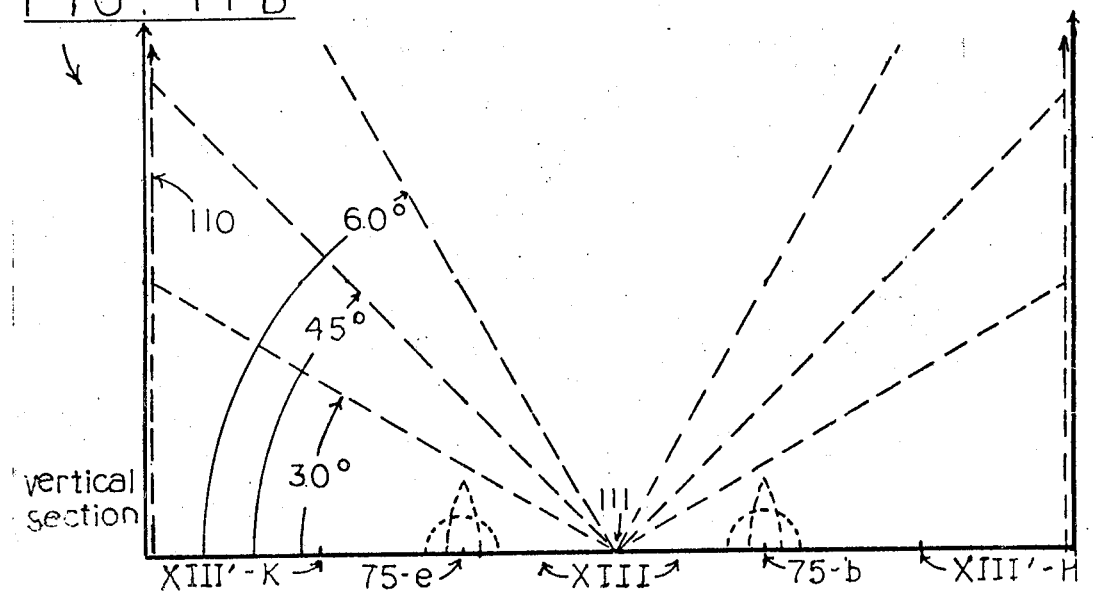
Figure 12A:
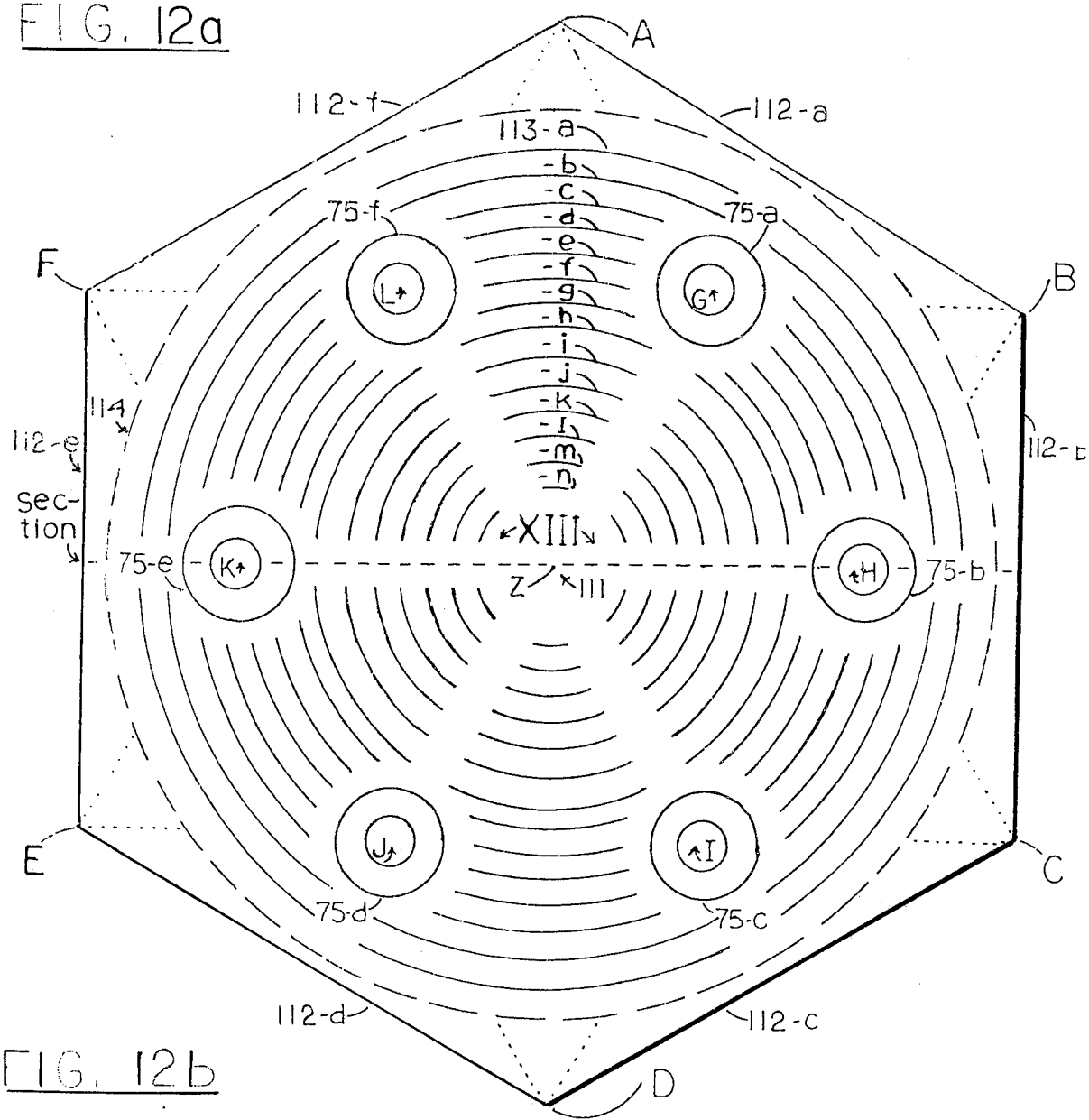
Figure 12B:
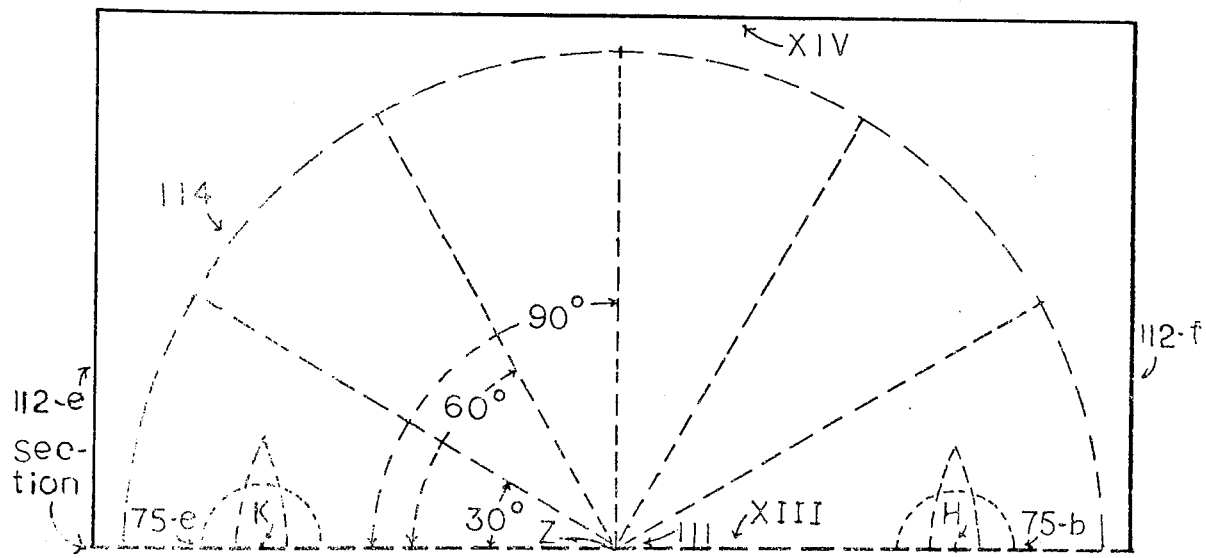

FIGS. 11 and 12 show embodiments of applicant's invention, corresponding to the amphitheatre comprising the central stage in FIG. 9.

FIG. 15 shows certain detail of the stereo projector shown in FIG. 12.

FIG. 11-a shows a horizontal view of the six fountains 75 in the central amphitheatre, shown flowing with water in the vertical view in FIG. 11 b, therein surrounded 360° circumferentially by the displayed color scenes, in stereo, creating on all sides to the horizon the New York World's Fair of 1964–1965 photographed as shown in FIG. 9.

FIG. 12-a similarly shows a horizontal view of said six fountains with seats 113 for an audience facing outward "centrifugally", i.e. with line of sight to the horizon circumferentially for 360°.

FIG. 12-b shows a vertical view of FIG. 12-a, including the color scene, in stereo, displayed 180° vertically overhead.

Figure 13A:
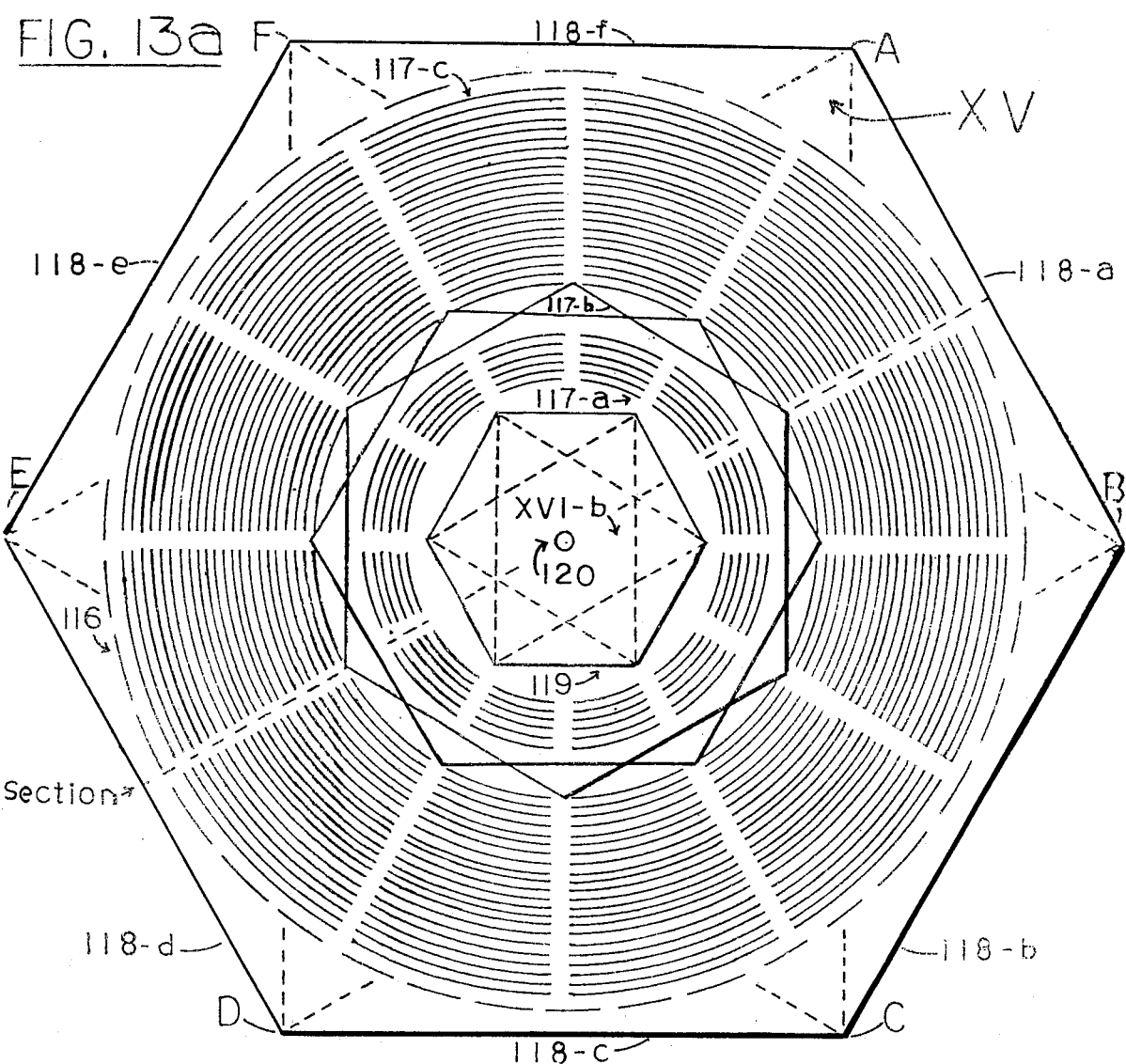
Figure 13B:
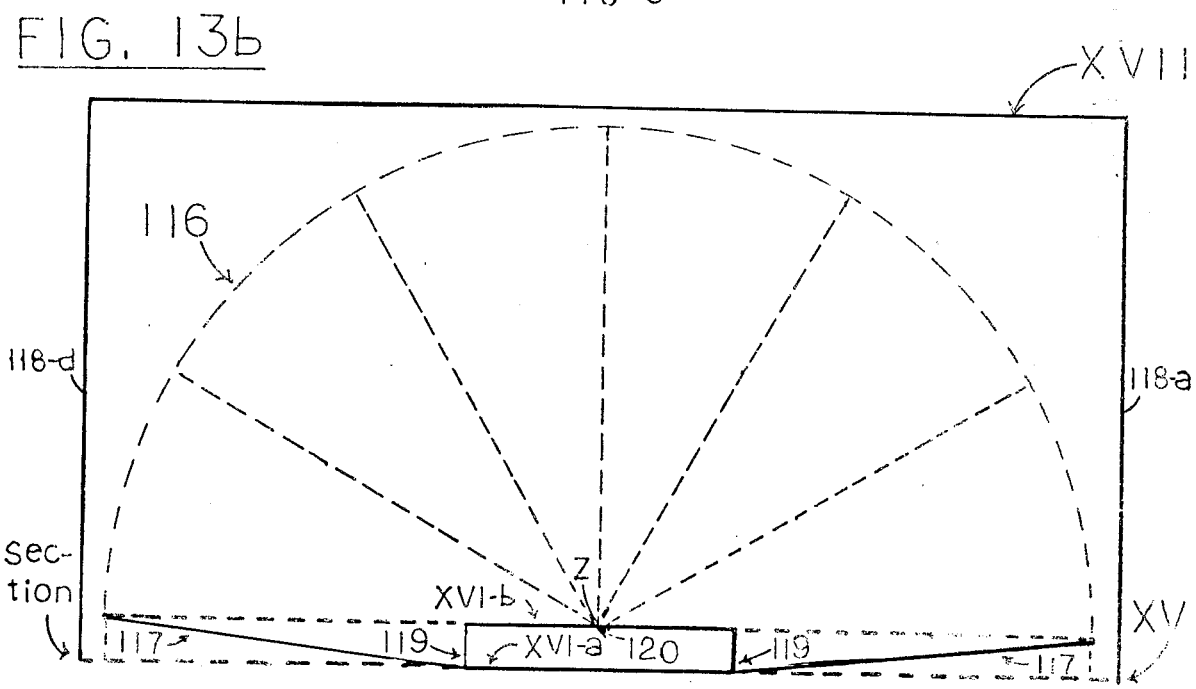
Figure 16A:
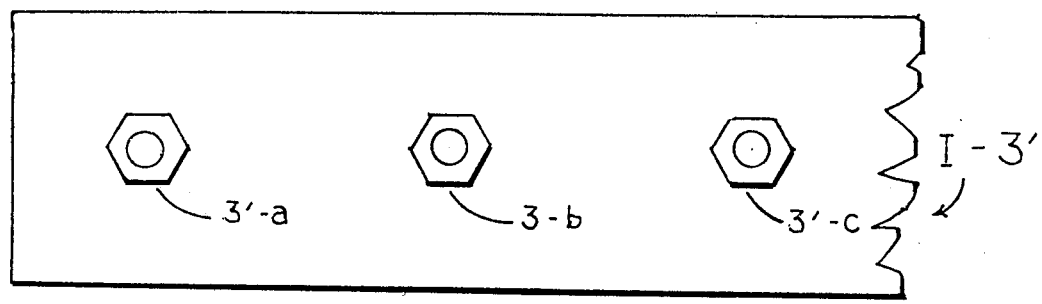
Figure 16B:
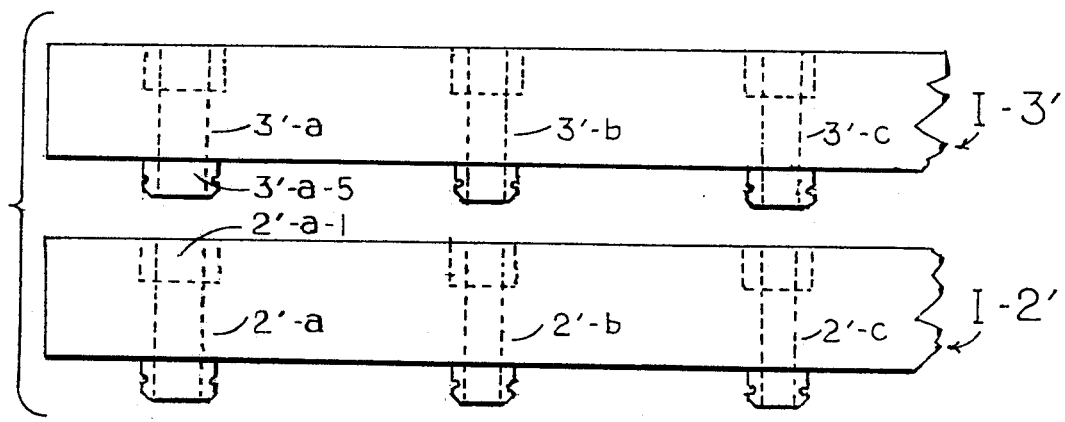
Figure 16C:
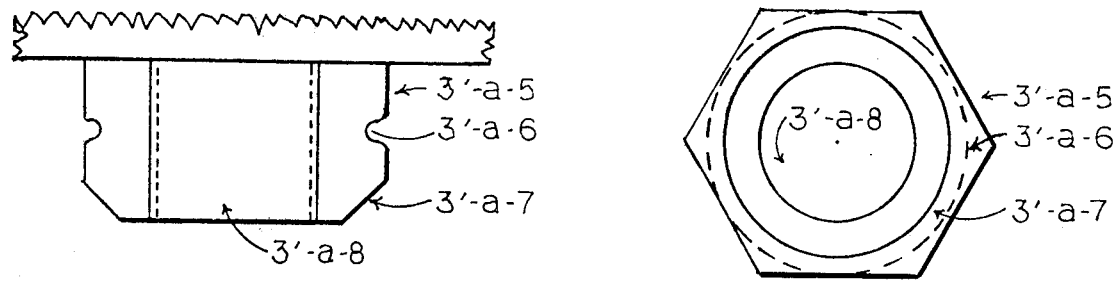
Figure 16D:
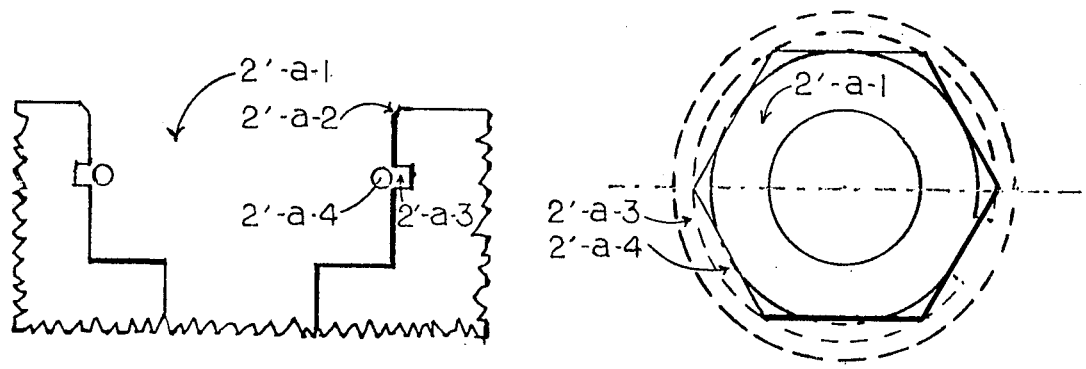

FIG. 13 similarly shows an amphitheatre with its seats for an audience facing inward or "centripetally", for example at a theatre-in-the-round.

FIG. 13-a shows a horizontal plan with seats 117 facing inward surrounding the center stage which there comprises the foreground of the stereo scenes displayed circumferentially.

FIG. 13-b shows a vertical view of FIG. 13-a, including theatre-in-the-round XVI-a, and also scenes displayed 180° overhead.

FIG. 14 shows additional embodiments of the invention.

FIG. 14-a shows a horizontal view, including an entrance.

FIG. 14-b shows a horizontal view with display comprising Xograph reproductions, and FIG. 14-c shows a vertical view of the same with the display vertically 360° above and beneath the observer.

FIG. 14-d shows a horizontal view of an embodiment including stereo motion picture scenes, and FIG. 14-e shows a horizontal view of an irregular cyclorama and structure 133.

Displays shown in FIGS. 15-b and 15-c comprise vertical sections of FIG. 15-a.

FIG. 15-d shows a horizontal view of a display corresponding to FIG. 15-a.

FIG. 15-f shows a vertical section of the display shown in FIG. 15-e.

For FIG. 16, integral connectors, of. supra, FIG. 2.

Figure 17A:
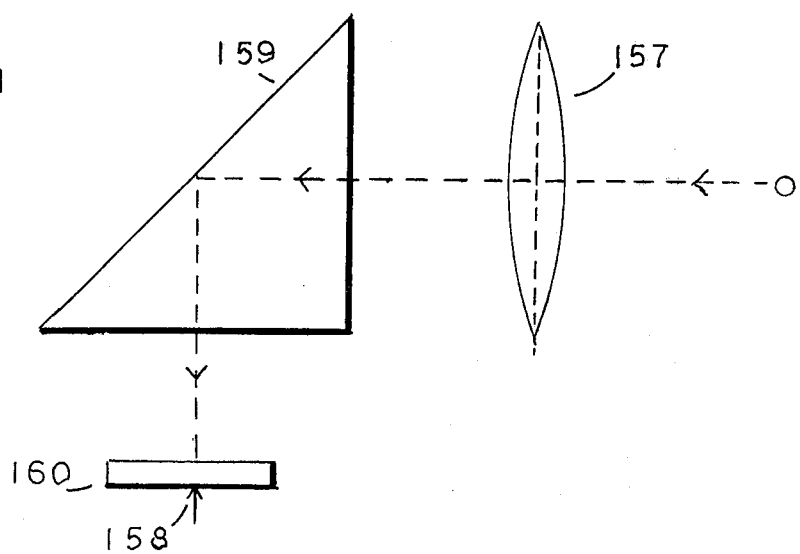
Figure 17B:
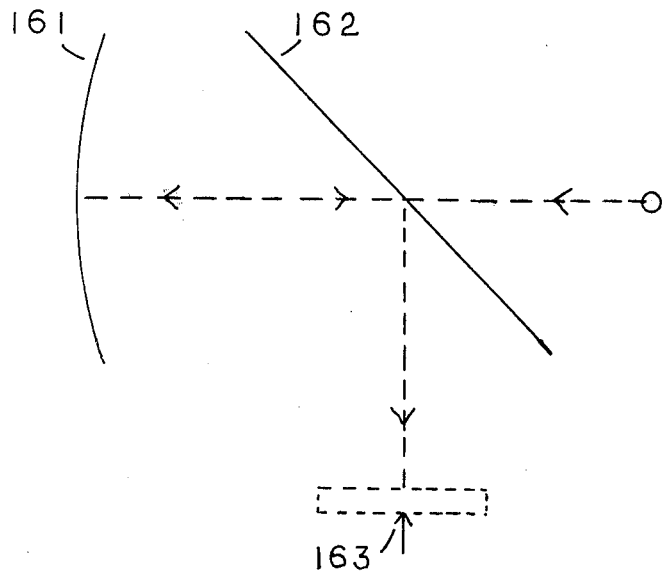
Figure 17C:
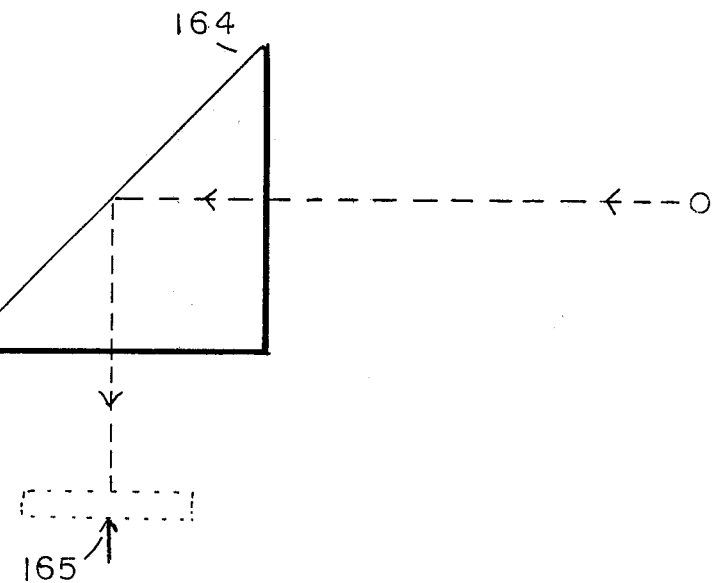

FIG. 17 shows schematic views of rotating relfecting means, selectively comprising focusing means.

FIG. 17-a shows rotating focusing means comprising a convex lens,

FIG. 17-b shows rotating focusing means comprising a concave mirror, and

FIG. 17-c shows rotating reflecting means comprising a right angle prism.

STRUCTURAL ELEMENTS WITH THE NINE EFFICIENCIES

Preferred embodiments of the invention are shown in FIGS. 1 thru 4, with special features in FIG. 16, to achieve each of the nine efficiencies in a solid structure.

Figure 2A:
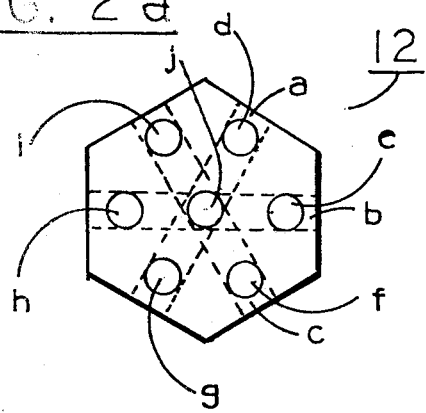
Figure 2B:
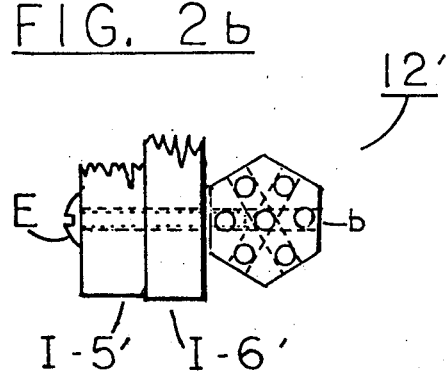
Figure 2C:
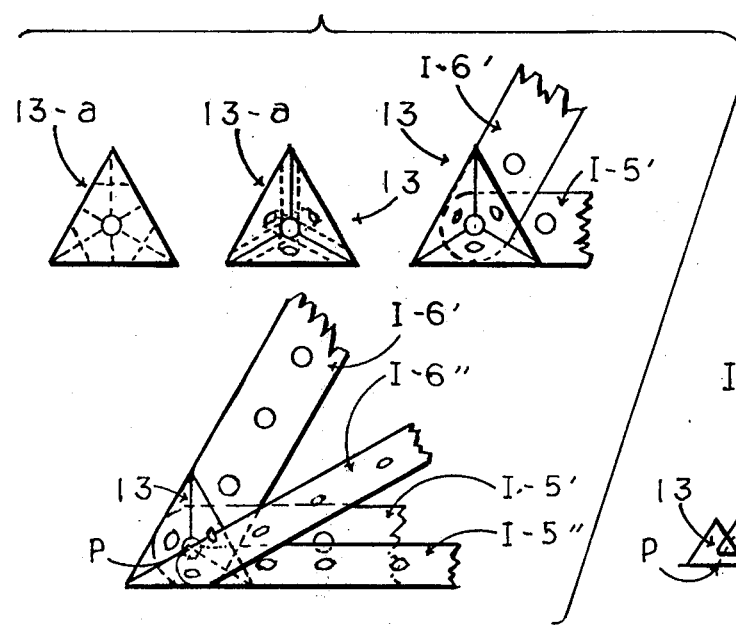
Figure 2D:
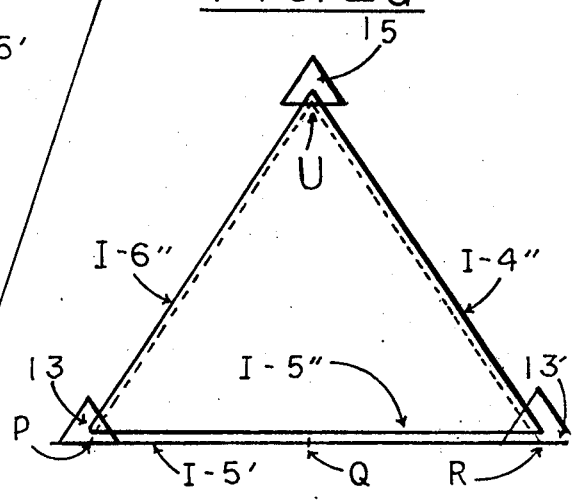
Figure 2E:
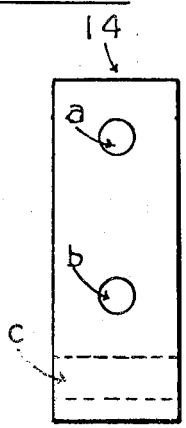
Figure 2F:
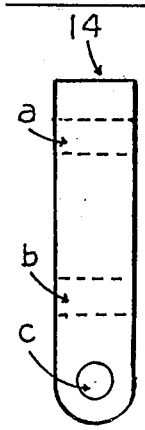
Figure 2G:
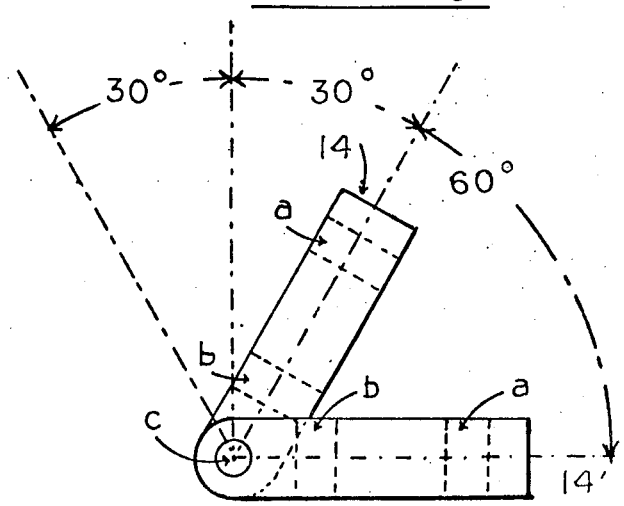
Figure 3A:
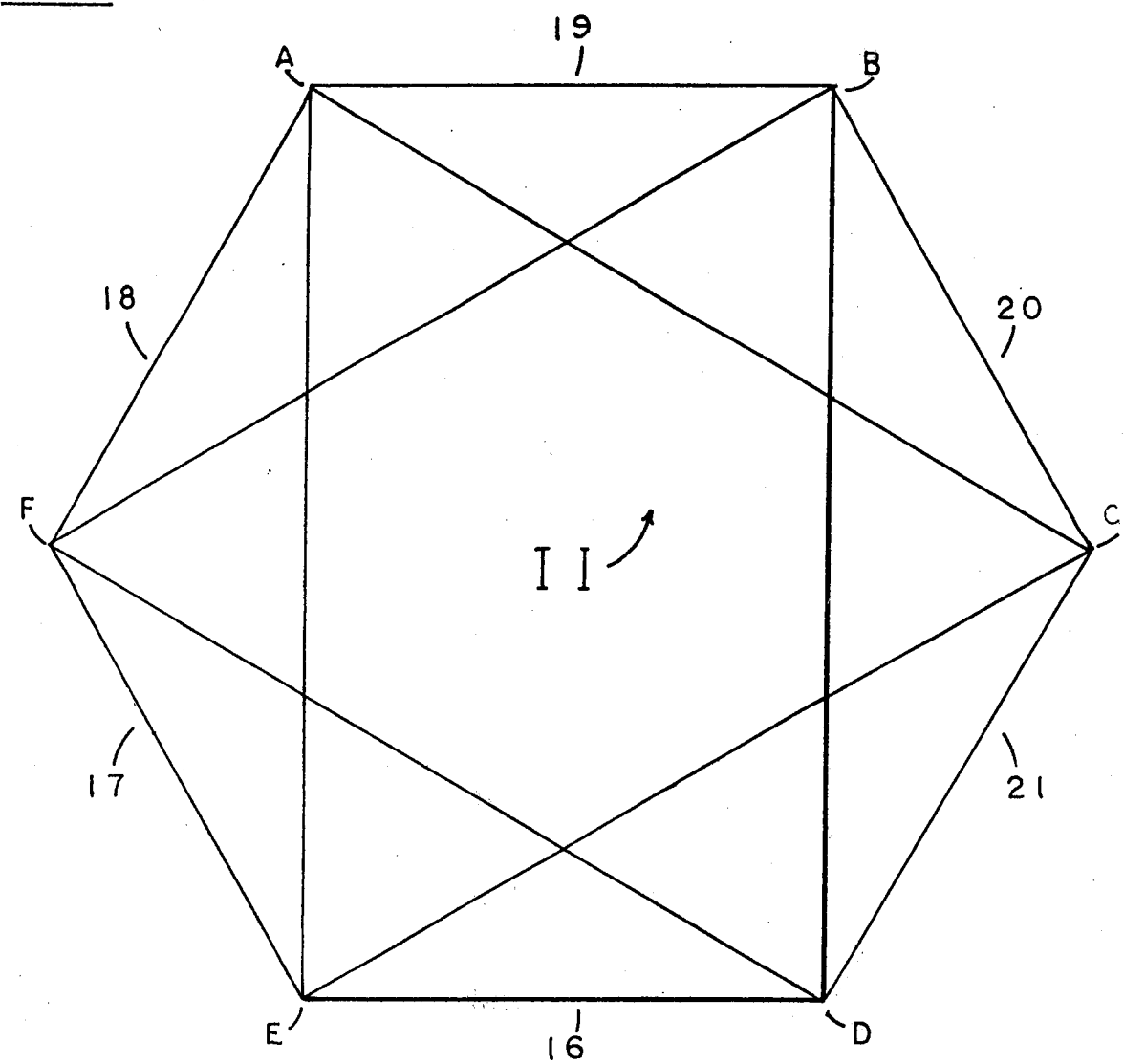
Figure 3B:
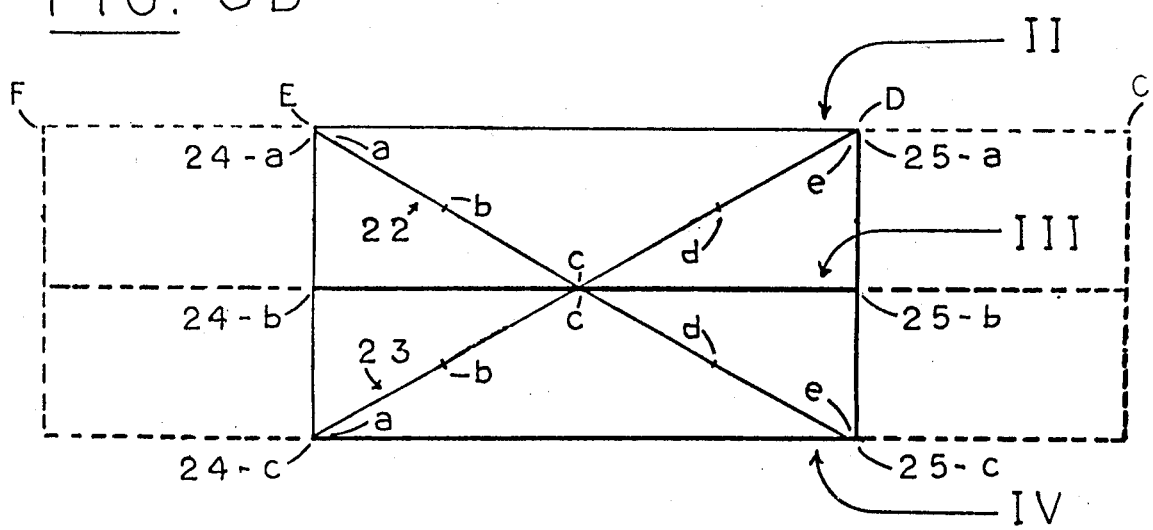
Figure 4A:
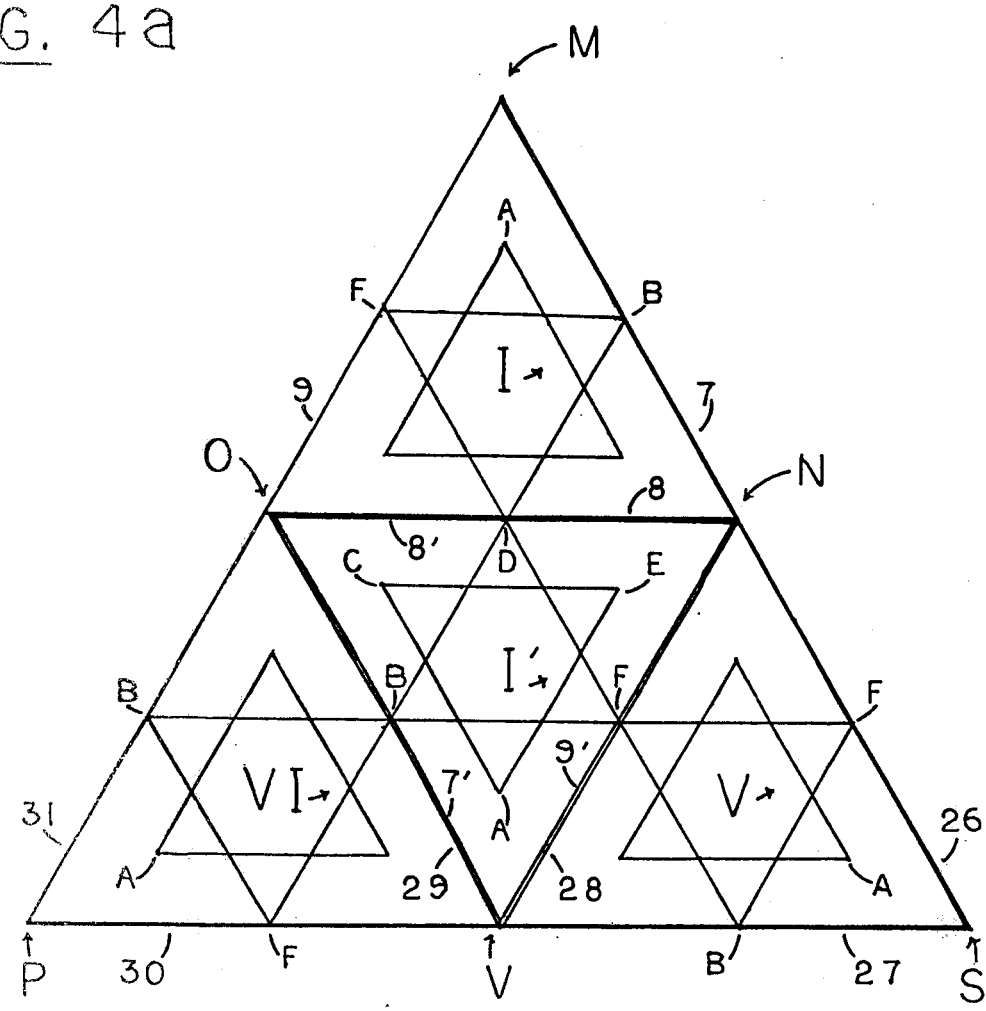
FIG. 4 shows a solid structure, tetrahedron 32 in a horizontal view in FIG. 4-*b*, constructed by four equilateral triangles shown in a horizontal view in FIG. 4-*a*.
Figure 4B:
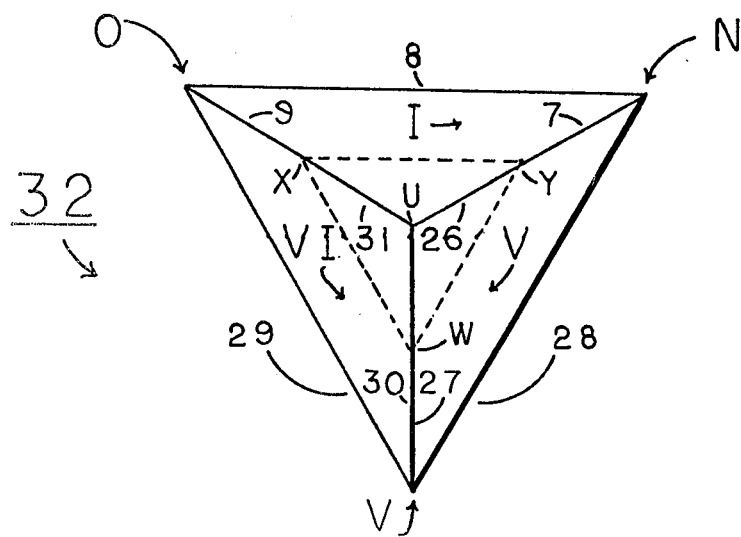

FIG. 1 shows a single plane of said structure. FIGS. 2 and 16 show certain means for connecting structural elements. FIG. 3 shows three said planes supported in a parallel relationship. FIG. 4 shows a solid, tetrahedron 32, constructed/by four said planes.

TWO-DIMENSIONAL STRUCTURE (A SUPPORTING PLANE).

In FIG. 1 each structural element comprises a girder of rigid material, laminated pegboard, with determinable locations at equal increments, thruout its length. Each girder is ⅞ inch wide by ⅜ inch thick, with holes ¼ inch in diameter spaced at 1 inch increments thruout the length of the ⅞ inch surface to form a structural element, or girder. It is apparent that many alternative materials known to the art of construction, each adapted to its respective purposes, similarly may be used. Said alternative materials include metals such as aluminum and steel; plastics including rolled, extruded, and injection-molded; wood; and many other materials, with various dimensions.

In FIG. 1, six identical structural members, or girders, are shown, designated respectively as 1, 2, 3, 4, 5, and 6. In each girder its first location is designated "a", with its additional six holes designated in sequence as shown at girder 3 in FIG. 1-b, namely, locations 3-b, 3-c, 3-d, 3-e, 3-f, and 3-g. The center of each hole measures one inch from the center of its nearest adjacent hole, so that the distance from location a to location g is 6 inches.

FIG. 1-a shows girders 1, 2 and 3 in a horizontal view, with vertices A, C and E respectively, in the pattern of symbols used to designate corresponding means whenever feasible thruout this specification.

FIG. 1-b shows a horizontal view of the detail of the means shown in FIG. 1-a. Inasmuch as each girder in this embodiment comprises flat material, the girders shown in FIG. 1-b are displaced from a flat plane by the thickness of each respective girder. Therefore, round spacer 10, the thickness of a girder (e/8 inches), is inserted at vertex A in FIGS. 1-b and 1-e with the result that the horizontal surfaces of each of respective girders are parallel to a common plane.

Inasmuch as each location in each girder comprises, in this embodiment, a hole one-quarter inch in diameter, the means shown in vertical view FIG. 1-c to connect said girders, comprises one-quarter inch wooden dowel pins snugly slidable within a one-quarter inch hole. Many other equivalent fastening means will be shown and described hereafter in this specification, including machine screws and threaded holes, bolts and nuts, and pins to engage snap rings.

In FIG. 1-b, girders 1, 2 and 3 are fastened at vertices A, C, and E, to construct an equilateral triangle, with six inches between each vertex. The usual triangle shown in this specification comprises an equilateral triangle.

FIG. 1-c shows a vertical view of the means shown in FIG. 1-b.

In FIG. 1-d, girders 1 thru 6 are connected to construct a six-pointed star, comprising its six points at vertices A, B, C, D, E, and F, said figure designated as star I. Star I is shown located inside of a larger triangle comprising girders 7, 8, and 9. The pattern of symbols for designating the girders and vertices of star I in FIG. 1-d, is followed thruout this specification when feasible, to designate corresponding means. Said pattern of symbols thus is adhered to, unless stated otherwise, irrespective of the scale of size in which a six-pointed star is constructed, or the number of locations in each respective girder. Said locations, each separated by its respective minimum increment of distance, are designated, in sequence, by the symbols $a$, $b$, $c$, etc., up to and including the maximum plurality of said locations in each respective girder. Also, the six vertices comprising hexagon GHIJKL shown in FIG. 1-e, are designated similarly, each by its respective symbol comprising a capital letter.

FIG. 1-e shows a horizontal view of the detail of the structure shown in FIG. 1-d.

In FIG. 1-e, girders 4, 5, and 6 are connected at vertices B, D, and F, to construct triangle BDF. In FIG. 1-e at each vertex the respective fastening means, not shown, comprises means similar to each fastening means shown in FIG. 1-c. In FIG. 1-e, triangle ACE is interlaced with triangle BDF, and connected by pins at vertices G, H, I, J, K and L, each said pin inserted thru locations $c$, and $e$, respectively of each girder as shown, to construct six-pointed star ABCDEF, designated star I. Each of the six structural elements comprising star I, is six inches in length.

In said star I, each pair of girders 1 and 4, 2 and 5, and 3 and 6, have the same relationship to their common plane as the corresponding girder in FIG. 1-c.

In FIG. 1-e, girders 7, 8 and 9 each have thirteen locations, each location separated from its adjacent location(s) by equal increments, said locations shown in girder 9 and designated, in sequence, 9-$a$, 9-$b$, 9-$c$, 9-$d$, 9-$e$, 9-$f$, 9-$g$, 9-$h$, 9-$i$, 9-$j$, 9-$k$, 9-$l$, and 9-$m$. Each said girder is similar to girder 3, except for the additional length of girder 9 comprising its additional locations. Therefore the length of each of girders 7, 8, and 9, measured between its respective locations $a$ and $m$, is 12 inches.

Girders 7, 8 and 9 are connected at locations $a$ and $m$ in each respective girder, to construct an equilateral triangle comprising vertices M, N, and O, said triangle with equal sides of twelve inches. A single round spacer 11, with thickness of ⅜ inch, is inserted at vertex M in the usual manner.

Star I is shown connected within triangle MNO, by connections between vertices B, D, and F of star I, and the respective location $g$ of each of girders 7, 8, and 9. Each girder in triangle MNO is shown in the same exact horizontal plane as the plane of each parallel girder in star I. All girders in FIG. 1-e are parallel to a common plane, as shown in FIG. 1-f.

FIG. 1-f shows a vertical view of the vertical location in FIG. 1-e of structural members 1, 3, 4, 6, 7, 8 and 9, shown from the position of girder 8.

In FIG. 1-e, it is apparent that each triangle constructed between the equidistant locations of three girders comprising an equilateral triangle, similarly constructs an equilateral triangle between said equidistant locations. For example, a triangle constructed as follows will comprise an equilateral triangle comprising three sides each one inch in length: first side, girder 1, location 1-$a$ to 1-$b$; second side, location 1-$b$ to location 3-$f$; and third side, location 3-$f$ to location 3-$g$.

Similarly, a triangle constructed as follows will comprise an equilateral triangle comprising three sides each two inches in length: first side, girder 1, location 1-$a$ to location 1-$c$; second side, location 1-$c$ to location 3-$e$; and third side, location 3-$e$ to location 3-$g$; comprising triangle AGL in FIG. 1-e.

Similarly, equilateral triangles with sides of three inches, four inches, and five inches, will be constructed by connections to corresponding location of girders 1, 2, and 3 of triangle ACE. Similarly, in FIG. 1-e, triangle DEF comprises means identical to triangle ACE. And in triangle MNO, triangle MBF is identical to said triangle ACE. Therefore in triangle MNO, equilateral triangles are constructed with sides of 7, 8, 9, 10, and 11 inches respectively, by connection to corresponding locations of girders 7, 8 and 9.

Therefore any similar girder of suitable length may be connected at any selected pair of its locations, to any said equilateral triangle constructed supra in FIG. 1-e with its sides from one to eleven inches in length, respectively.

Therefore FIG. 1-e comprises a mosaic of locations, to which any similar structural elements may be connected at any corresponding locations described supra. All such structural elements will be parallel to a single horizontal plane, similar to FIG. 1-f.

Each star is adapted to fold compactly. Stars designated I thru XXX are shown in this specification. The detail of star I is shown in FIG. 1-e. Triangle MNO is disregarded for the present purpose.

Star I comprises a parallelogram with six vertices, for example, as follows: vertices G, C, J, and F construct a parallelogram comprising structural elements 1 and 4, and 2 and 5, as opposite sides; and vertices A and H, for example, each connect at a single location the other two structural elements, 3 and 6, respectively.

Said parallelogram, with two additional structural elements each attached at a single vertex thereof, selectively is folded into a compact structure comprising its six component structural elements with three parallel pairs of structural elements: 1 and 4, 2 and 5, and 3 and 6, respectively.

Therefore the disengagement of six vertices constructs the folding structure in the preceding paragraph: each apex B, D, and E, and vertices I, K, and L.

In the alternative, corresponding vertices are disengaged whereby structural 1 and 4, or alternatively 2 and 5, respectively, correspond to structural elements 3 and 6 in the alternative folding structures.

When other stars II thru XXX shown in this specification have certain adjacent structures corresponding to triangle MNO in FIG. 1-e, said adjacent structures selectively are disengaged.

Therefore each star or subcomponent thereof is adapted to be folded compactly for storage or transportation.

In conclusion, FIG. 1-e shows a mosaic in which any two corresponding locations supra may be connected to any selected, corresponding locations of every structural element of suitable length. In said mosaic, every structural element of suitable length is interchangeable. Said mosaic may be expanded to any finite size, comprising girders with any finite number of similar locations, its most extended location designated "N", with N comprising any finite multiple of one inch.

Said mosaic is constructed by the selection of a single minimum increment comprising one inch, or multiples thereof.

It is apparent that any standard distance other than one inch may be selected as the minimum increment between adjacent locations, to construct a simiar mosaic. It is also apparent that the same described features will characterize each structural element in which certain selected locations are omitted, to the extent that said locations requisite for the necessary connections are included in the respective structural element. Locations may be omitted for many reasons, including economy in manufacture, aesthetics, and rigidity in the respective structural element.

Adjacent Structural Elements.

FIG. 16 shows an embodiment of certain adjacent first and second structural elements positioned and secured by structure integral therewith, comprising integral connectors selectively at each location, Said first structural element with integral connectors selectively comprises an additional ⅛ inch threaded hole, for example, as shown in FIG. 16, said hole adapted to engage a connector to said second structural element. Embodiments of said connectors are shown in FIG. 2.

FIG. 1 shows structural elements adaptable for connection, for example, by said connectors shown in FIG. 2.

FIG. 2 shows the following connectors adapted to construct solids. FIGS. 2-a and 2-b show connectors adapted to construct solids, for example, comprising parallel planes shown in FIG. 3, or tetrahedron 32 shown in FIG. 4. FIGS. 2-c and 2-d show connectors adapted to construct, for example, said tetrahedron. FIG. 2-e shows a subconnector adapted to construct a solid comprising parallel planes, or to cooperate to construct said tetrahedron.

FIG. 2-a shows connector 12, comprising a hexagon of wood 1-¾ inch between opposite sides, and ⅞ inch thick. Equivalent materials such as metal are discussed supra.

Ten thru holes, each ¼ inch in diameter, are located in connector 12 as follows. First, second, and third said holes, designated 12-a, 12-b, and 12-c, are positioned successively thru the middle of the horizontal ⅞ inch plane of connector 12, each said hole located in the center of its respective side of said hexagon. Perpendicular thereto, on the 1-¾ inch hexagonal surface of said connector, six ¼ thru holes designated 12-d, 12-e, 12-f, 12-g, 12-h, and 12-i, each are positioned ½ inch from the center of said surface, the position of each hole perpendicular to the respective horizontal hole. Tenth ¼ inch hole 12-j is positioned in the center of said surface.

At holes 12-d thru 12-i, each opposite pair of holes is positioned 1 inch between centers. In the mosaic comprising FIG. 1-e, each structural element comprises adjacent locations selectively connected to each said pair of opposite holes.

With a first selected structural element (or two-dimensional plane) thus engaged by connector 12, a selected second structural element (or two-dimensional plane) is connected, for example to hole 12-a, to connect said structural elements (or two-dimensional planes) at a 90° angle, for example to construct a structure shown in FIG. 3 comprising parallel planes.

Connector 12 may comprise dimensions and material selected from requisite strength of material, and its intended use.

Therefore FIG. 2-b comprises connector 12' similar to said connector 12, except comprising a steel hexagon ⅞ inch between opposite sides, with each of its ten thru holes comprising a smaller hole threaded to receive a machine screw ⅛ inch in diameter.

Therefore the structural members I-5' and I-6' connected by connector 12' are similar to the structural members I-5 and I-6 shown in FIG. 1-e, except with each location comprising a hole ⅛ inch in diameter instead of ¼ inch in diameter.

Alternative embodiments include the following.

Connector 12' selectively comprises a subconnector, for example with hole 12-j' connected to or integral with connector 13 shown in FIG. 2-c.

Connector 12' selectively comprises horizontal and vertical hexagons, each similar to the horizontal hexagon comprising connector 12', said connector therefore comprising two planes connected at a 90° angle at the location of corresponding holes "*a*" in each.

In a similar, alternative embodiment, said vertical hexagon is inclined, for example, at an angle of 60° from said horizontal hexagon. The 60° included angle between adjacent holes of said vertical hexagon, and said horizontal hexagon, respectively, therefore is maintained thruout each said hexagon 360° circumferentially. In this embodiment it is noted that the first angle between said two hexagons is greater than the second angle between two corresponding holes therein, except said two holes each exactly parallel to the respective side of said first angle. Each said side is perpendicular to the vertex of said first angle. Therefore in this alternative embodiment, the angle between the respective holes "*g*" of said two planes is less than 60°, and therefore said two holes "*g*" do not contruct the surfaces of a tetrahedron.

FIGS. 2-c and 2-d show connector 13 adapted, for example, to construct a solid with each vertex comprising a 60° angle, for example tetrahedron 32 shown hereafter in FIG. 4.

FIG. 2-c shows four horizontal views of said connector 13. FIG. 2-d shows a vertical view of two planes, each similar to plane DFB in FIG. 1-b, connected by two similar connectors 13 and 13', said planes comprising two surfaces of a tetrahedron. Said connectors have ⅛ inch threaded holes, similar to connector 12'.

The four views comprising FIG. 2-c show the following.

The first horizontal view of FIG. 2-c shows the base 13-a of connector 13, said base comprising an equilateral triangle with a hole threaded to engage a ⅛ inch machine screw. The center of said hole is located at the center of said triangle, said center equidistant from each of the three vertices thereof, at the intersection of three lines each dividing its respective 60° vertex into two 30° angles. Said holes comprises a 90° angle with said base.

In an alternative embodiment, represented in FIG. 13-a by lines of dashes adjacent to each vertex, said base comprises a modified figure, for example the hexagon indicated by said line of dashes.

The second horizontal view of FIG. 2-c shows said triangle 13-a comprising the base of a tetrahedron, connector 13. Said tetrahedron comprises three sides and a base, each of its four surfaces identical to base 13-a. The ⅛ inch thru hole in base 13-a emerges at the apex of said tetrahedron. Each other thru hole is represented by lines of dashes in this view only. Each of the other three similar holes emerges thru its respective opposite vertex of connector 13.

The third horizontal view in FIG. 2-c shows connector 13 connected to a first plane comprising two horizontal structural elements, 5' and 6', similar to structural elements 5 and 6 of star I shown in FIG. 1, except each location comprising a ⅛ inch hole. Said connection is made by a ⅛ inch machine screw not shown, detail of a corresponding connection to connector 12' shown in FIG. 2-b.

The fourth horizontal view in FIG. 2-c is similar to the third view, with the vertex of a second plane comprising structural elements 5" and 6", connected to said first plane at vertex P by connector 13 at an upward inclination of 60°, to construct two surfaces of a tetrahedron.

FIG. 2-d shows a vertical view of said first plane (horizontal in FIG. 2-d) and said second plane (60° upward inclination in FIG. 2-d) connected by connector 13 at vertex P, and by similar connector 13' at vertex R.

FIG. 2-d shows the structure of FIG. 2-c, fourth view, in an expanded vertical view showing said first plane comprising a horizontal base, and said second plane at a 60° upward inclination, said planes connected by connector 13 at vertex P, and by similar connector 13' at vertex R. A third similar connector 15 is shown connected at the apex. The detail (not shown) of each said connection is similar to the detail shown in FIG. 2-c, fourth view. The third vertex of said base comprises point Q, its connector not shown.

In FIG. 2-d, it is apparent that a perfect first tetrahedron is constructed, shown by lines of dashes, comprising triangle PQR as its base. Said second plane is displaced from said first plane by an amount equal exactly to the respective dimensions of connectors 13 and 13'. Each said plane comprises a surface of a second tetrahedron, shown by solid lines. Therefore connector 15 at the apex of said second tetrahedron comprises a similar dimension to establish the location of apex U of said perfect first tetrahedron.

Therefore a perfect structure similarly may be constructed by any connectors shown in this specification, including connectors in FIGS. 2 and 16, therefore including the structural elements comprising integral connectors shown in FIG. 16.

FIGS. 2-a and 2-b show connectors adapted to construct a solid, for example comprising parallel planes, by use of structural elements shown in FIG. 1. FIG. 16 combines said connectors, structural elements, and an engaging structure comprising a snap ring, into a structural element which combines the aforesaid structures including the nine efficiencies, the connecting structure, and the engaging structure to lock said structural elements together.

Therefore the structural elements shown in FIG. 16 are adapted to construct a solid, for example the solid comprising parallel planes, shown hereafter in FIG. 3.

Similarly, FIGS. 2-c and 2-d show connectors adapted to construct a solid, for example a tetrahedron, by use of structural elements shown in FIG. 1.

In an alternative embodiment corresponding to FIG. 16, a structural element, not shown, corresponding to I-3' in FIG. 16 comprises an integral connector selectively at each location adapted to connect at least one additional structural element or plane at an angle of 60 degrees, each additional structural element or plane corresponding to an additional surface of tetrahedron 32 shown in FIG. 4.

Therefore in said alternative embodiment, structural elements shown in FIG. 16 are adapted to construct a solid, for example a tetrahedron, each said structural element selectively combining the nine efficiencies, the connecting structure, and the engaging structure to lock said elements together.

In an alternative embodiment, each other connector shown in FIG. 2 and in this specification comprises a structural element with integral connectors, not shown, corresponding to structural element I-3' in FIG. 16, similarly combining the advantages of said structural element.

FIGS. 1-a and 1-d show symbols comprising letters and numbers, to designate corresponding structural elements, vertices, and locations thruout this specification. FIG. 1-e similarly shows symbols comprising lower case letters, similarly to designate respective locations thruout this specification. Stars I thru XXX each similarly designates a structure for its respective use.

In each alternative embodiment, selected colors integral with each respective structural element or combination, not shown, codes the information represented by said symbols shown in this specification. FIG. 2-e shows an alternative method to connect two structural elements. Said method uses connectors constructed from inexpensive material such as wood strips ⅞ inch wide by ½ inch thick. In said method, a connector comprises a single subconnector, or a pair of identical subconnectors. Said subconnectors 14 and 14' are shown in FIG. 2-e.

FIG. 2-e shows a vertical view of the face and of the side of subconnector 14 with three ¼ inch thru holes. Said face of subconnector 14 shows two of said holes separated by the standard increment of one inch, to enable said subconnector to be attached rigidly to any pair of adjacent locations of any structural element shown, for example, in FIG. 1. Said vertical views of subconnector 14 show the third said hole drilled thru the side of said subconnector, at a right angle to said other two holes.

FIG. 2-e further shows a vertical view of subconnectors 14 and 14', with said third hole of subconnector 14 connected to the corresponding hole of subconnector 14' by a ¼ inch diameter fastener (not shown), whereby subconnector 14 rotates selectively to any angle in relation to subconnector 14', said included angles shown comprising 60°, 90°, and 120°. Said subconnectors 14 and 14' connect two planes similarly to each connector shown in FIGS. 2-c and 2-d, if each respective location comprises a hole of suitable diameter as described supra.

It is apparent that numerous connectors with certain selected features shown in FIG. 2 may be manufactured, within the spirit of the invention. Connectors may comprise angle irons, extruded plastic, molded plastic, and other equivalent means and materials.

With the teaching of this specification it is apparent that structural elements may be assembled or injection molded, for example, into a flat plane of uniform thickness corresponding, for example, to the planes shown in FIG. 1, when modular construction is desired rather than the universality of structural elements comprising girders. Many other modifications and combinations of the means described in this invention, within the spirit of this invention, will be apparent to persons skilled in the art.

STRUCTURAL ELEMENTS COMPRISING INTEGRAL CONNECTORS.

FIG. 16 shows certain special features of structural elements with an enlarged view of an integral connector at each location. Structural elements 2' and 3' are shown manufactured of plastic by injection molding, to correspond with the general dimensions of structural elements 2 and 3 of star I in FIG. 1. The integral connectors hereafter described in FIG. 16 are manufactured substantially or entirely as integral features of said structural elements by methods which include techniques well known in the art of injection molding.

FIG. 16-a shows structural element 3' comprising integral connectors 3'-a, 3'-b, 3'-c, shown in a horizontal view.

FIG. 16-b shows a vertical view of structural elements 2' and 3'. Structural element 2' comprises its integral connector shown at locations 2'-a, 2'-b, and 2'-c, with certain detail of said connector shown in a horizontal view in FIG. 16-d. Structural element 3' comprises its integral connectors shown at locations 3'-a, 3'-b, and 3'-c, with certain detail of connector 3'-a shown in a horizontal view in FIG. 16-c. Integral connector 3'-a is shown with its protrusion 3'-a-5. Integral connector 2'-a is shown with its hexagonal recess 2'-a-1, with certain detail thereof shown in FIG. 16-d.

FIG. 16-c shows a detailed, horizontal view of the hexagonal protrusion 3'-a-5 at location 3'-a in FIG. 16-b. Said protrusion comprises ¼ inch hexagon 3'-a-5, its recess 3'-a-6 adapted to engage a suitable snap ring, its bevel 3'-a-7 for easy engagement with said snap ring, and its ⅛ inch diameter hole, 3'-a-8.

FIG. 16-d shows a detailed, horizontal view of the hexagonal recess at location 2'-a in FIG. 16-b, and its associated structure. Said detail comprises hexagonal recess 2'-a-1 adapted to fit protrusion 3'-a-5, bevel 2'-a-2 for easy insertion of a snap ring during manufacture, recess 2'-a-3 adapted to receive the permanent insertion of said snap ring including ample space for expansion of said snap ring during its engagement with protrusions 3'-a-5, and snap ring 2'-a-4 inserted as a step in manufacture of structural element 2'. It is apparent, as an alternative method of manufacture, that hexagonal recess 2'-a-1 may comprise a cylindrical insert into a larger hole comprising the expanded diameter of snap ring 2'-a-4, with said cylindrical insert cemented into place after the insertion of snap ring 2'-a-4 as a step in manufacture.

Therefore any of the six circumferential positions of hexagonal protrusion 3'-a-5 may be selected for its insertion Into hexagonal recess 2'-a-1; at location 2'-a in structural element 2'. Structural element 3' thereby is held parallel to structural element 2' by snap ring 2'-a-4, which engages concave recess 3'-a-6.

Said parallel relationship between structural elements 2' and 3' selectively may comprise a straight line, or an angle in FIG. 16-b horizontally thru the circumference of 360°, in increments of 60°, the angle of said relationship being determined by the respective positions of hexagonal protrusion 3'-a-5, and hexagonal recess 2'-a-1.

Therefore it is apparent that the planes shown in FIG. 1 may be constructed by a similar structural elements with integral connectors, similar to said elements shown in FIG. 16.

It is further apparent that many similar means of connection may be used. Thru holes 3'-a-8 and 2'-a-8 are adapted to receive any suitable type of connector heretofore shown in FIGS. 1 and 2, ⅛ inch in diameter. Said thru holes may be threaded to fit a machine screw ⅛ inch in diameter. Each type of connector described for FIG. 2, alternatively may comprise a protrusion similar to the means shown in FIG. 16-c, at each location, to engage a snap ring corresponding to 2'-a-4.

PARALLEL STRUCTURES (A SOLID).

FIG. 3-a shows a horizontal view of three planes similar to star I in FIG. 1, supported in a parallel relationship. FIG. 3-b in its solid lines shows a vertical view of said three planes, supported by vertical supports hereafter described.

FIG. 3-a shows six-pointed star II similar to star I in FIG. 1-e. Six vertical supports, all similar, are shown, each connected to two points of star II by a pair of subconnectors similar to subconnectors 14 and 14' shown in FIG. 2-e, each said connector (not shown in FIG. 3-a) adjusted at an angle of 90 degrees between the respective point of star II, and its respective vertical support. For detail of star II, and all similar means, reference is made to FIGS. 1 and 2, said detail not shown in FIG. 3 and other Figures hereafter, except as noted otherwise specifically.

FIG. 3-a, star II is connected at its vertices D and E to vertical support 16 in the manner shown in FIG. 3-b. In FIG. 3-a, vertices E and F similarly are connected to vertical support 17; vertices F and A, to vertical support 18; vertices A and B, to vertical support 19; vertices B and C, to vertical support 20; and vertices C and D, to vertical support 21.

In FIG. 3-b, first vertical support 16 comprises two pairs of girders, each pair identical. Girders 22 and 23 each are identical to girder 1 in FIG. 1-a, escept that each comprises five locations, with its distance from location a to location e comprising four inches. Girders 24 and 25 are identical to girder 1, except that each comprises three locations, so that the distance from its location a to location c comprises two inches. In said vertical support 16, first vertical girder 24 is connected to girders 22 and 23 at locations 24-a and 24-c, respectively. Location 24-a is connected to location 22-a of first diagonal grider 22, and location 24-c is connected to location 23-a of second diagonal girder 23. Diagonal girders 22 and 23 are reinforced by a connection at their meeting point comprising locations 22-c and 23-c. Second vertical girder 25 is connected at location 25-c to location 22-e of first diagonal girder 22, and at location 25-a to location 23-e of second diaganal girder 23.

Vertical supports 17, 18, 19, 20, and 21, are similar to first vertical support 16 in FIG. 3-b, comprising similar girders, each similarly connected at its corresponding locations.

In FIG. 3-b, location 24-a of first vertical girder 24 is connected to vertex E of star II, and location 25-a of second vertical girder 25 is connected to vertex D of star II, as described supra, with star II supported horizontally by six vertical supports as shown in FIG. 3-a.

In FIG. 3-b, star III is connected to locations 24-b and 25-b of first vertical support 16, in a manner similar to the connection of each respective location a to star II. In FIG. 3-a star III, not seen and parallel to horizontal star II, is connected to vertical supports second thru sixth, in a manner similar to that shown for star II therein.

In FIGS. 3-a and 3-b, star IV is connected to locations c of each vertical girder in vertical supports first thru sixth, in a manner similar to that shown for stars II and III.

Therefore, in FIG. 3 each vertex A of stars II, III, and IV, is connected by similar connecting means to its respective location of first vertical girder 24 in first vertical support 16. Similarly, each of vertices B, C, D, E, and F, are connected to corresponding means in each of the six vertical supports. Stars II, III, and IV are thus supported horizontally, with each parallel to the others.

Therefore vertex A in each of stars II, III, and IV, is in exact perpendicular alignment, in a straight vertical line. Similarly, every vertex in stars II, III, and IV is located respectively in a straight vertical line.

Star II is similar to star I shown in FIG. 1-e. Therefore, in FIG. 3 every location shown or described in the mosaic of star I in FIG. 1-e, is exactly perpendicular in a straight line at the corresponding locations of stars II, III, and IV.

It is apparent that each vertical support girder corresponding to girders 24 and 25 in FIG. 3-b, may comprise a similar girder with additional length comprising additional, similar locations. It is apparent that any additional star similar to star II may be connected in a similar manner to any said additional locations, whereby the mosaics of each of stars II, III, IV, and said additional stars, each will be exactly perpendicular in a straight line at the corresponding locations of all said stars.

FIG. 3-b in its dashed lines indicates the relationship of vertical supports 17 and 20, to first vertical support 16 shown in solid lines.

Therefore in FIG. 3, each of the nine efficiencies are achieved in the mosaic of each of stars II, III, and IV, and in vertical supports 16 thru 21 similarly to the mosaic in star I in FIG. 1-c.

TETRAHEDRON STRUCTURE (A SOLID).

FIG. 4 shows four planes similar to plane MNO shown in FIG. 1-e, assembled into a three-dimensional solid, tetrahedron 32.

FIG. 4-a shows first plane MNO in a horizontal view. Its details not shown here were shown in FIG. 1-e. Plane MNO comprises seventh, eighth, and ninth girders 7, 8, and 9, and star I, similar to corresponding means in FIG. 1-e, except with each location here comprising a hole with a diameter of ⅛ inch. instead of ¼ inch as in FIG. 1-e.

In FIG. 4-a, three additional planes are shown identical to said plane MNO, said four planes comprising a large triangle, plane MSP. The second plane, NSV, comprises first girder 27, second girder 28, and third girder 26, enclosing star V. Third plane OVP comprises first girder 31, second girder 29, and third girder 30, enclosing star VI. Said first, second, and third planes enclose fourth plane NVO, comprising first girder 7', second girder 8', and third girder 9', enclosing star I'.

FIG. 4-b shows a horizontal view of the structure shown in FIG. 4-a, with planes MNO, NSV, and OVP connected to construct a tetrahedron with its base comprising plane NVD, and with its apex designated U. Said planes are connected at a sixty degree angle in relation to each adjacent plane, by connectors (not shown) similar to connector 13, with its detail of connection shown in FIGS. 2-c and 2-d, and described therewith, supra. There it is shown and described that said connector 13 connects its respective structural element to correspond to any selected location of a perfect tetrahedron.

In FIGS. 4-b, in tetrahedron 32, it is apparent that vertex B of star I meets vertex F of star V (shown in FIG. 4-a). Similarly, vertex B of star V meets vertex F of star VI at point W; and vertex B of star VI meets vertex F of star I at point X. Therefore, the distances W to X, X to Y, and Y to W, each are identical to distance FB in star I. Plane WXY is connected to tetrahedron 32 by connectors similar to connector 13, in the manner shown in FIGS. 2-c and 2-d. Therefore plane WXY is identical to triangle ACE in star I', in the base of tetrahedron 32, and is identical to its corresponding triangle ACE shown in the plane comprising FIG. 1-e.

Therefore, within the three-dimensional solid of tetrahedron 32, any location in the mosaic of triangle ACE in its base, is intersected by a line exactly perpendicular to the corresponding location in the mosaic of parallel plane WXY. From FIG. 1-e it is seen that the horizontal distance determined by an elevation totaling two increments, said elevation comprising for example the distance between locations e and g of structural element 9, corresponds to a single horizontal increment, for example the distance between locations j and k of horizontal structural element 8.

Similarly, each equilateral plane within the mosaic of plane NVO comprising the base of tetrahedron 32, selectively may be constructed in a parallel plane connected to the corresponding locations of tetrahedron 32. In each mosaic thus constructed, it is apparent that each location is intersected by a line exactly perpendicular to the corresponding location in base NVO, within the solid comprising tetrahedron 32.

Similarly, in the construction of tetrahedron 32, first plane MNO, second plane NSV, and third plane OVP comprise the surfaces of tetrahedron 32 shown in FIG. 4-b. Said three planes are identical to base NVO. Therefore any structural element connected to any said mosaic within the solid comprising tetrahedron 32, similarly may be connected to the corresponding locations within the mosaic comprising each of the said surfaces of tetrahedron 32.

It is apparent that tetrahedron 32 may be expanded to any order of magnitude, to comprise similar planes within its solid, and similar planes comprising its respective surfaces, with each respective mosaic of said planes and surfaces characterized by the same features as tetrahedron 32, supra.

Similarly, each surface of tetrahedron 32 is identical to its base NVO. Therefore tetrahedron 32 selectively may be rotated to establish any surface as its base, with its respective planes within said solid, and respective surfaces, characterized by the same features as tetrahedron 32, supra.

Therefore any plurality of tetrahedrons with common surfaces are characterized by the same features as tetrahedron 32, supra.

It is apparent that said features depend upon the equilaterial triangle, in each plane, in each solid, and in its respective mosaic, whereby each included angle comprises 60°, or multiples thereof.

Therefore tetrahedron 32, expanded to any order of magnitude, comprises said planes within the solid, and said surfaces, each with mosaics characterized by the nine efficiencies which characterize the mosaic shown and described in FIG. 1-e.

EMBODIMENT WITH SIMPLICITY IN METHOD OF MANUFACTURE--EXAMPLE.

FIG. 5 shows an embodiment of a manufacturing method for the structural elements shown in FIG. 1. The means in FIG. 5 comprise pegboard 33, saw table 34 movable by usual means (not shown) at a 90 degree angle to the arbor of gang saw 36, rotary gang saw 36 with its respective blades *a* thru *m*, and locating means 35.

FIG. 5-*a* shows a vertical view of pegboard 33, resting horizontally on saw table 34, and located thereon by locating means 35 comprising its pins *a, b, c,* and *d* shown; with saw table 34 and pegboard 33 located thereon, movable together horizontally in relation to gang saw 36.

FIG. 5-*b* comprises a horizontal view of the structure shown in FIG. 5-*a*. Pegboard 33, in this embodiment, comprises a laminated pegboard ⅜ inch thick, mounted to be cut with its grain (if any) lengthwise in relation to rotary gang saw 36, with the one-quarter inch holes of pegboard 33 located in rows, at equal increments of one inch lengthwise and widthwise of said pegboard. Pegboard 33 comprises twelve strips of holes shown, seven holes in each strip. Dotted lines in strip 33-N and row 33-g represent the optional enlargement of pegboard 33 to any selected dimensions. All holes in this embodiment are shown located at the standard one inch increment between the centers of adjacent holes thruout the entire length and width of said pegboard.

In FIG. 5-*b*, gang saw 36 comprises its thirteen blades shown and designated 36-*a* thru 36-*m* respectively, each said blade ⅛ inch thick. Each said blade is separated from its next adjacent blade by a spacer 16/2 inch wide mounted with said blade on a rotary saw arbor, whereby the combined dimensions of blade thickness plus spacer width (⅛ inch plus ⅞ inch) comprises the standard increment of one inch shown separating the respective strips of holes designated 33-1 thru 33-N.

Locating means 35 comprises four vertical, tapered pins shown, each pin adapted to fit snugly in a ¼ inch hole. Pins 35-*a* and 35-*b* are shown engaging holes 33-1-*a* and 35-1-*g* of pegboard 33, and pins 35-*c* and 35-*d* are shown engaging holes 33-N-*a* and 35-N-*g* of pegboard 33. Therefore pegboard 33 is located on saw table 34 by locating means 35. When saw table 34 is moved horizontally toward saw 36, pegboard 33 contacts rotary blade 36-*b* at the midpoint between the strips 33-1 and 33-2, and contacts each other blade of saw 36 similarly at the mid-point between each respective strip of holes 33-2 thru 33-N: Blades 36-*a* and 36-*m* at opposite ends of gang saw 36, each trims its respective strip to a width of ⅞ inch.

Therefore, the removal of ⅛ inch of material by each respective blade of gang saw 36, cuts pegboard 33 into twelve strips, each said strip ⅞ inch wide by ⅜ inch thick and comprising seven holes spaced equally at one inch increments, with each said hole centered on the ⅞ inch width of its respective strip, or "girder", as shown in FIG. 1.

It is apparent that said cutting may be achieved either by "conventional" or by "climb" cutting, according to associated means well known in the art. It is also apparent that pegboard 33 mounted on saw table 34 selectively may move horizontally in relation to saw 36; or, alternatively, that saw 36 may move horizontally in relation to a fixed saw table 34, by means, not shown, well known in the art. In FIG. 5-*a*, saw table 34 is shown moving horizontally toward saw 36, with saw 36 rotating counterclockwise and mounted upon a usual arbor; with said arbor's supporting means and driving motor, not shown.

Many alternative embodiments are apparent, within the spirit of the invention.

For example, pegboard 33 may comprise a plurality of similar sheets of pegboard (e.g., each said sheet 4 feet by 8 feet by ⅜ inch thick) with the associated structure in FIG. 5 adapted to cut the plurality of sheets simultaneously.

As a further example, rotary saw 36 may comprise its single gang 36-*a*, adapted to cut a single girder at one time, with pegboard 33 located by pins 35-*a* and 35-*b*. After said single girder is cut, pegboard 33 then is moved on saw table 34, whereupon holes 33-2-*a* and 33-2-*g* are next engaged by locating pins 35-*a* and 35-*b* respectively, to prevent cumulative error in the centering of each strip of holes in each strip 33-1 thru 33-N, respectively.

As further examples, pegboard 33 may comprise holes separated by an increment other than one inch, whereby said other increment is selected as the minimum increment for the structural elements shown in FIG. 1. Pegboard 33 may comprise, in the alternative, any materials adapted to the uses of this invention, including plastic, aluminum or other metals, wood, plywood, acoustical siding and any other suitable material. As further examples, material other than pegboard comprises alternatives. If, as in FIG. 1, holes comprise the locations, said holes may be gang-drilled by multiple drills, gang-punched by multiple punches, pre-formed by injection molding (for example, of plastic), or manufactured by any method well known in the art.

Therefore, manufacturing methods are shown in FIG. 5 to divide an entire sheet of pegboard into girders by a single pass thru rotary saw 36.

Therefore FIGS. 1 thru 5 show an embodiment with the nine efficiencies, assuming a standardized design therein.

1. Each location of an original structural element therein is fabricated in increments of a single standard measurement, one inch, from its adjacent location.

2. Each additional structural element is characterized by the inherent efficiency in duplicating said original structural element.

3. FIG. 5 shows the resultant efficiency in mass production of many similar structural elements.

4. Each structural element of suitable length in FIG. 1 is interchangeable with all other structural elements.

5. Any structural subcomponent, for example girder 9, selectively is located anywhere in the mosaic of FIG. 1 without construction of a location.

6. Each two-dimensional structure (plane) in FIGS. 1 and 2, and solid in FIGS. 3 and 4, is characterized respectively by the rigidity of its component triangles.

7. Each star, for example star I in FIG. 1, selectively is folded after the disengagement of the corresponding vertices in each star.

8. Each subcomponent, for example triangle I'-ACE, selectively is relocated at any corresponding locations in tetrahedron 32 (a solid) in FIG. 4.

9. Any girder of suitable length, for example girder I-FB, selectively is re-applied in any other use, for example to comprise girder I'-AE, in tetrahedron 32 in FIG. 4.

LIVE SOUND STAGES AND MODEL STRUCTURES WITH THE NINE EFFICIENCIES

Performing Level (Middle Structure).

FIGS. 1 thru 5 have shown the construction of structures characterized by the nine efficiencies, and other features of this invention.

FIG. 6 shows an example of such a structure, comprising a live sound stage for the drama "Macbeth" by William Shakespeare, in a horizontal plan of the performing level (middle plane). The scale of said plan is 1/32 inch per foot.

Said live sound stage achieves the nine efficiencies: in construction of dramatic settings, in camera locations, and in dramatic staging for film and television production, or for a live production thru a proscenium arch to an audience.

FIG. 6 shows star VII, similar in pattern to star I in FIG. 1-e.

In FIG. 6, star VII comprises six structural elements, 1 thru 6, each said element serving a dual purpose.

Its first purpose in FIG. 6 is accomplished by structural elements comprising girders 192' in length, comprising the structural foundation for a parallel plane, in the manner shown in detail in FIG. 3.

Its second purpose is to construct said parallel plane, comprising a floor for said live sound stage, said floor characterized by a mosaic of locations, as shown in detail in star I, in FIG. 1-e, and described therein. Said floor comprises the base with locations for construction of a dramatic stage setting. Said detail shown in FIGS. 3 and 1-e, is not shown in FIG. 6.

Each of said two purposes of star VII now is discussed in turn.

In FIG. 6, said first purpose of star VII, to construct the foundation for a parallel plane, is accomplished as follows. Structural element 1 of star VII comprises thirteen locations separated by respective increments of sixteen feet each, said element 1 therefore comprising a girder, one hundred and ninety-two feet between its locations 1-a and 1-m. Each said location comprises a hole adapted to receive a rivet. As described heretofore, any said location selectively may be omitted for purposes of strength or economy. Similarly, any said location selectively may comprise a smaller hole, a grommet welded to said girder, a slotted grommet, a protrusion engaging a depression and adapted to connection by welding, or any other locating and connecting means well known in the art of construction. Alternatively, it is also apparent that said structural element may comprise a plurality of sub-elements, or subcomponents. The details of said rivet holes and alternative methods of connection, and other locating means, each adapted to its respective use herein, are not shown, being well known in the art of construction. Each structural element, 2 thru 6, is similar to said structural element 1.

In FIG. 6, said second purpose of star VII, to construct a parallel plane comprising a floor for said live sound stage, is accomplished as follows.

In FIG. 6, structural element 1 of star VII further comprises locations on said floor comprising said stage, with its adjacent locations separated by the standard increment shown herein, namely sixteen feet. Each said location comprises a hole ¼ inch in diameter. It is shown in FIG. 1-f that said stage floor comprising structural element 1 in FIG. 6, is supported by structural element 3 at its location 3-m, and by structural element 6 at its location 6-e, with a spacer required to be added at location 2-a to support said structural element 1 in a level, horizontal position. It is apparent that additional floor girders parallel to said structural element 1, each said girder comprising its respective strip of said stage floor, similarly is connected at each pair of corresponding locations of structural elements 3 and 6, and is supported by them. The length of each said floor girder is selected to be limited by the vertical supports for said performing level. The detail of construction of said vertical supports is shown in FIG. 3. Said vertical supports are represented in FIG. 6 by the lines of long dashes, and comprise the hexagon therein which connects vertices A thru F, respectively.

Therefore said stage floor in FIG. 6 comprises a mosaic in relation to star VII similar to the mosaic in FIG. 1 in relation to star I. Said mosaic in FIG. 6 is shown, in the segment enclosed by vertices A, B, and C, by each intersection of the dotted lines.

The following system of notation designates each location in said mosaic, in FIG. 6.

In star VII, each structural element, 1 thru 6, comprises its thirteen locations designated a thru m, respectively. It is apparent that each location in said mosaic which corresponds to a location in a structural element, is designated by its respective symbol. For example, in FIG. 6, the location of bed 47 is designated as 5-b.

For each other location in said mosaic, the symbol "*" represents the exact point to be located. A suitable structural element is selected. An equilateral triangle is constructed with the location "*" at its apex, and with its base comprising the distance between two locations on said selected structural element. The symbols for the three vertices of said triangle clockwise, in sequence, then define said location within the mosaic. For example, the location of trapdoor 45 is "4-f*4-g".

It is apparent that the construction of said mosaic may be desirable in a structure in the absence of structural elements 1 thru 6. Many alternative methods may be used to construct structural elements comprising said mosaic. Structural element 1 may comprise a ¾ inch flexible steel rule 192' long, with ¼ inch holes at increments of 16 feet. In the alternative, if the floor is solid concrete, each location in said mosaic may comprise an expansion shield inserted into a larger hole, adapted to receive the threaded end of a ¼ inch pin to designate said location. Said pin may be adjustable horizontally in relation to its thread, and adapted to be secured in a fixed location, for accuracy. The degree of accuracy required, determines the selection of its respective method.

In FIG. 6, segment AB of cyclorama 49 comprises a segment of a usual vertical cyclorama in a stage set, connected by adjustable structural elements to the mosaic of locations in its associated vertical support. The method of construction of said vertical support is shown by vertical support 16 in FIG. 3-b. The method of connection between said segment of cyclorama 49, and its associated vertical support, is shown in FIG. 11-a by first and second adjustable elements, designated 108 and 109, respectively. Each additional segment of cyclorama 49 is connected similarly, to its respective vertical support spanning vertices B and C, C and D, D and E, E and F, and F and A. As an alternative, a similar cyclorama may be supported within the hexagon constructed by said vertical supports, in the manner shown hereafter in FIGS. 11, 12, and 13.

In FIG. 6, viewing said sound stage from each vertex successively, said stage comprises the following objects comprising stage settings.

From vertex A, said setting comprises gates 37 of Macbeth's castle, at locations 1-b and 3-1, for Act II, scene 3.

At vertex B, the terrace leads to said vertex from the dining hall and grand staircase of Macbeth's castle. Said terrace comprises three arches supporting the roof over the terrace, each arch supported by a vertical column at each end. Said arches comprise first arch 38-a, at locations 3-f*3-e and 4-g*4-f; second arch 38-b, at locations 5-h*5-f and 5-j*5-f; and third arch 38-c, at locations 5-j and 5-l*5-j.

The viewpoint at vertex C shows the start of the manor slope from the terrace to the sea below, said manor slope 40 starting at the line of dashes at locations 1-h*1-g; 6-i*6-g; and 2-j*2-h. Said sea below, shown in the model in FIG. 8, with its adjacent rocks, and precipice leading to the wall of Macbeth's castle, is not constructed in the stage set on the performing level shown in FIG. 6. Lines of dashes in FIG. 6 represent the seascape in FIG. 8, as follows. The position of the sea, here designated 30, is shown at locations 6-c*6-e, 2-c*2-e, and 4-c. The positions of the rocks, here designated 41-b and 41-c, are shown at locations 4-c*4-b, and 4-c*4-d, respectively. The position of the precipice 41-a beneath said wall of Macbeth's castle, is represented by the segment of said wall designated 42-b, at locations 2-i thru 2-l. This completes the viewpoint from vertices C and D.

The viewpoint from vertex E comprises the following. The exterior wall of Macbeth's castle comprises its first segment 42-a, extending from location 3-b*3-c to location 2-l; and its second segment 42-b, extending from location 2-l to location 2-i. Arched windows penetrating said wall comprise first window 43-a, at locations 3-b and 3-b*3-c; second window 43-b, at locations 2-k thru 2-j; and third window 43-c, at locations 2-j thru 2-i.

Within said castle walls 43, the following stage settings are shown. Banquet table 44, for Act III scene 4, is shown at locations 3-c*3-e, and 4-j. Trap door 45 is shown at location 4-f*4-g, for the appearance of Banquo's ghost. Trap door 45 leads to the witches' cave below, not shown in this FIG. 6. In FIG. 8 is shown the entrance to said cave in a model of said precipice, comprising vertical flat 61; and a model of the witches' cauldron, 62, within said cave.

The viewpoint from vertex F comprises Lady Macbeth's boudoir comprising bed 47 at location 5-b; and royal staircase 48 at location 4-h*4-i, leading upward from terrace 38 (apparently leading to Lady Macbeth's boudoir, said boudoir actually set on stage at the performing level in FIG. 6).

Therefore the sound stage shown at its performing level in FIG. 6 is adapted to the performance of an entire dramatic production comprising five acts, for recording by film or TV cameras. It is apparent that said sound stage may be adapted for a dramatic production before a live audience, for example by addition of a proscenium arch between said sound stage and said audience, said proscenium arch spanning vertices D and B.

In FIG. 6, structural elements 1 thru 6 comprising star VII, construct a mosaic similar to the mosaic in star I in FIG. 1-e. Therefore the nine efficiencies shown and described at FIG. 1-e, are achieved in star VII in FIG. 6.

Similarly, the mosaic of triangle MNO shown in FIG. 1-e may be constructed in the following manner, in any triangle shown in star VII in FIG. 6, said triangle thus comprising a subcomponent of star VII. For example, in star VII, at vertex A, its location 1-a is separated by the standard increment of 16 feet (or 192 inches) from its adjacent location 1-b. Triangle MNO in FIG. 1-e may be located in FIG. 6 by the three locations 1-a, 1-b, and 3-l, by increasing the minimum increment from one inch in FIG. 1, to 16 inches in FIG. 6, in triangle 1-a, 1-b, 3-l. Said triangle therefore comprises 192 inches on each side of the equilateral triangle, and otherwise corresponds to triangle MNO in FIG. 1-e.

The nine efficiencies which characterize the mosaic of triangle MNO in FIG. 1-e, therefore similarly characterize the mosaic of triangle 1-a, 1-b, 3-l, in FIG. 6.

Therefore, in scene 3 of Act II at the gates 37 of FIG. 6, each stage property or "prop", each stage setting, each camera position, and each other location in triangle 1-a, 1-b, 3-l, at the gates 37 in said scene 3, may be located in said triangle in the same manner as heretofore described in star VII. Each said location in the mosaic of said triangle, therefore is characterized by the nine efficiencies, similarly to triangle MNO in FIG. 1-e.

In FIG. 6, a mosaic similar to the mosaic described in triangle 1-a, 1-b, 3-l, may be constructed by any similar triangle in the mosaic of star VII in FIG. 6. Each additional said mosaic similarly is characterized by the nine efficiencies. It is apparent that each said triangle may be constructed by any suitable, alternative method described in this specification.

Each said location in the mosaic comprising star VII in FIG. 6, may comprise the location for a television camera or motion picture camera. FIG. 10 shows a support for a camera, said camera designated therein camera 103. Camera 103 alternatively may comprise any said television camera, or motion picture camera.

FIG. 10 therefore shows a structure, or support, for locating the angle of the position of a television camera or motion picture camera in any selected mosaic of locations in a horizontal plane, comprising 360° circumferentially, and in any selected vertical or inclined plane, said plane similarly comprising 360° circumferentially. The detail of said structure is shown and described hereafter at FIG. 10.

FIG. 8 shows a structure comprising a model, including a model for the performing level of the sound stage shown in FIG. 6, and other similar levels.

Similarly, the structure shown in FIG. 8 alternatively may comprise a model of said support for a television or motion picture camera, said support shown in FIG. 10, and a model of said camera.

Therefore, a television or motion picture camera, or a stereo camera, may be located at any selected location in the mosaic of star VII comprising the sound stage shown in FIG. 6, the similar overhead bridges for lights and special effects shown in FIG. 7, or in any model shown in FIG. 8. The angle of any said camera selectively may be positioned in any selected mosaic, horizontally, vertically, or in any inclined plane. Each said location in any said mosaic is characterized by the nine efficiencies, similarly to the mosaic in FIG. 1-a.

Therefore said live sound stage, and said models, achieve the nine efficiencies, in construction of dramatic settings, in camera locations and angles, and in dramatic staging for film and television production, or for a live production thru a proscenium arch to an audience.

OVERHEAD LIGHT BRIDGES AND SPECIAL EFFECTS (UPPER STRUCTURE).

FIG. 7 shows star VIII comprising a horizontal view of overhead light bridges and special effects, the upper level parallel to the live sound stage for Macbeth, at the performing level, shown in FIG. 6.

In FIG. 3, three parallel planes were shown, comprising stars II, III, and IV, respectively, supported in parallel by six vertical supports, 16 thru 21, respectively.

The live sound stage for Macbeth comprises three parallel planes corresponding to said planes in FIG. 3. FIG. 6 shows star VII, comprising the performing level for said sound stage, at the middle level corresponding to star III in FIG. 3. FIG. 7 shows star VIII, comprising the overhead light bridges and special effects for said performing level, and corresponding to star II in FIG. 3. FIG. 8 shows star IX, comprising a model of two levels of said sound stage, first level comprising a model of a seascape below said performing level and corresponding to star IV in FIG. 3, and second level comprising a model of said performing level shown in FIG. 6.

Said parallel planes in FIGS. 6, 7, and 8, comprising stars VII, VIII, and IX respectively, are supported by vertical supports not shown, corresponding to the said six vertical supports 16 thru 21, shown in FIG. 3. The detail of construction of vertical support 16 is shown in FIG. 3-b. The six said vertical supports in each of FIGS. 6, 7, and 8, are represented by lines of long dashes in each said Figure connecting its six respective vertices A, B, C, D, E, and F. In this embodiment, 90° angle irons correspond to connectors 14 and 14' in FIG. 3, as described in FIG. 2-e.

Therefore, in FIGS. 6, 7, and 8, each location in the mosaic of each of stars VII, VIII, and IX, is located by an exactly perpendicular line thru the corresponding locations of the mosaics of all said stars.

Therefore, in FIG. 7, showing the upper level of said sound stage comprising its overhead light bridges and special effects, certain important stage settings shown in FIGS. 6 and 8 on lower levels of said sound stage, are represented in FIG. 7 by lines of dashes at the corresponding locations of star VIII.

In FIG. 7, viewing said sound stage from each vertex successively, said overhead light bridges and special effects comprise the following.

Viewed from vertex A, a roll of scrim 50 comprises the following. Two short girders connect locations 5-$c$ and 5-$e$ respectively, to location 5-$c$*5-$e$, to construct a horizontal, equilateral triangle. Similarly, two short girders connect locations 5-$i$ and 5-$k$ respectively, to location 5-$i$*5-$k$. A girder the length of said roll of scrim connects said short girders, at said locations 5-$c$*5-$e$ and 5-$i$*5-$k$, to star VIII at is locations 1-$c$ and 3-$k$. Said roll of scrim therefore spans said locations 5-$c$*5-$e$ and 5-$i$*5-$e$, said roll therefore adapted selectively to be lowered and raised in the scene at gates 37, in Act II, scene 3 of Macbeth. Gates 37 are represented by lines of dashes in FIG. 7, at its locations corresponding to the location of gates 37 in FIG. 6.

From the viewpoint of vertex B, in FIG. 7, background scenery 51 in a roll, spanning locations 5-$k$*5-$l$ and 6-$b$*6-$c$, comprises the following, similar to corresponding components of scrim 50. Short girders connect each said location of roll 51 to its adjacent structural elements 5 and 6, respectively, each to construct its respective equilateral triangle, similarly to scrim 50. A girder the length of said roll of scenery secures said equilateral triangles to structural elements 5 and 6 of star VIII. Scenery 51 selectively is lowered and raised for the battle with Macduff in Act V, scene 6 of Macbeth. It is apparent, alternatively, that said scenery 51 may comprise a flat flown overhead in a fly above the performing level of said sound stage, in said locations of scenery 51. Royal staircase 48, and the arches of terrace 38, are represented by lines of dashes in FIG. 7, each at its respective locations corresponding to its locations in FIG. 6.

From the viewpoint of vertices C and D, fog machine 53 comprises the following. The following girders are connected to star VIII. The first girder extends from location 6-$c$*6-$d$ to location 2-$d$*2-$e$, and is connected to star VIII at its locations 1-$j$ and 2-$d$. The second girder extends from location 2-$d$*2-$e$ to location 2-$j$*2-$k$, and is connected to star VIII at its locations 6-$j$ and 3-$d$. Said first and second girders are connected at location 2-$d$*2-$e$. Said fog machine 53 emits said fog by a plurality of similar devices, shown at locations 6-$c$*6-$d$, 1-$j$, 2-$d$*2-$c$, 2-$d$*2-$e$, 2-$f$*2-$g$, 3-$d$, and 2-$j$*2-$k$. Therefore fog machine 53 is adapted to emit fog uniformly over seascape 58, shown in the model of the lower level shown in FIG. 8, and over rocks 60 similarly shown, said seascape and rocks represented by lines of dashes in FIG. 7 at locations corresponding to their respective locations in FIG. 8.

From the viewpoint of vertex E, light bridges 54 comprise the following. Light bridge 54-$a$ comprises a girder extending from location 3-$b$*3-$d$ to location 2-$l$, connected to star VIII at its locations 3-$b$ and 2-$l$; and five amber spotlights, one said spotlight located at each of locations 3-$b$*3-$d$, 3-$b$*3-$c$, 3-$b$, 2-$l$, and 2-$k$, respectively. Light bridge 54-$b$ comprises four blue spotlights, one said spotlight located at each of locations 2-$j$, 3-$f$, 3-$g$, and 3-$h$, respectively. Banquet table 44, and trap door 45 comprising an entrance to the witches's cave beneath, each are represented in FIG. 7 by lines of dashes at locations corresponding to its respective location in the performing level of said sound stage shown in FIG. 6. Each of the five amber spotlights comprising light bridge 54-$a$, are shown focused on banquet table 44. Each of the four blue spotlights comprising light bridge 54-$b$, are shown focused on trap door 45. Therefore light bridge 54 is adapted to light the banquet scene, and the appearance of Banquo's ghost from said trap door, in scene 4 of Act III of Macbeth.

Therefore overhead light bridges and special effects comprising scrim, scenery, fog machines, and light bridges, selectively may be located at any location in the mosaic of star VIII in FIG. 7, together with any similar production equipment such as cameras and sound booms. Each said location in said mosaic is characterized by the nine efficiencies, similarly to the mosaic in star VII, in FIG. 6, and the mosaics in the models shown in star IX, in FIG. 8.

Therefore the overhead light bridges and special effects of said live sound stage, and said models thereof, achieve the nine efficiencies in construction of dramatic settings, in camera locations and angles, and in dramatic staging for film and television production, or for a live theatre audience.

MODEL OF TWO LEVELS (LOWER AND MIDDLE STRUCTURES).

FIG. 8 shows star IX comprising a horizontal view of a model of said live sound stage for Macbeth, comprising two levels connected by manor slope 59 which starts at the middle level comprising the performing level shown in FIG. 6; and which then slopes to the sea and rocks 60 shown in the model in FIG. 8, comprising a seascape at the lower level.

In FIG. 8, the model of said performing level is designated star IX-*a*, and the model of said seascape is designated star IX-*b*.

Said model in FIG. 8 is constructed on a scale of one-quarter inch to the foot. Star IX-*a* comprises a scale model of Macbeth's castle at the performing level of said sound stage, and shown in the live sound stage in FIG. 6. Star IX-*b* comprises a scale model of the seascape and rocks at the lower level of said sound stage, represented in FIG. 6 by lines of dashes at the corresponding locations of star VII. Manor slope 59 comprises a scale model of said manor slope, said slope starting downwards at the locations corresponding to the locations shown in FIG. 6 for the start of the manor slope 59.

The detail for the method of construction of the vertical supports for two parallel planes, is shown in FIG. 3. Starts IX-*a* and IX-*b* in FIG. 8 correspond to stars III and IV respectively, in FIG. 3. In FIG. 8, the six vertical supports, constructed similarly to the method shown in FIG. 3, and with larger dimensions corresponding to the larger parallel planes in FIG. 8, are represented by the lines of long dashes connecting vertices A, B, C, D, E, and F, respectively.

In FIG. 8, the model of manor slope 59 connects the middle level of the model, comprising star IX-*a*, with the lower level of the model, comprising star IX-*b*. Each diagonal of the model of manor slope 59 spans the distance from the upper end of said diagonal, at its respective starting point shown at manor slope 59 in star IX-*a*, to the lower end of said diagonal, at its respective point of termination in said model of a seascape, comprising sea 58 and rocks 60 in star IX-*b*. Each said diagonal of the model of manor slope 59, therefore corresponds to first diagonal 22 in FIG. 3-*b*. The segment of first diagonal 22 between its locations 22-*c* and 22-*e* spans the distance between stars III and IV in FIG. 3-*b*, and therefore corresponds to said diagonal girder in FIG. 8 spanning the distance between stars IX-*a* and IX-*b*. Therefore, the detail for the method of construction of the vertical supports for the model of manor slope 59, is shown in FIG. 3.

With the model in FIG. 8 constructed to a scale of ¼ inch per foot, the length of each horizontal structural element in star IX-*a* is 48 inches, said elements in the middle level comprising star IX-*a* being designated 1 through 6. In FIG. 8, the lower level, comprising star IX-*b*, similarly is constructed by six structural elements designated 1 thru 6, each said element 48 inches in length, and comprising thirteen locations separated by a standard increment of 4 inches. As an alternative in star IX-*a*, any structural element selectively may be limited in length to its horizontal length up to the point of intersection with a diagonal girder of the model of manor slope 59.

The ratio of the model to the drawing is 8 to 1. Therefore each structural element in FIG. 8 comprises a line on the drawing 6 inches in length.

In FIG. 8, it is apparent that a model of the overhead light bridges and special effects shown in FIG. 7, as an alternative may be constructed similarly to the model of the middle level and lower level of said sound stage shown in FIG. 8. Therefore in FIG. 8, each location in the model in the respective mosaic of each of the three parallel planes of said sound stage, is connected by a perpendicular line to the corresponding locations of the model in the mosaic of all said parallel planes.

In FIGS. 6 and 7, the respective parallel planes of said live sound stage are shown with a scale of 1/32 inch per foot. In FIG. 8, the scale of the model of said live sound stage is ¼ inch per foot, and the ratio of the model to the drawing is eight to one. Therefore, in FIG. 8 the drawing shows the stage settings of the live sound stage corresponding to the models shown in FIG. 8, at a scale of 1/32 inch per foot (¼ inch per foot multiplied by ⅛), similarly to FIGS. 6 and 7.

Therefore the model of said live sound stage shown in FIG. 8 is adapted for use in stage design, in process shots in filmmaking with special optical effects, and in planning and production of the drama, similarly to said live sound stage.

In FIG. 8, the model of said sound stage is viewed from each vertex successively, said model comprising the following stage settings.

At vertex A, the model of said sound stage comprises a segment of the plane comprising the middle level therein, and designated star IX-*a*. Each model of a live stage setting is constructed in FIG. 8 at a scale of ¼ inch to the foot, similarly to the models of structural elements. Therefore the model 56 of the gates of Macbeth's castle, corresponds to gates 37 of said live stage, at the locations in the mosaic of star IX-*a* in FIG. 8 corresponding to the locations of gates 37 in the mosaic of star VII shown in FIG. 6, said locations designated similarly in star IX-*a*.

Similarly, the model of each stage setting in FIG. 8 is located in the mosaic of star IX at the same locations as the corresponding stage setting in the mosaics of stars VII and VIII in FIGS. 6 and 7, respectively, each location thereof designated similarly in star IX.

From the viewpoint of vertex B in FIG. 8, the model 57 of the three arches of the terrace, corresponds to the terrace 37 in FIG. 6.

From the viewpoint of vertices C and D in FIG. 8, the model 59 of the manor slope corresponds to the starting line of manor slope 40 in FIG. 6. In FIG. 8, said model of manor slope 59 descends from said model of the terrace of Macbeth's castle (on star IX-*a*, the model of the performing level), to the model 58 of the seascape with the model 60 of the rocks (on star IX-*b*, the lower level).

In FIG. 8, on star IX-*b*, the model 58 of the seascape, and model 60 of the rocks, correspond respectively to the seascape 39, and rocks 41-*b* and 41-*c*, represented in FIG. 6 by lines of dashes.

In FIG. 8, the model 61 of the precipice corresponds to the precipice 41-*a* represented in FIG. 6 by the segment of the wall of Macbeth's castle designated 42-*b*.

In FIG. 8, said model of the precipice 61 comprises a vertical flat (vertical view not shown) including the entrance to the witches' cave in the precipice beneath the exterior wall of Macbeth's castle. Directly behind said entrance, a model of witches' cauldron 62-b is located beneath the model 62-a of the trap door in the floor of the dining hall in Macbeth's castle. Said model of a precipice 61 rises vertically from the lower level comprising said model of a seascape in the horizontal plane of star IX-b, to the corresponding segment of the model 63 of the exterior walls of Macbeth's castle at the middle level comprising the horizontal plane of star IX-a.

In FIG. 8, from the viewpoint of vertex E, said middle level comprises the model of the performing level of said sound stage, the location of the castle of Macbeth. The model 63 of the exterior walls of Macbeth's castle with three windows, corresponds to exterior walls 42-a and 42-b, and to windows 43-a, 43-b, and 43-c, in FIG. 6.

Within said model of castle walls 63 in FIG. 8, the following models of stage settings are shown. The model 55 of the banquet table, corresponds to banquet table 44 in FIG. 6. In FIG. 8, the model 62-a of the trap door leading to the witches' cave below, corresponds to trap door 45 in FIG. 6.

In FIG. 8, from the viewpoint of vertex F, the model 65 of the bed in Lady Macbeth's boudoir corresponds to bed 47 in FIG. 6. In FIG. 8, the model 64 of the royal staircase leading upward from the model of the terrace 57, corresponds to the royal staircase 48 in FIG. 6.

In FIG. 8, the model is surrounded by the model 66 of a cyclorama, corresponding to cyclorama 49 in FIG. 6. In FIG. 8, said model of a cyclorama 66 extends vertically from a model of star VIII overhead shown in FIG. 7 (said model of star VIII not shown in FIG. 8), to the model of the lower level comprising star IX-b in FIG. 8.

Therefore, in FIG. 8, each location in the mosaic of the model of each of the levels of said live sound stage shown in FIGS. 6 and 7, corresponds to the respective location in the mosaic of all levels of said live sound stage.

Therefore the model shown in FIG. 8 is characterized by the nine efficiencies, in construction of models of dramatic settings, in models of camera locations and angles, and in models of dramatic staging for film and television production, or for a model of a live production for an audience.

LIVE STRUCTURES, WITH SCENIC BACKGROUNDS PHOTOGRAPHED FOR DISPLAY

The Stage, with Example of Scene Photographed.

FIG. 9 shows a horizontal view of star X comprising a central stage with its stage settings shown in solid lines, with said stage settings comprising six live water fountains 75, each shown located at one of the vertices of star X designated G, H, I, J, K, and L, respectively, each said vertex 48' from the center of star X designated Z.

FIG. 9 is shown at a scale of 1/96 inch per foot. Each point of star X is adjacent to the corresponding segment of the hexagon in FIG. 9 comprising the exposition to be photographed for display, and shown by lines of dashes. Each structural element of star X, shown in solid lines, comprises 148 feet between its four locations, each adjacent location separated by a standard increment of 48 feet. Star X corresponds to star XIII in FIG. 11, and in FIG. 12.

The detail of methods for construction of a star comprising a stage are shown in FIGS. 1 thru 7.

In FIG. 9, the example of an exposition to be photographed comprises the New York World's Fair of 1964-1965. Star X, shown in solid lines, comprises the stage, with six fountains 75 shown as stage settings. Said stage is shown in the central position of said World's Fair, replacing the Unisphere, and shown in the position of said Unisphere.

In said exposition in FIG. 9, a line of dashes representing a distance of 384 feet, comprising nine locations with each adjacent location separated by the standard increment of 48', is extended from center point Z, thru vertex G of star X to vertex G'. Seven locations thereon are designated as follows: location G'-a at vertex G', and successive locations G'-b, G'-c, G'-e, G'-f, and G'-g, each separated by standard increments of 48 feet. The exposition to be photographed comprises the said seven locations between said stage and vertex G', comprising 288 feet.

At vertex G', the Avenue of Africa 70 comprises 192 feet between locations G'-a and G'-e.

A similar avenue is constructed at each of vertices H, I, J, K, and L of star X, thereby to construct vertices H', I', J', K', and L', each corresponding to vertex G'.

At vertex H', the Court of Nations 71 comprises locations H'-a thru H'-e, similar to Avenue of Africa 70.

At vertex I', the respective avenue comprises Avenue I' between locations I'-a thru I'-e.

At vertex J', the respective avenue comprises Avenue J' between locations J'-a thru J'-e.

At vertex K', the Court of States 67 comprises locations K'-a thru K'-e.

At vertex L', the Avenue of Americas 68 comprises locations L'-a thru L'-e.

In said exposition to be photographed, the Court of the President of the United States 73 comprises the following area. A hexagon is constructed between the respective locations "e" of each of the said avenues designated G', H', I', J', K', and L'. Said Court 73 comprises the area between said hexagon, and a hexagon constructed similarly between the respective locations "g" of each of said six avenues.

In said exposition to be photographed, a hexagon similar to Court 75 is constructed between the respective locations "a" of each of the said six avenues, said hexagon comprising the outer boundary of the area shown in FIG. 9 of said exposition to be photographed. The said area to be photographed, shown by lines of dashes in FIG. 9, comprises its respective pavilions and landscape of said expositions, and comprises the foreground of said exposition to be photographed for projection. The Avenue of the United Nations 72 comprises the following locations of said hexagon: the avenues from K'-a to L'-a, from L'-a to G', and from G'-a to H'-a .

Therefore, said area to be photographed comprises a mossic of locations, as follows. The avenues located from G'-a thru G'-g comprise its seven locations, designated G'-a thru G'-g, respectively. Each of the five similar avenues, each leading to vertices H', I', J', K', and L', respectively, each similarly comprises seven corresponding locations.

The following location is assumed to represent the actual location of each respective structure and feature in said World's Fair. For simplicity, said location of each said structure is represented b a single symbol "o", comprising its first location. A second location (not shown) for each structure is assumed to orient said structure in relation to its first location.

Therefore, the location of said structure (pavilion) is described in the same manner as similar locations in each similar mosaic heretofore described in FIGS. 6, 7, and 8.

Tricentennial Pool 77 is assumed to be located at an irregular location which does not correspond to any point in the mosaic of star X. FIG. 11 shows two adjustable girders, 108 and 109, respectively, comprising the structure to connect an irregular location to a mosaic.

Therefore, the hexagon in FIG. 9 comprising said area to be photographed comprises six segments, each separated by its respective avenue from point Z, and each designated by its respective segment of hexagon G'H'I'J'K'L'.

First segment G'H' comprises the following structures. The Pavilion of Africa 87 comprises location H'g*H'-d. The Pavilion of Pakistan 89 comprises location H'-c*H'-b. The Pavilion of of Malaysia 90 comprises location H'-e*H'-b. The Pavilion of Sierra Leone 99 comprises location G'-b*G'-c.

Second segment H'I' comprises the Pavilion of New Jersey 88 at location I'-d*I'-c.

Third segment I'J' comprises Tricentennial Pool 77, at an irregular location shown in FIG. 11, as discussed supra: and Pavilion of New York City 78, at location I'-b*I'-f.

Fourth segment J'K' comprises the Pavilion of New England 79, at location J'-d*J'-f.

Fifth segment K'L' comprises the Pavilion of Fine Arts 80 at location L'-c*L'-b, the Pavilion of Thailand 81 at location K'-b*k'-d, and the Pavilion of Mexico 82 at location K'-d*K'-g.

Sixth segment L'M' comprises Caribbean Pavilion 85 at location L'-d*L'-e, Republic of China Pavilion 84 at location L'-e*L'-f, the Pavilion of the Philippines 85 at location G'-f*G'-e, the Pavilion of Greece 86 at location G'-e*G'-d, the Court of Peace 69 at location G'-f*G'-c, the Pavilion of Central America (Panama) 91 at location L'-b*L'-c, the Pavilion of Indonesia 92 at location L'-b*L'-d, the Pavilion of Polynesia 93 at location L'-c*L'-e, the Pavilion of Lebanon 95 at location G'-e*G'-c, the Pavilion of Jorden 96 at location G'-d*G'-b, the Pavilion of Sudan 97 at location G'-c*G'-b, and the Pavilion of Morocco 98 at location G'-d*G'-c.

Therefore, in FIG. 9, the live stage replacing the Unisphere at the center of a selected exposition, comprises a mosaic which extends circumferentially to include the vastly larger exposition to be photographed circumferentially, comprising the New York World's Fair of 1964–1965. Therefore the entire mosaic which includes the central live stage and also the larger exposition, is characterized by the nine efficiencies, similarly to the live stages and models shown in FIGS. 6, 7, and 8.

FIG. 10 will show the structure of a stereo camera 103 adapted to photograph the entire environment of the observor, 360° horizontally, and 360° vertically or in any selected inclined plane.

Therefore the said exposition in FIG. 9 may be photographed by camera 103 in color, in stereo (three dimensions), and displayed for an observer in the central stage viewing a circumferential display of said stereo photography.

As will be shown in FIGS. 11 thru 14, said observer seated in said central stage in the midst of the live fountains, and observing the New York World's Fair in a 360° display horizontally and vertically, experiences and senses, in three dimensional color, the immediacy of the live New York World's Fair shown in FIG. 9, altho said exposition has long since been demolished in 1965.

The Camera

FIG. 10 shows camera 103, shown in the drawing as a stereo (three dimensional) camera, and its associated means adapted to photograph the scene shown in FIG. 9, with the results described therein. FIG. 10-a shows a horizontal view, enlarged, of detail of horizontal index XI of said camera. FIG. 10-b shows a vertical view, enlarged, of vertical index XII for said camera. FIG. 10-c shows a vertical view of said camera and its associated means, including boom 101 in an upright position.

In FIG. 10-a, the horizontal index comprises star XI shown in solid lines and comprising its vertices A thru F of hexagon ABCDEF. Each said vertex of star XI corresponds to the respective segment of the exposition to be photographed for display, shown in FIG. 9, said respective segment adjacent to the corresponding vertex of star X in FIG. 9. Horizontal locator 100 comprises a device to locate the position of camera mount 100-a horizontally, corresponding to said vertex A of star X adjacent to its respective segment to be photographed, designated segment L'G'.

In FIG. 10-a, the detail of horizontal locator 100 is shown in a horizontal view, and in a vertical view. Said horizontal view comprises said camera mount 100-a with its horizontal index pin 100-b held depressed by a spring until disengaged by a lifter. Said vertical view shows vertex A of star XI, comprising its locating hole 100-c, a ⅛ inch hole drilled in its respective connector. A similar locating hole corresponding to hole 100-c is drilled in each vertex B thru F, respectively.

In FIG. 10-c, horizontal index XI is shown mounted horizontally on boom 101 in its upright position, engaged by locator 100 comprising locating pin 100-b (not shown) connecting camera mount 100-a to locating hole 100-c at vertex A of said horizontal index.

In FIG. 10-b, the vertical index comprises star XII shown in two vertical views and comprising its vertices A thru F of hexagon ABCDEF. Vertex A of said vertical index comprises a position parallel to the structures and landscape of the exposition to be photographed for display shown in FIG. 9. Vertical locator 102 comprises a device to fix the vertical position of camera 103.

In FIG. 10-b, the detail of locator 102 is similar to the detail of locator 100 shown in FIG. 10-a. In FIG. 10-b, the vertical locator comprises camera frame 102-a of camera 103, with its vertical index pin 102-b (not shown). Vertex A of star XII comprises its locating hole 102-c, a ⅛ inch hole drilled in its respective connector. A similar locating hole corresponding to hole 102-c is drilled in each vertex B thru F, respectively.

In FIG. 10-c, vertical index XII is shown mounted vertically on camera mount 100-a, engaged by locator 102 comprising locating pin 102-b (not shown) connecting camera frame 102-a to locating hole 102-c at vertex A of said vertical index.

Therefore, in FIG. 10-c, with horizontal locator 100 and vertical locator 102 each positioned at its respective vertex A, stereo camera 103 is adapted to photograph segment L'G' of the exposition shown in FIG. 9, said segment corresponding to the vertex A of its corresponding star X.

FIG. 10-c comprises the following. Stereo camera 103 comprises two lenses separated horizontally by the usual interpupillary distance of approximately 2.45 inches. Said two lenses normally are horizontal in relation to each other. Said camera 103 is to "photograph . . . 360° horizontally . . . ." (Infra.) Selectively it is a "camera . . . to pan horizontally at a uniform speed . . . to record the 360° panorama on . . . videotapes . . . . displayed circumferentially each 1/24th second . . ." (Infra.)

Boom 101 is shown in an upright position. Said boom selectively comprises a motor at third pivot 106 for rotating camera mount 100-a, and associated driving means at first pivot 104 for indexing said camera. Camera mount 100-a rotates around its point 106' in a horizontal plane in relation to boom 101, on third pivot 106 which comprises a flat bearing which supports said camera mount in its horizontal plane. The center of said third pivot is aligned vertically with point Z, the center of star XI which comprises the horizontal index for said camera mount.

Camera 103 is shown in a horizontal position. Its frame 102-a rotates in a vertical plane supported between two single-point pivots, first pivot 104 and second pivot 105. The center of said vertical plane is point Z', the center of star XII which comprises the vertical index for camera 103 and its frame 102-a.

Therefore, when camera mount 100-a is positioned by locator 100 at each successive vertex A thru F of the horizontal index comprising star XI, stereo camera 103 photographs each respective segment of the exposition adjacent to the corresponding vertex of star X in FIG. 9.

With camera frame 102-a of camera 103 positioned by locator 102 at vertex B (or C) of the vertical index comprising star XII, and camera mount 100-a, positioned by locator 102 at each successive vertex A thru F of the horizontal index comprising star XI, stereo camera 103 photographs the hexagon comprising the environment circumferentially, at an angle of elevation 60° above the horizontal plane photographed with the vertical index comprising star XII located at its vertex A. Each individual segment photographed comprises an isosceles triangle as follows: base equal to FA in FIG. 15-e, first adjacent side FA in FIG. 15-f, and similar second adjacent side (not shown) similarly connecting said base at point XXIX-A to apex XXX-a.

Similarly, with locater 102 at vertex F (or E) of star XII, camera 103 photographs the hexagon comprising the environment at an angle 60° below the horizontal plane photographed with star XII located at vertex A.

Therefore, FIG. 10 shows the structure of a stereo camera 103 adapted to photograph the entire environment of the observer, 360° horizontally, and 360° vertically including 180° vertically overhead.

The foregoing description sets forth an apparatus for manual operation.

Selectively, with the vertical angle of the lens of said camera comprising 60 degrees and associated with a focal plane shutter, a motor comprises driving means to rotate said camera mount with said camera at a first angle of elevation in a horizontal plane. Said rotation at a uniform speed records the 360° panorama of a scene in a first pan. Said motor comprises driving means to index said camera to second and third angles of elevation; said angles at 60° above and 60° below said horizontal plane, respectively, for second and third said pans in a cycle comprising 1/24th second; all as described elsewhere in this specification.

Alternatively, second and third cameras similar to the first camera 103 photograph said scene at said second and third angles of elevation in a single said pan comprising said cycle.

Alternatively, with said vertical angle comprising 180° with a "fisheye" lens, said motor rotates said camera in a single said pan comprising said cycle.

Alternatively, as shown by lines of dashes in FIG. 10-a, if the horizontal field of the lenses of camera 103 comprises 30° (one-half of 60°), it is apparent that a point A' may be located at distance ZA from the center. A, by an adjustable girder similar to girder 108 shown and described in FIG. 11. The connector at vertex A' comprises an ⅛ inch hole similar to locating hole 100-c at vertex A. Star XI' with its center at Z, constructed with its six vertices A' thru F', therefore comprises the vertices of a second hexagon dividing said exposition in FIG. 9 into twelve segments, photographed by camera 103 in FIG. 10 with its horizontal locator 100 positioned successively at each of the twelve vertices of said two hexagons.

If the vertical field of said lenses of stereo camera 103 is halved from 60° to 30°, it is apparent that star XII comprising said vertical index similarly may be divided into twelve segments, photographed by camera 103 successively.

The angles comprising the respective horizontal and vertical fields for many lenses are detailed in American Cinematographer Manual by Joseph Nascelli, Hollywood, California, American Society of Cinematographers, 2nd edition. 1960, including pages 175–183.

Alternatively, it is apparent that a vertex similar to A' comprising a locating hole similar to hole 100-c, may be located selectively at any desired point comprising a second vertex, by a pair of adjustable girders similar to 108 and 109 represented by lines of dashes at vertex A' connecting vertices A and B in FIG. 10-a, and shown and described in FIG. 11. The segment of star XI comprising the horizontal index therefore may be selected to correspond to the respective horizontal or vertical fields of any pair of lenses selected for stereo camera 103. Any plurality of vertices similar to said second vertex similarly may be constructed. Therefore said exposition shown in FIG. 9 may be photographed by camera 103 in any selected horizontal or vertical segments corresponding to the selected pair of lenses of said stereo camera 103.

It is apparent that said star XI comprising horizontal index XI, and star XII comprising vertical index XII, may be removable, and selectively replaced by an alternative said index or indices, each comprising its locating holes 100-c and 102-c, respectively, in any desired positions or combinations of said holes; said camera with a universal pivot. If said lenses comprise "fisheye" lenses with, for example, a vertical field of 180° (infra, p. 92, lines 15 to 17), said universal pivot comprises a pivot rotable in a single horizontal plane. If said camera comprises a television camera (infra. page 72, line 29 thru page 73, line 5) for electronic display (infra, page 92, lines 19 thru 23), said vertical field comprises, for example, the horizontal lines of said electronic display.

Alternatively, it is further apparent that any said desired positions, or combinations thereof, may comprise a plurality of holes 100-c and 102-c, each said hole readily adjustable as to location; or equivalent means in predetermined locations, in present locations, or in selected locations.

The axis thru the center of both of the dual lenses of camera 103 shown in FIG. 10-a, normally is horizontal. Therefore, with boom 101 in its upright position, said lenses may photograph the hexagon comprising the circumference of a plane 360° horizontally, and at least 180° vertically overhead, without interference by said boom in the field of said camera.

If it is desired similarly to photograph 360° vertically without interference by said boom, said boom is fixed in a horizontal position. Camera 103 is engaged by first pivot 104 and second pivot 105 each at its respective alternate point 104" and 105" shown in FIG. 10-c, with each said pivot adjusted whereby camera 103 is supported while rotating. Thus adapted, star XI comprising the "horizontal index" is converted into a vertical index, otherwise functioning in its usual manner.

The normal relationship between the two following planes, star XI comprising the horizontal index and star XII comprising the vertical index, in a right angle as shown in FIG. 10-c. Said right angle is determined by the connection of the flat bearing comprising third pivot 106, to position 106' on the hexagonal circumference of camera mount 100-a, as shown in FIG. 10-c.

For special effects, or with selected lenses, or with camera 103 comprising a single lens, said camera 106 may be adapted to rotate 360° in any inclined plane by changing the angle between said two planes. For that purpose, said connection of third pivot 106 selectively is changed to position 106" shown on camera mount 100-a. Alternatively, it is apparent that said connection selectively may comprise any position (not shown) in camera mount 100-a extended in a plane 360° around camera 103.

It is apparent that star XI comprising the horizontal index, and star XII comprising the vertical index, alternatively may comprise a single plane of material such as metal or plastic, said plane comprising center Z and a selected plurality of locating holes similar to 100-c, each said hole corresponding to a vertex; said single plane comprising an alternative structure as described in FIG. 1.

It is apparent that camera 103 alternatively may comprise a stereo motion picture camera instead of the camera shown in FIG. 10 which photographs a stereo pair. Said motion picture camera selectively may photograph any segment of the environment, as shown hereafter in FIG. 14-d.

Further, camera 103 alternatively may comprise a camera with a single lens, adapted to take photpgraphs such as a slide for each segment of the environment heretofore shown and described, each said slide projected by a projector with a single lens onto a screen, for example, a cylorama on all sides of the observor 360° horizontally, and 360° vertically (or 180° overhead). Said projection may be viewed by an observor without special glasses or viewing devices to transmit separate images to said observor's right and left eye.

Alternatively, camera 103 may comprise any structure or system for taking stereo photographs, and viewing them, without the necessity to use said special glasses or devices for viewing, including said systems (without projection) with screens comprising electronic images, and "Xograph" reproductions, for example, by Cowles Communications, Inc., 488 Madison Ave., NY, NY.

In FIG. 10, camera 103 comprises two lenses adapted to take two photographs simultaneously comprising a stereo pair, in the manner well known in the art of stereo photography.

The right and left images of said stereo pair may be projected separately by the dual lenses of a stereo projector, the light thru first lens of said dual lens polarized horizontally to project said right image, and the light thru the second lens of said dual lens polarized vertically to project said left image. Said two images are projected on a screen adapted to reflect said light, said reflected light retaining its respective polarity. Therefore an observer wearing special glasses 107 shown in FIG. 15-a, said glasses comprising polarized lenses adapted each to transmit only its respective said image, views said right image only with his right eye, and said left image only with his left eye.

An observer viewing the projection of said stereo pair comprising a single segment of the exposition shown in FIG. 9, experiences three dimensional color to the horizon in that single segment comprising all pavilions and features of the exposition, experienced in three dimensions with the sense of reality known as the "window effect" observed in said single segment of said exposition.

In this invention, the images photographed by stereo camera 103 in FIG. 10 dissolve the limitation imposed by said "window effect". Said window disappears into an experience of the total immediacy of complete reality. Therefore said observer, viewing from said central stage in the midst of the live fountains with real water flowing as shown in FIG. 9, sees said New York World's Fair in a 360° display horizontally and 180° vertically overhead in three dimensional color. Said observer experiences and senses by sight and sound the immediacy of the live New York World's Fair shown in FIG. 9, altho said exposition has long since been demolished in 1965.

TOTAL THEATRE
360° HORIZONTAL, 360° VERTICAL, AND INCLINED HEXAGONS.

For simplicity, the heading immediately above refers to said horizontal hexagon and said vertical hexagon. Said horizontal hexagon is shown in FIG. 9, comprising the said exposition to be photographed by a camera lens photographing a horizontal field of 60°. FIG. 10 shows and describes cameras which photograph horizontal, vertical, and inclined fields comprising a broad range of angles.

Therefore said horizontal hexagon and said vertical hexagon selectively are replaced by alternative structures adapted, for example, to the respective horizontal and vertical angles of the selected lens of said camera.

CENTRAL STAGE (FIG. 9) — FIRST SEGMENT OF 360° VERTICAL SPECTACULAR.

The first horizontal segment of a 360° verticalspectacular, is shown in FIG. 11.

FIG. 11 shows a horizontal view of star XIII, similar to star X comprising the central stage in FIG. 9. Said star XIII is situated in an amphitheatre adapted for display of the stereo spectacular comprising the exposition represented in FIG. 9 by the hexagon G' thru L' surrounding said central stage 360° circumferentially. FIG. 11-a shows a horizontal view of said amphitheatre, and FIG. 11-b shows a vertical view.

In FIG. 11-a, said amphitheatre comprises star XIII', as follows. Structural element 1 of star XIII' comprises a girder with thirteen locations similar to structural element 1 in star VII, shown in FIG. 6, except that the standard increment between locations in star XIII' is 24 feet, with said structural element 1 comprising 288 feet between locations *1-a* and *1-m*. Structural elements 2 thru 6 of star XIII' are similar to structural element 1.

In FIG. 11-*a*, adjustable girders to determine an irregular location comprise first and second adjustable girders, 108 and 109 respectively.

In FIG. 11-*a*, six vertical supports are connected to star XIII' similarly to the vertical supports associated with star VII in FIG. 6, except proportionately larger in FIG. 11-*a*, each said vertical support connecting the next adjacent vertex successively, with said vertices designated A' thru F'. The upper limit of said vertical supports, represented by arrows in FIG. 11-*b* and not shown therein, selectively corresponds to the dimensions and structure of the screen, cyclorama 110, supported thereby. FIG. 12-*b* shows a screen thus supported comprising 180° vertically. FIG. 11-*b* shows the first horizontal segment of a 180° vertical spectacular, with the selected angle of elevation of the top of said first segment represented therein by lines of dashes designated 30°, 45° and 60°, respectively.

In FIG. 11-*a*, star XIII comprises the central stage with six fountains, designated 75-*a* thru 75-*f*, similarly to star X in FIG. 9, similarly located at vertices G thru L of star XIII, respectively. In FIG. 11-*a*, first structural element 1 of start XIII comprises seven locations, each adjacent location separated by a standard increment of 24 feet. Therefore the distance of 144 feet between said first and seventh locations comprises the same total length as structural element 1 of star X in FIG. 9. In FIG. 11-*a*, each structural element 2 thru 6 is similar to structural element 1.

Therefore star XIII in FIG. 11-*a* is identical to star X in FIG. 9, except for the extra locations resulting from the shorter minimum increment comprising the mosaic of locations in FIG. 11-*a*.

In FIG. 11-*a*, vertex A of star XIII is connected to location 5'-*g* of structural element 5'. Each of the additional five vertices of star XIII, designated B thru F, is connected to the corresponding location "*g*" of each structural element 1', 6', 2', 4', and 3', respectively.

The spectacular shown in FIG. 11 comprises a live stage comprising star XIII in the central area surrounded by the horizontal hexagon 360° circumferentially, said hexagon comprising a representation of the structures and landscape of the New York World's Fair exposition in 1964–1965. Said exposition is represented in said spectacular by the color stereo views of said exposition photographed in FIG. 9. Each vertex A thru F of star XIII corresponds to the respective horizontal segment adjacent to the corresponding vertex of star X in FIG. 9.

Said color stereo views of said exposition selectively may be displayed in said spectacular in many alternative structures, is respective embodiments.

In FIG. 11, said embodiment comprises stereo projector 111 to project stereo pairs, detail shown in FIGS. 15-*e* and 15-*f*, said projector shown in FIG. 11-*a* at point Z comprising the center of star XIII.

Alternatively, exhibition of color stereo views of said exposition selectively may comprise seven embodiments, as follows.

In the first alternative embodiment, camera 103 in FIG. 10 comprises two color television cameras, as follows. Cyclorama 110 comprises, for example, a cathode ray tube, or an electronic screen for the reproduction, for example, of color videotape, recorded stereo pairs, or Xograph views (described infra).

FIG. 9 shows the horizontal hexagon comprising an exposition to be photographed 360° circumferentially. FIG. 10 shows stereo camera 103 selectively with a lens comprising a 120° horizontal camera angle to photograph said exposition. FIG. 15-*a* shows the horizontal display of said exposition, photographed and displayed by three stereo color cameras each with a horizontal camera angle of 120°.

In a first alternative embodiment, each of the dual lenses of camera 103 comprises a color television camera adapted to record on first and second videotapes a color image (still or moving) by a lens with a horizontal angle of 120°, said camera mount adapted to pan horizontally at a uniform speed in the manner well known in the art of color videotape production or equivalent camera selectively with a focal plane shutter. Said camera is panned 360° horizontally to record the 360° panorama on said two (circumferential) videotapes.

Display at the frequency of 24 frames per second, for example, shows a steady picture to the observer's eye as the result of persistence of vision. Said two videotapes are displayed circumferentially each 1/24th second. Or a single video tape, for example, comprises a loop selectively with parallel tracks, each said track recorded with a separate image. Selectively, a plurality of said viceotapes may be combined in a single tape. Alternatively, said videotapes are displayed similarly, in segments, for example as shown in FIG. 15-*a*. A rotating or driving means for rotating said camera, is defined as rotating means, with a predetermined rotating pattern. In said pattern, a film projector corresponds to said camera to project the images recorded on said film back to their corresponding portion of the cyclorama. Said "film" is a generic term including photographic film, video tape, and equivalent recording means.

The vertical displays shown in FIGS. 15-*b*, and 15-*c* are similar to the horizontal display described in the preceding paragraph.

Said equivalent recording means selectively comprises a video disc or record rotating, for example, at 1,500 revolutions per minute to record and then to play back for projection at said 24 frames per second, and has the capacity to record, for example, 43,200 usual color pictures for television. (*Electronics*, Vol. 45, pp. 29–30, Sept. 11, 1972.)

Therefore FIGS. 9, 10, and 15 show an embodiment for display for horizontal and vertical hexagons 360° circumferentially, said display comprising, for example, videotape recordings of three-dimensional stereo in color.

As the second alternative embodiment, camera 103 in FIG. 10 comprises a camera to photograph stereo views with special equipment known as the "Xograph" method, described supra. Said Xograph views are reproduced for display on cyclorama 110 in FIG. 11, said display to be viewed by natural vision/without special glasses for the observer. Alternatively, said Xograph views may be projected by exterior rear view projection onto cyclorama 110 comprising a translucent screen for viewing by an observer on the opposite side of said cyclorama, said observer viewing from the interior of said amphitheatre.

As the third alternative embodiment, said stereo pairs are projected by said exterior rear view projection.

As the fourth alternative embodiment, projector 111 comprises a stereo motion picture projector for at least one segment of said exposition, as shown in FIG. 14-d.

As the fifth alternative embodiment, selected projectors comprising components of projector 111 are positioned in a peripheral location, as shown in FIGS. 14-b and 14-c.

As the sixth alternative embodiment, said stereo pairs or Xograph views, each present a horizontal field other than 60°, for exhibition by any of the foregoing structures, or for projection by a projector adapted to said horizontal field. Embodiments of examples of said projectors are shown in FIGS. 15-a, 15-b, 15-c, and 15-d.

As the seventh alterative embodiment, said spectacular comprises other methods for achieving a three-dimensional sensation without use of special glasses by the observer.

As an eighth alternative embodiment, said spectacular comprises any structure similar to the foregoing alternatives, except comprising two-dimensional views rather than three-dimensional views, selectively in black and white, or in color.

It is apparent that many other embodiments comprising equivalent means may be achieved within the spirit of this invention.

Each of the foregoing embodiments for display in said spectacular, comprise alternative embodiments for each of FIGS. 12, 13, and 14, except as specifically stated otherwise.

In FIG. 11-a, the Tricentennial Pool comprises a fountain with its center designated 77. A special irregular location for Tricentennial fountain 77 is determined by the first adjustable girder 108, its fixed location 108-a at location 4'-d, and its adjustable location 108-b adjusted to correspond to the location of said fountain 77. Similarly, second adjustable girder 109 comprises its fixed location 109-a at locations 6'-j, and its adjustable location 109-b adjusted to correspond to the location of said fountain 77.

The conjunction of the adjusted locations b of each of adjustable girders 108 and 109, therefore determines the location of fountain 77.

The detail of first adjustable girder 108 is shown in the detail drawing annexed to FIG. 11-a. As shown therein, the variable relationship between locations 108-b in first subgirder 108-c, and 108-a in second subgirder 108-d, selectively is fixed by tightening at least one fastener.

It is apparent alternatively that said structural elements in FIG. 11-a may comprise locations with integral connectors as shown in FIG. 16, whereby the horizontal angle of second subgirder 108-d is determined by its respective hexagonal protrusion (corresponding to protrusion 3'-a-5 in FIG. 16) engaging the hexagonal recess of location 4'-d (corresponding to hexagonal recess 2'-a-1 in FIG. 16). In FIG. 11-a, with location 108-b of first subgirder 108-c then fixed in the usual manner, the exact position of location 108-b is fixed, without the necessity for a second adjustable girder 109.

Therefore the integral connector shown in FIG. 16 comprises a structure adapted to determine an irregular location by use of a single adjustable girder.

In the embodiment shown in FIG. 11-a, if it is desired to relocate Tricentennial fountain 77 at any corresponding location 77' within the mosaic of star XIII, for example adjacent to vertex C', the fixed locations "a" of adjustable girders 108 and 109 are positioned at the corresponding locations of girders 2' and 1', respectively. The intersection of adjustable locations "b" of adjustable girders 108 and 109 determines the location of Tricentennial fountain 77 in the same relationship (shown by lines of dashes) adjacent to vertex C', as the relationship (shown by solid lines) to vertex D'.

Therefore, FIG. 11-a shows adjustable girders characterized by the nine efficiencies in the mosaic of star XIII'. Said girders comprise a structure to determine any irregular location in said mosaic by two adjustable girders. FIG. 11-a further shows a structure to determine any irregular location in tetrahedron 32, a solid, as shown and described in FIG. 4. FIG. 16 shows an integral connector, whereby said irregular location is determined by a single adjustable girder.

In summary, in FIG. 11 the six water fountains 75 create a live scene on the central stage, similar to actual fountains at the Unisphere of the New York World's Fair, the exposition in 1964–1965 shown in FIG. 9. With the water turned off in said fountains at the time of photographing said exposition, the color stereo is viewed on cyclorama 110, and comprises the first segment of the 180° vertical spectacular overhead.

In FIGS. 11-a and 11-b, with each fountain 75 on the live central stage releasing two arcs of water, the observor in the amphitheatre views total theatre comprising the horizontal hexagon of 360° supporting the cyclorama displaying three dimensional color stereo with lines of sight to the horizon. Thus simultaneously, the live fountains in the foreground combine the live immediacy of flowing water experienced by all the senses of said observer including sight, hearing, and tactile senses, with the complete realism experienced in the stereo color, audio, and selectively movement, in the horizontal vista of the New York World's Fair displayed on cyclorama 110 beyond the live foreground.

It is apparent that said live central stage may comprise any selected live experience or entertainment, for example the theatre-in-the-round shown in FIG. 13.

Also shown is a structure to determine any irregular location, with the nine efficiencies thruout the mosaic of star XIII', by use of at least one adjustable girder.

Contrifugal Audience, 180° Vertical or Inclined Spectacular

FIG. 12 shows the live stage comprising star XIII in FIG. 11, with a "centrifugal" audience viewing the spectacular shown in FIG. 11, in an amphitheatre adapted to display the entire vertical spectacular overhead comprising 180°.

In FIG. 12-a, the central live stage in a horizontal view comprises star XIII at audience (i.e., stage) level, with its six live fountains 75-a thru 75-f located at vertices G thru L of star XIII, similarly to FIG. 11.

In FIG. 12-a star XIII additionally comprises seats 113 facing "centrifugally," i.e. facing towards the outside of the amphitheatre, with the audience seated amidst the said fountains on said live stage. The "front row" of said seats, said row designated 113-a, is closest to cyclorama 114. Said row comprises 360° of seats circumferentially, with six segments of seats, each segment corresponding to one of the six successive vertices of star VIII designated A thru F. Each segment of seats 113 is separated from its adjacent segment by an aisle. Seats 113 comprise twelve additional rows similar to row 113-a, designated successively row 113-b thru row 113-n.

Side GZ of triangle GZL comprises three locations, separated from each adjacent location by the standard increment of 24 feet. Said rows of seats 113 are equally spaced, whereby six rows intersect said side GZ between said adjacent locations, each said row thus comprising 4 feet on said side GZ, and each said row comprising its adjacent aisles. Sides GZ and ZL comprise girders with adjacent locations separated by a standard increment of four feet. Therefore in the first segment of seats 113 adjacent to vertex A, each of rows 113-e thru 113-n are positioned by the corresponding locations of girders GZ and ZL, respectively. Rows 113-a thru 113-d are located similarly between extensions of said girders ZG and AL. FIG. 14-a shows an alternative embodiment, with each row of each segment of seats 122 comprising a row of seats in a straight line. In FIG. 12-a, each row of each segment of seats 113 comprises an arc connecting its respective locations, said arc corresponding to said straight line of seats shown in FIG. 14-a.

In this embodiment, the display on cyclorama 114 is projected by projector 111 situated at center Z, similarly to FIG. 11. Eight alternative embodiments are described supra in FIG. 11.

In FIG. 12-a, vertical support 112 comprises first vertical support 112-a connected to vertices A and B, and five additional vertical supports 112-b thru 112-f connected in the usual manner to the successive vertices of star XIII. In FIG. 12-b, said vertical supports are connected to star XIV comprising a plane similar to star XIII and parallel thereto. Said vertical supports correspond to vertical supports 16 thru 21 in FIG. 3, therein supporting parallel planes II and IV, corresponding to stars XIV and XIII respectively, in FIG. 12-b.

The detail of construction of first vertical support 112-a in FIG. 12-b corresponds to the detail of vertical support 16 in FIG. 3-b, except that star XIV in FIG. 12-b corresponds to a fourth parallel plane not shown in FIG. 3-b, positioned above said star II and separated by a vertical distance equal to the distance between adjacent parallel planes shown therein. In FIG. 12-b, each vertical support 112 comprises a supporting structure with dimensions proportionately corresponding to the dimensions of vertical support 16 shown in FIG. 3.

In FIG. 12-b in a vertical view, cyclorama 114 comprising a display screen is supported by girders (not shown) adjacent to said vertical supports and horizontal plane, at each vertex of star XIV, connected to cyclorama 114 as shown in FIGS. 1 thru 4, and by the adjustable girders in FIG. 11.

As an alternative structure, cyclorama 114 comprises the contour of a hemisphere achieved by a balloon corresponding to cyclorama 114 in FIGS. 12-a and 12-b, inflated at low pressure by an air compressor or by air tanks, and entered thru leak-resistant entrances, as well known in the art of constructing inflated, portable structures. In each embodiment comprising polarized light, said balloon comprises a surface which retains the respective polarity of light reflected therefrom.

It is apparent that the supporting structure for cyclorama 114 may comprise other embodiments in the spirit of this invention, including tetrahedron 32 and a plurality thereof.

In summary, FIG. 12 shows total theatre. The spectacular shown in FIG. 11, with live stage and stereo color, is combined in an amphitheatre comprising a heaxagon 360° circumferentially, and 180° vertically and selectively at any inclined plane, with the centrifugal audience seated therein.

Centripetal Audience (Example; Theatre-In-the-Round).

FIG. 13 shows a live stage comprising stars XVI-a and XVI-b at the center of a spectacular corresponding to the amphitheatre shown in FIG. 12, except with a "centripetal" audience facing the center of said amphitheatre, and therefore viewing some portion of the circumferential display of said spectacular beyond said live stage in the foreground.

In FIG. 13, the central, live stage comprises two planes as follows. First plane, star XVI-a in a vertical view in FIG. 13-b, comprises the performing stage with any selected stage setting. In a horizontal view in FIG. 13-a, second plane, star XVI-b, comprises the overhead light bridges and special effects. An example of said central, live stage is a theatre-in-the-round. Star XVI corresponds to the two levels of the live sound stage shown in FIGS. 6 and 7. Vertical supports 119 support two parallel planes and correspond to the six vertical supports described supra in FIG. 7, with detail of construction shown in FIG. 3-b. Each structural element of star XVI is 81' in length, comprising 28 locations with standard increment of 3' separating each adjacent location.

shown at the level of the audience and stage, In FIG. 13-a, star XV comprises the amphitheatre, shown at the level of the audience and stage, corresponding to star XIII in FIG. 12. Star XV comprises the following.

Each structural element comprises one hundred and nine locations each separated by a standard increment of 3', with a total length of 324' between its extreme locations.

Star XVI is centered within star XV by connecting girders (not shown) corresponding to star XIII' in FIG. 11, each connected to the 64th and 82nd locations (not shown) respectively, of each structural element of star XV.

Also in star XV, seats 117 correspond to seats 113 in FIG. 12. Seats 117 face centripetally, i.e. facing toward the center of the amphitheatre comprising said theatre-in-the-round. Each row of said seats comprises 360° of seats circumferentially, similarly to seats 113, except that each of the six segments of said row is divided by a central aisle, and the locations of each respective structural element positioning each said row each are separated from its adjacent location by a standard increment of three feet instead of 4 feet. In FIG 13-b, in a vertical review, seats 117 are constructed at an angle, supported by vertical supports and adjustable girders, not shown, said adjustable girders corresponding to adjustable girders shown in FIG. 11.

Also in star XV, shown in FIG. 13-a, seats 117 comprise three tiers, each tier comprising seats in a hexagon 360° circumferentially. First tier 117-a comprises six rows of seats in a section adjacent to the theatre-in-the-round comprising star XVI. Second tier 117-b comprises box seats, said boxes constructed by an interlace between first and second hexagons, with the vertices of said second hexagon 30° clockwise from said first hexagon. Third tier 117-c comprises 22 rows of seats in a section adjacent to cyclorama 116.

In this embodiment, the display of cyclorama 116 is projected by projector 120, with its detail shown in FIGS. 15-a, 15-b, and 15-c, said projector situated at center Z of star XVI-a. Each stereo segment photographed by camera 103 for said projector comprises a field with a horizontal angle of 120°, and a vertical angle of 60°, the lenses with said field comprising an alternative embodiment, with details in the description of FIG. 10. Each said horizontal field of 120° photographs two horizontal segments shown in FIG. 9, first, second, and third said fields photographing segments A and B, C and D, and E and F, respectively. It is apparent that said horizontal and vertical fields may be interchanged, whereby said camera photographs a field comprising 60° horizontally, and 120° vertically. Eight alternative embodiments are described supra, at FIG. 11.

In FIG. 13-a, vertical support 118 comprises six vertical supports a thru f corresponding to vertical support 112 in FIG. 12, except in FIG. 13 said vertical supports are proportioned to the dimensions of star XV and the additional height of the central stage comprising star XVI.

In FIG. 13, cyclorama 116 comprises a display screen corresponding to cyclorama 114 in FIG. 12.

Therefore FIG. 13 shows a structure for a centripetal audience facing the center as at a theatre-in-the-round, for example with a live dramatic stage setting viewed on the center stage comprising star XVI, and viewed with the background of the New York World's Fair of 1964–1965 in color stereo, comprising the cyclorama with hexagoral segments 180° overhead and 360° circumferentially.

Therefore in FIG. 13, the audience experiences the immediacy of the sensation that the live stage comprising star XVI is located at the New York World's Fair, in the position occupied by the Unisphere there in 1964–1965.

Similarly, camera 103 in FIG. 10 selectively may photograph any other setting of scenic, historic, topical, or other interest, at any time and in any place. Said settings selectively create the immediacy appropriate to dramatic action on said center stage, for example in the drama Macbeth.

The said theatre-in-the-round selectively creates the sensation that said theatre is physically located geographically, and at the time in history displayed in color stereo on cyclorama 116.

Therefore FIG. 13 shows total theater. The details of construction of the structures comprising said theatre-in-the-round and the amphitheatre are shown in FIGS. 1 thru 12, and 14 thru 16. FIG. 13 further shows a structure with its audience in a hexagon 360° circumferentially, and with said amphitheatre comprising segments of a hexagon 180° vertically or in an inclined plane. Said audience is shown in centripetal relationship to an entertainment comprising a live dramatic set in the foreground. selectively in any setting comprising stereo color thruout said amphitheatre vertically and circumferentially, with associated audio and other recorded stimuli.

FIG. 14 shows four embodiments of the invention, the second said embodiment shown in a horizontal view and a vertical view.

Entrance Area (Other Uses).

FIG. 14-a shows a horizontal view of an embodiment with a special area, for example comprising an entrance to the amphitheatre, shown at the performing level in an embodiment corresponding to FIG. 13.

In FIG. 14-a, the central stage comprises star XIX, and the amphitheatre comprises star XVIII. Each of the following correspond to structures with comparable uses in FIG. 13: said stage, said amphitheatre, cyclorama 121, seats 122, and six vertical supports 124. Each segment of each row of seats 122 comprises one straight line in the structure of the side of a hexagon. The spectacular on cyclorama 121 comprises reproductions by the Xograph method, viewed in three-dimensional color without special glasses or viewing devices, as set forth at FIGS. 10 and 11.

The entrance to said amphitheatre comprises entrance area 123, said area extending between vertices F' to A', and A' to B', of star XVIII, using the area occupied by seats 122 and cyclorama 121 in all other segments of the amphitheatre. Alternative embodiments (not shown) selectively use said area for dressing rooms, audience in a balcony, or for any function or irregularity in said amphitheatre. It is apparent that many combinations of components of this structure with other structures in this specification are useful.

360° Vertical Spectacular. Display.

FIGS. 14-b and 14-c show hexagons comprising a 360° vertical spectacular, with a horizontal view thereof in FIG. 14-b, and a vertical view thereof in FIG. 14-c. Said spectacular has many uses shown in embodiments thruout this specification, with the scale of this embodiment adapted to its respective use.

Said spectacular comprises a display in a vertical hexagon, or hexagon in an inclined plane, 360° circumferentially, similar to the horizontal scenes and action viewed 360° circumferentially in other embodiments thruout this specification. Said vertical hexagon is shown in FIG. 14-c, comprising star XXII shown in a vertical view of section EB of star XX.

In this embodiment of said vertical spectacular, the observer views from outside the structure, thru an aperture, not shown. In alternative embodiments, the observer selectively stands, is seated, is supported by a transparent floor or stage (for example, spanning plane EB in star XXII in FIG. 14c), observes # from an overhanging balcony, or observes in the manner of any suitable embodiment in this specification.

FIG. 14-b comprises a horizontal view of star XX shown in solid lines, comprising the upper plane surface of FIG. 14c. Projector 127-a is shown at vertex F of star XXII, with the angle of its lens shown by lines of dashes to its reflection by the cyclorama below.

In this embodiment, said vertical spectacular is projected thru apertures in cyclorama 126 by peripheral color stereo projectors 127, two said projectors 127-a and 127-b shown, the other projectors, not shown, each corresponding to one dual projector shown in FIG. 15-c.

In an alternative embodiment, said vertical spectacular comprises Xograph color reproductions saturating the observor's entire field of vision vertically below and overhead, in a three-dimensional spectacular with sight lines to the azimuth overhead, to the horizon, vertically below, and behind the observer; the camera angles of a selected segment shown by lines of dashes in FIGS. 14-b and 14-c.

Seven other embodiments of projector 127 are described at FIG. 11. Detail of projector 127 and other embodiments is shown in FIG. 15. Therefore, the angle of the vertical field of the lens of projector 127 in FIG. 14-c selectively is 120°, for example, rather than the 60° shown.

In FIG. 14-b, in the horizontal view of said vertical spectacular, six vertical supports 128 correspond to vertical supports 112 in FIG. 12, except as follows. In FIG. 14-c, each said vertical support comprises a dual vertical support in one structural plane, first said vertical support for the upper portion of said vertical spectacular, and second vertical support for the lower portion. Each vertical girder comprises adjustable locations to connect locations XXII-B, XXII-E, and the corresponding points of each similar vertical hexagon.

In FIG. 14-c, said vertical supports are connected to two parallel planes shown in a vertical view, said planes comprising stars XX and XXI.

Cyclorama 126 is shown by lines of dashes. The upper half of cyclorama 126 corresponds to cyclorama 116 in FIG. 13; the lower half comprises an inverted screen similar to said upper half.

In FIGS. 14-b and 14-c, the angles of the horizontal and vertical fields of projectors 127-a and 127-b, respectively, comprise 60° measured from the center Z of the respective hexagon.

Therefore said vertical spectacular selectively creates the sensation of immediacy, for example, in the panoramas beneath and above the cable sky-ride at the New York World's Fair, or the precipices, rocks, seascapes, and witches' cave beneath Macbeth's castle, and the walls above, at sharp descending and ascending angles from the viewpoint of the observor.

MOTION PICTURES.

FIG. 14-d shows a horizontal view selectively comprising a combined display of stereo motion pictures and stereo slides, shown in an embodiment at the audience level and corresponding to FIGS. 12 thru 14.

In this embodiment, stereo projector 137 corresponds to the projector shown in FIGS. 15-e and 15-f, except stereo motion picture projectors corresponding to horizontal segments 129-a and 129-c of cyclorama 129.

The seats for the audience in this embodiment are shown as follows. Three segments comprising seats 130 are centripetal, facing the center of the amphitheatre, and therefore generally facing the motion picture segments of cyclorama 129 beyond said center. Three segments comprising seats 131 are centrifugal, facing cyclorama 129, and therefore generally facing the motion picture segments of cyclorama 129 adjacent to seats 131.

Cyclorama 129 is supported by the six vertical supports 132, with the amphitheatre comprising star XXIV.

In an alternative embodiment, it is apparent that each said motion picture projector selectively may comprise a single lens adapted to display a two-dimensional motion picture on segments 129-a and 129-c of cyclorama 129, with the other segments thereof comprising two-dimensional reproductions. In this alternative embodiment, the spectacular on cyclorama 129 therefore is viewed 360° circumferentially by an observer without glasses or viewing device.

Irregular Cycloramas and Structures.

FIG. 14-e shows a horizontal view of the audience level of an embodiment comprising an irregular structure corresponding to the usual vertical supports. Said irregular structure comprises the four sides of a rectangle with vertices designated 133-a, 133-b, 133-c, and 133-d.

Said embodiment otherwise corresponds to suitable embodiments in FIGS. 9 thru 14, said embodiment comprising an audience in star XXIV with projector 135 at the center thereof. Eight alternative embodiments for projector 135 are set forth at FIG. 11.

First and second embodiments for this invention are shown in FIG. 14-e.

Said first embodiment is shown, with a hexagon comprising vertical supports 136 supporting cyclorama 134. Said hexagon is connected to said irregular structure by the following connections. Vertices A and D of star XXIV are connected by adjustable girders 133-e, 133-f, 133-g, and 133-h, respectively, to vertices 133-a, 133-b, 133-c, and 133-d, respectively. Therefore said vertical supports and said irregular structure are firmly connected, for the spectacular to be viewed in the usual manner.

Said second embodiment is shown by lines of dashes connecting vertices B, C, E, and F of star XXV to points B', C', E', and F', respectively, on the sides of said irregular structure. Vertices A and D are common to respective points on said sides. Therefore the lines of dashes connecting projector 135 to points A, B', C', D, E', and F', show the respective segments of the horizontal spectacular viewed on the surfaces of said irregular structure when vertical supports 136 and cyclorama 134 are withdrawn.

Therefore FIG. 14-e shows an embodiment to project the spectacular of this invention in an irregular structure.

Displays—Horizontal, Vertical, and Inclined Structures.

FIG. 15 shows structures for certain displays comprising horizontal, vertical, and inclined displays.

FIG. 10 shows camera 103 with horizontal index XI and vertical index XII, comprising structures adapted to position said camera in any pattern of horizontal and vertical camera angles, for example said camera angles set forth in Mascelli, op. cit., pp. 175–183. Corresponding structures are adapted to position each segment for a display comprising each respective segment photographed.

FIG. 13 shows stereo projector 120 with the angle of each of its lenses comprising 120° horizontally and 60° vertically. The detail of projector 120 is shown in FIGS. 15-a, 15-b, and 15-c. In 15-d, is shown an alternative embodiment comprising a single lens for each respective field.

FIG. 14-a shows a display viewed by an observer without the use of spectacles or a viewing device, for example a Xograph reproduction, or alternatively a three-dimensional or two-dimensional display projected by a single lens. FIGS. 14-b and 14-c show said display comprising cyclorama 126, adjacent to a horizontal hexagon 360° circumferentially, and to vertical or inclined hexagons 360° cicumferentially. FIG. 15-d shows the detail for projectors 146 thru 148, each adapted for said display projected by a single lens.

Eight alternative embodiments of a structure for display are described at FIG. 11 including, for example, a display by electronic screens including cathode ray tubes.

The following Figures show a display by a stereo projector with the angle of each of its lenses comprising 120° horizontally and 60° vertically. Certain detail of said projectors is shown in FIGS. 15-e and 15-f.

FIGS. 11 and 12 show said projector, designated therein projector 111. An alternative embodiment shown in FIGS. 14-b and 14-c comprises projector 127. FIG. 14-e shows projector 135.

FIG. 14-d shows stereo projector 137 comprising a stereo motion picture projector for selected segments of its display of a spectacular. Said motion picture segments comprise an alternative embodiment for each other embodiment.

Camera angles cited by Mascelli, op. cit., p. 179, include the Super Pan 70 camera (17 mm.) with horizontal angle approximating 120° (actually 115°), and vertical angle of 68.1°. In the art of cinematography, "fisheye" cameras comprise a horizontal angle, for example, of 180°.

Said horizontal and vertical camera angles selectively comprise the angle of its corresponding display. Said display selectively, for example, comprises Xograph reproductions, reflected projections, rear view projections, electromagnetic and videotape projections, and electronic screens including cathode ray tubes. Therefore, for example, each embodiment shown in FIG. 15 selectively comprises a display corresponding to its respective photograph comprising, for example, a stereo pair or a motion picture frame.

Alternative embodiments to the embodiments shown in FIG. 15 each selectively comprises segments, for example, with each of the foregoing horizontal and vertical angles.

Each respective segment of said display comprises, for example, a horizontal angle, a vertical angle, and a contour in relation to each adjacent segment, for example on the cyclorama comprising its display. Said camera lens, or said display segment, selectively is masked to limit its said horizontal and vertical angles, and said contour in relation to each said adjacent segment.

FIGS. 15-a, and 15-b, and 15-c show three views of a stereo spectacular projected by seven dual projectors, each lens thereof with a horizontal angle of 120° and a vertical angle of 60°. FIG. 15-b shows a vertical view of section AD of FIG. 15-a. FIG. 15-c shows a vertical view of section Y'Y'' of FIG. 15-a.

FIG. 15-a comprises a horizontal view of the following. First dual projector 138 comprises a stereo projector with two lenses, with first lens 138-a at the right hand, and second lens 138-b at the left hand, each lens with its respective polarizing filter. The stereo pair corresponding to said dual projector 138 is designated ('), comprising its right hand frame 138-a' and its left hand frame 138-b'. Said stereo pair is shown positioned between light source 141 and the respective lenses of first dual projector 138. The respective right and left hand images of said stereo pair each is viewed only by the respective eye of the observer. Viewing spectacles 107 shown in FIG. 15-a at a divergent angle for illustrative purposes only, comprise right and left polarizing lens 107-a and 107-b each transmitting only its respective image to each eye of the observer from, for example, dual projector 140. Each frame of stereo pair 138-a' and 138-b' comprises a horizontal angle of 120° and a vertical angle of 60°. In FIG. 15-a, said 120-° horizontal angle is shown connecting vertex A to vertex C in star XXV. In FIG. 15-b, said 60-° vertical angle is shown connecting vertex E to vertex F in star XXVI. In FIG. 15-c, said 60-° vertical angle is shown connecting vertex B to vertex C in star XXVII.

In FIG. 15-a, second dual projector 139 and third dual projector 140 each comprises a projector similar to first projector 138 with similar associated structure, each said dual projector comprising its right lens "a", left lens "b", and its respective stereo pair comprising right frame "a'" and left frame "b'".

Each said stereo pair represents, in FIG. 9 for example, the corresponding horizontal segments of the exposition to be photographed. Each said stereo pair corresponds to said segments projected in the horizontal hexagon 360° circumferentially, vertices A to C, C to E, and E to A, respectively, to be viewed by an observer, for example, in an amphitheatre shown in FIG. 13.

In FIG. 15-a, light source 141 is common to every lens of all said dual projectors.

Therefore FIG. 15-a shows a horizontal triangle in star XXV comprising three segments of a cyclorama 360° circumferentially.

FIG. 15-b shows a vertical view of section AD of star XXV. Star XXVI therein shows the "horizontal angle" of 120° of each projector hereafter shown in FIG. 15-c, and the 60° vertical angle of each projector shown in FIG. 15-a, with light source 141 common to all said projectors.

FIG. 15-c shows a vertical view of section Y'Y'' of FIG. 15-a, and comprises star XXVII. FIG. 15-c shows fourth dual projector 142, fifth dual projector 143, sixth dual projector 144, and seventh dual projector 145, each comprising a projector similar to first projector 138 with similar associated structure, each said dual projector comprising its right lens "a", left lens "b", and its respective stereo pair comprising right frame "a'" and left frame "b'". Each said projector is shown with a "vertical" camera angle of 60°. Each said projector is positioned at a vertical angle 60° above or below horizontal plane Y'Y'', as follows. Said fourth projector is shown with its vertical angle connecting vertices F and A. Each of said fifth, sixth, and seventh projectors connect vertices A and B, C and D, and D and E, respectively. The 60-° vertical angle of each projector in FIG. 15-a, is shown in FIG. 15-c connecting its corresponding vertices BC and EF in star XXVII.

Therefore FIGS. 15-b and 15-c each show vertical structures comprising the corresponding lens angles of each of the seven dual projectors comprising this stereo embodiment, displaying a spectacular viewed by each observer with special viewing glasses.

An alternative embodiment to FIGS. 15-a, 15-b, and 15-c, comprises the following.

The complete cyclorama comprises three groups of photographs (camera frames) similar to the first group, comprising three stereo pairs, shown in FIG. 15-a comprising the horizontal group. The horizontal index is rotated sixty degrees (one-half of the camera's horizontal angle). Second and third groups then are photographed similarly to said first group. The vertical camera index is positioned at an inclination 60° above the horizontal for said second group. The vertical camera index is positioned at an inclination 60° below the horizontal for said third group.

Thereby, the entire cyclorama will comprise nine stereo pairs, each said pair comprising a horizontal angle of 120°, and a vertical angle of 60°. The contour of the respective stereo pair in a segment is identical, and the masking of each stereo pair in each said segment in relation to each corresponding stereo pair in each corresponding adjacent segment is identical. Selectively a cyclorama may be related to a regular polyhedron, for example a tetrahedron comparable to tetrahedron 32 shown in FIG. 4. The tetrahedron is adapted "to coincide with itself by a rotation of 120° about four axes, each passing through a corner point and the midpoint of the opposite face" (Mendelbaum and Conte, *Solid Geometry;* N.Y.: Ronald Press, 1957, pp. 213–214). The optical axis of the lens of each camera or projector is shown in relation to point Z thruout this specification (e.g., FIGS. 9 and 11 thru 14). Selected other regular polyhedra are "centrally symmetric." (Mendelbaum and Conte, op. cit., pp. 213 ff.) All five regular polyhedra are shown in Palmer, Claude I, and Bibb, Samuel F., *Practical Mathematics,* 5th ed. (N.Y.: McGraw-Hill), 1950 ed at pp. 168–169, 1970 ed. at pp. 382–383.

The contour of the respective area of the spectacular photographed by each respective segment is identical, and the masking of each said segment in relation to each adjacent segment is identical.

A similar embodiment, similarly structured, for example comprises an alternative to each embodiment shown in FIGS. 15-*d*, 15-*e*, and 15-*f*.

FIG. 15-*d* comprises a horizontal view of a spectacular similar to the corresponding horizontal view shown in FIG. 15-*a*, except each corresponding projector in FIG. 15-*d* comprises a single lens.

FIG. 15-*d* comprises a horizontal view of the following, within star XXVIII. First projector 146 comprises a single lens with its associated color slide 146′ positioned between common light source 149 and the lens of projector 146. The horizontal and vertical angles of projector 146 are similar to dual projector 138 in FIG. 15-*a*. Second projector 147 and third projector 148 each are associated with its respective color slide 147′ and 148′, each said slide projected by common light source 149.

Each said slide represents, in FIG. 9 for example, the corresponding horizontal segments of the exposition to be photographed. In FIG. 15-*d*, each single lens projects a two-dimensional display. In an alternative embodiment, each single lens projects a three-dimensional display adapted for viewing by an observer without special glasses or viewing device.

Therefore FIG. 15-*d* shows a horizontal triangle in star XXVIII comprising three segments in a cyclorama 360 degrees circumferentially.

Additional single lens projectors fourth thru seventh not shown, each similar to projector 146 and its associated structures, comprise an alternative embodiment otherwise similar to the four corresponding dual projectors shown in FIGS. 15-*b* and 15-*c*.

Therefore FIG. 15-*d* shows single lens projectors comprising this two-dimensional embodiment, displaying a spectacular comprising horizontal and vertical strutures 360 degrees cicumferentially, viewed by each observer without special glasses or devices.

FIGS. 15-*e* and 15-*f* show projectors adapted to display a stereo spectacular similarly to FIGS. 15-*a*, 15-*b*, and 15-*c*, except each lens of each dual projector shown with a horizontal lens angle of 60° instead of 120°.

FIG. 15-*e* comprises a horizontal view of the following. First dual projector 150 is similar to first dual projector 138 and its associated structures in FIG. 15-*a*, except dual projector 150 is shown with a horizontal lens angle of 60°. In FIG. 15-*e*, said 60-° horizontal angle projected by dual projector 150 is shown connecting vertex L to vertex G in star XXIX. Each of second, third, fourth, fifth, and sixth dual projectors and their associated structures designated 151, 152, 153, 154, and 155 respectively, each is similar to dual projector 150 and its associated structures. Dual projectors 151 thru 155 each are shown projecting a horizontal angle connecting, in star XXIX, vertices G to H, H to I, I to J, J to K, and K to L, respectively. Light source 156 is common to aid first thru sixth dual projectors.

In FIG. 15-*e*, first stereo pair 150-*a*′ and 150-*b*′ represents, in FIG. 9 for example, the corresponding horizontal segment L′G′ of the exposition to be photographed. The second thru sixth stereo pairs each is associated with projectors 151 thru 155, respectively.

Therefore FIG. 15-*e* shows in star XXIX a horizontal hexagon comprising six segments of a cyclorama 360° circumferentially.

FIG. 15-*f* shows a vertical view of section LI through the center of star XXIX in FIG. 15-*e*. FIG. 15-*f* in relation to FIG. 15-*e* corresponds to FIG. 15-*b*, in relation to FIG. 15-*a*.

FIG. 15-*f* is similar to FIG. 15-*b*, except FIG. 15-*f* shows a "horizontal" lens angle of 60° represented by each of segments FA, AB, CD, and DE, rather than 120° in FIG. 15-*b* represented therein by corresponding segments FB and CE, respectively.

Therefore in this embodiment, "left" and "right" dual projectors, each with a 60° "horizontal" angle and its associated structures, correspond to each of the four dual projectors shown in FIG. 15-*c*. Each said dual projector, not shown, is similar to each dual projector shown in FIG. 15-*e*, each with a horizontal angle of 60° and a vertical angle of 60°. Each said dual projector is positioned at an angle of inclination 60° above the horizontal plane comprising star XXIX shown in FIG. 15-*e*.

Seventh thru tenth said dual projectors, comprising said "left" projectors, correspond to projectors 142 thru 145 shown in FIG. 15-*c*, to display the four segments adjacent to segments FA and DE in FIG. 15-*f*. *Eleventh thru fourteenth said dual projectors, comprising said bright" projectors, similarly display the four segments adjacent to segments AB and CD in FIG. 15-f.*

Therefore FIGS. 15-*e* and 15-*f*, and FIG. 15-*c* (showing four dual projectors corresponding to eight dual projectors described in the preceding paragraph), show a structure displaying a spectacular viewed by each observor with special viewing glasses.

Said rotating reflecting means selectively is used with a recording means comprising a camera as described thruout the specification of said parent application, for example camera 103 shown in FIG. 10-*c*, for rotating said reflecting means instead of rotating said recording means.

FIG. 17 shows schematic views of rotating reflecting means, selectively comprising focusing means. FIG. 17-*a* shows rotating focusing means comprising a convex lens, FIG. 17-*b* shows rotating focusing means comprising a concave mirror, and FIG. 17-*c* shows rotating reflecting means comprising a right angle prism.

In FIG. 17-*a*, convex lens 157 transmits images of a scene to recording means 160. Said lens 157 rotates horizontally on pivot 158, at the vertical axis of rotating right angle prism 159 associated with said lens 157 and counterbalanced therewith. Pivot 158 corresponds to pivot 106 in FIG. 10-*c*.

In recording cycles comprising, for example, a plurality of horizontal scans per cycle, vertical pivoting is accomplished by pivoting means not shown for reflecting said image from said lens 159 to said recording means, said vertical pivoting means corresponding to pivots 104 and 105 in FIG. 10-*c*.

If it is desired that the horizontal and vertical axis of said images each correspond to the similar axis of the film in recording means 160, said images are reflected by means not shown, and well known in the art, for example a dove prism rotating in the vertical axis of prism 159 at a reduced speed of rotation one-half of the speed of rotation of prism 159. Recording means 160 selectively records each right and left hand image for the respective eye of an observer each in its respective area, for example a track on a film in recording means 160. In an embodiment with said film moving continuously at a speed selected to correspond to the speed of rotation of prism 159 and lens 157, said images are optically at rest in relation to said film.

Therefore FIG. 17-a shows a rotatable reflecting means comprising a convex lens for transmitting said pattern of images comprising a program of cycles to recording means 160, said images selectively comprising the entire spherical scene for projection on a spherical cyclorama.

Therefore a projector not shown and in the position of said recording means will project each said image from its location in said pattern to its corresponding portion of said spherical cyclorama.

Alternatively, it is apparent that a second convex lens not shown and similar to lens 157, and selectively separated therefrom horizontally by the standard interocular distance, can transmit said image for the left hand eye of an observer, with said lens 157 transmitting only said image for said right hand eye.

In FIG. 17-b, concave mirror 161 corresponds to lens 157 in FIG. 17-a. Images of said scene pass thru semi-transparent half mirror 162 and are reflected by said concave mirror 161 to the front surface of said half mirror 162, which is at a 45° angle to the horizontal and is counterbalanced with concave mirror 161. Said front surface comprises, for example, a half silvered mirror.

Said concave mirror 161, and said half mirror 162, comprise a rotatable reflecting and focusing means rotating on pivot 163 at the vertical axis of said half mirror 162. Pivot 163 corresponds to pivot 106 in FIG. 10-c. Said concave mirror 161 and half mirror 162 correspond to lens 157 and prism 159 in FIG. 17-a for reflecting said images to other corresponding means in FIG. 17-a.

In FIG. 17-c, rotating right angle prism 164 is similar to prism 159 in FIG. 17-a and similarly rotates horizontally on its pivot 165, for reflecting said images to their corresponding means in FIG. 17-a.

It is apparent that said convex lens 157, or concave mirror 161 with associated half mirror 162, selectively may be positioned between its respective reflecting means and recording means 160, rather than between said scene and said reflecting means as shown in FIGS. 17-a and 17-b.

With the apparatus shown in FIG. 17 it is necessary to select a means for recording, a processing method for its film development, and a projection system which will provide a stereoscopic image on said cyclorama. If said images would otherwise be pseudoscopic, a method of inversion is selected such as a right angle prism inserted in the light path to said recording means 160, or an extra recording in said processing, for example.

It is apparent that this invention as shown in this specification may comprise many alternative embodiments not shown, within the spirit of the invention.

Therefore applicant claims:

1. In a stage with a cyclorama, an improved apparatus to record and display a scene, comprising:
   a stage comprising a mosaic of locations in predetermined relationship to a cyclorama comprising a generally symmetrical geometric figure;
   said cyclorama around at least a portion of said stage and generally spherical, with its center at a selected location in said mosaic; and
   a reflecting means universally pivoted at a selected location in said mosaic and drive means for rotating said reflecting means at a uniform speed in a panning motion to reflect said scene to a camera comprising recording means to record said scene on film.

* * * * *